(12) United States Patent
Izawa et al.

(10) Patent No.: US 10,187,618 B2
(45) Date of Patent: Jan. 22, 2019

(54) GAMING MACHINE AND EFFECT ASSEMBLAGE OF GAMING MACHINE

(71) Applicants: Universal Entertainment Corporation, Koto-ku, Tokyo (JP); Aruze Gaming (Hong Kong) Limited, Hung Hom, Kowloon (HK)

(72) Inventors: Takashi Izawa, Tokyo (JP); Keita Shimura, Tokyo (JP)

(73) Assignees: Universal Entertainment Corporation, Tokyo (JP); Aruze Gaming (Hong Kong) Limited, Hung Hom, Kowloon (HK)

(*) Notice: Subject to any disclaimer, the term of this patent is extended or adjusted under 35 U.S.C. 154(b) by 215 days.

(21) Appl. No.: 15/153,899

(22) Filed: May 13, 2016

(65) Prior Publication Data

US 2016/0344989 A1 Nov. 24, 2016

(30) Foreign Application Priority Data

May 18, 2015 (JP) ................................. 2015-101284

(51) Int. Cl.
| | |
|---|---|
| A63F 13/25 | (2014.01) |
| H04N 9/31 | (2006.01) |
| A63F 5/00 | (2006.01) |
| A63F 9/24 | (2006.01) |
| G03B 21/606 | (2014.01) |
| G03B 21/14 | (2006.01) |

(52) U.S. Cl.
CPC ............ *H04N 9/3179* (2013.01); *A63F 5/00* (2013.01); *A63F 9/24* (2013.01); *H04N 9/3141* (2013.01); *H04N 9/3161* (2013.01); *G03B 21/145* (2013.01); *G03B 21/606* (2013.01)

(58) Field of Classification Search
CPC .. H04N 9/3179; H04N 9/3141; H04N 9/3161; A63F 5/00; A63F 9/24; G03B 21/145; G03B 21/606
USPC .......................................................... 463/34
See application file for complete search history.

(56) References Cited

U.S. PATENT DOCUMENTS

| | | | | |
|---|---|---|---|---|
| 6,676,514 B1* | 1/2004 | Kusuda | ................... | G07F 17/32 463/24 |
| 2006/0094493 A1* | 5/2006 | Kido | ....................... | G07F 17/32 463/17 |
| 2006/0287053 A1* | 12/2006 | Yokota | ..................... | A63F 5/00 463/17 |
| 2009/0023491 A1* | 1/2009 | Ikeya | ..................... | G07F 17/32 463/20 |
| 2010/0301557 A1* | 12/2010 | Kido | ..................... | A63F 5/0005 273/142 E |
| 2011/0115158 A1* | 5/2011 | Gagner | ............... | G07F 17/3211 273/274 |

\* cited by examiner

*Primary Examiner* — Allen Chan
(74) *Attorney, Agent, or Firm* — Simpson & Simpson, PLLC; S. Peter Konzel, Esq.

(57) ABSTRACT

A projection mechanism including a projector emitting projection light by which a game effect image is generated and a projection target mechanism including a projection surface which generates a three-dimensional structure corresponding to a game content, in association with the game effect image generated by projection of the projection light are included.

8 Claims, 82 Drawing Sheets

FIG.22

<NORMAL GAME>

| GAME1 | | | | | | |
|---|---|---|---|---|---|---|
| BET | Shooter | GAME | RESULT | BET | Shooter | GAME | RESULT |
| 15~60SECONDS (20 SECONDS BY DEFAULT) | 5~30 SECONDS | 15~25 SECONDS | 6SECONDS | 15~60SECONDS (20 SECONDS BY DEFAULT) | 5~30 SECONDS | 15~25 SECONDS | 6SECONDS |

<JP GAME>

| GAME1 | | | | JP GAME1 | | |
|---|---|---|---|---|---|---|
| BET | Shooter | GAME | RESULT | JP GAME | JP RESULT |
| 15~60SECONDS (20 SECONDS BY DEFAULT) | 5~30 SECONDS | 15~25 SECONDS | 6SECONDS | 35~40SECONDS | |

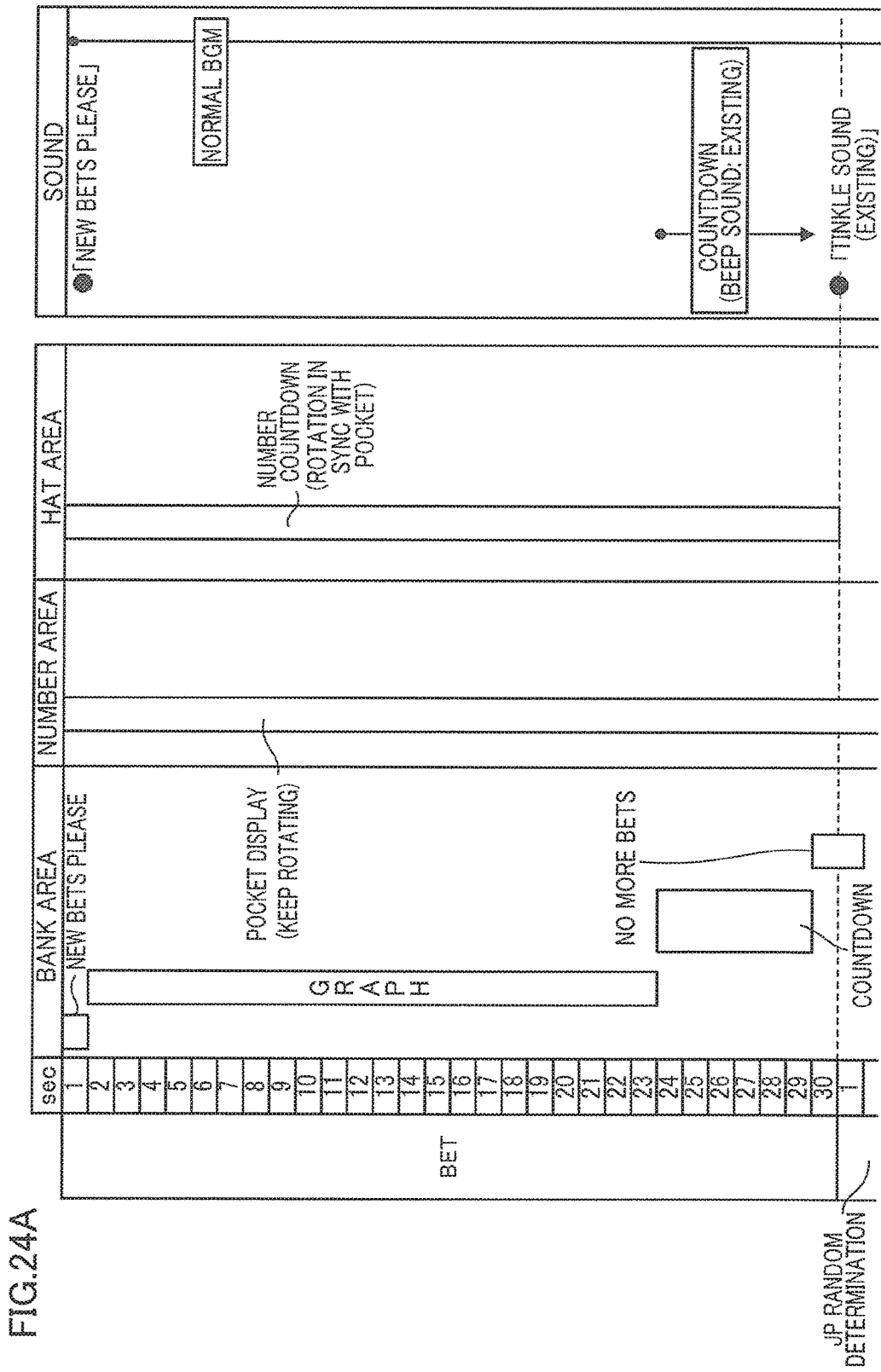

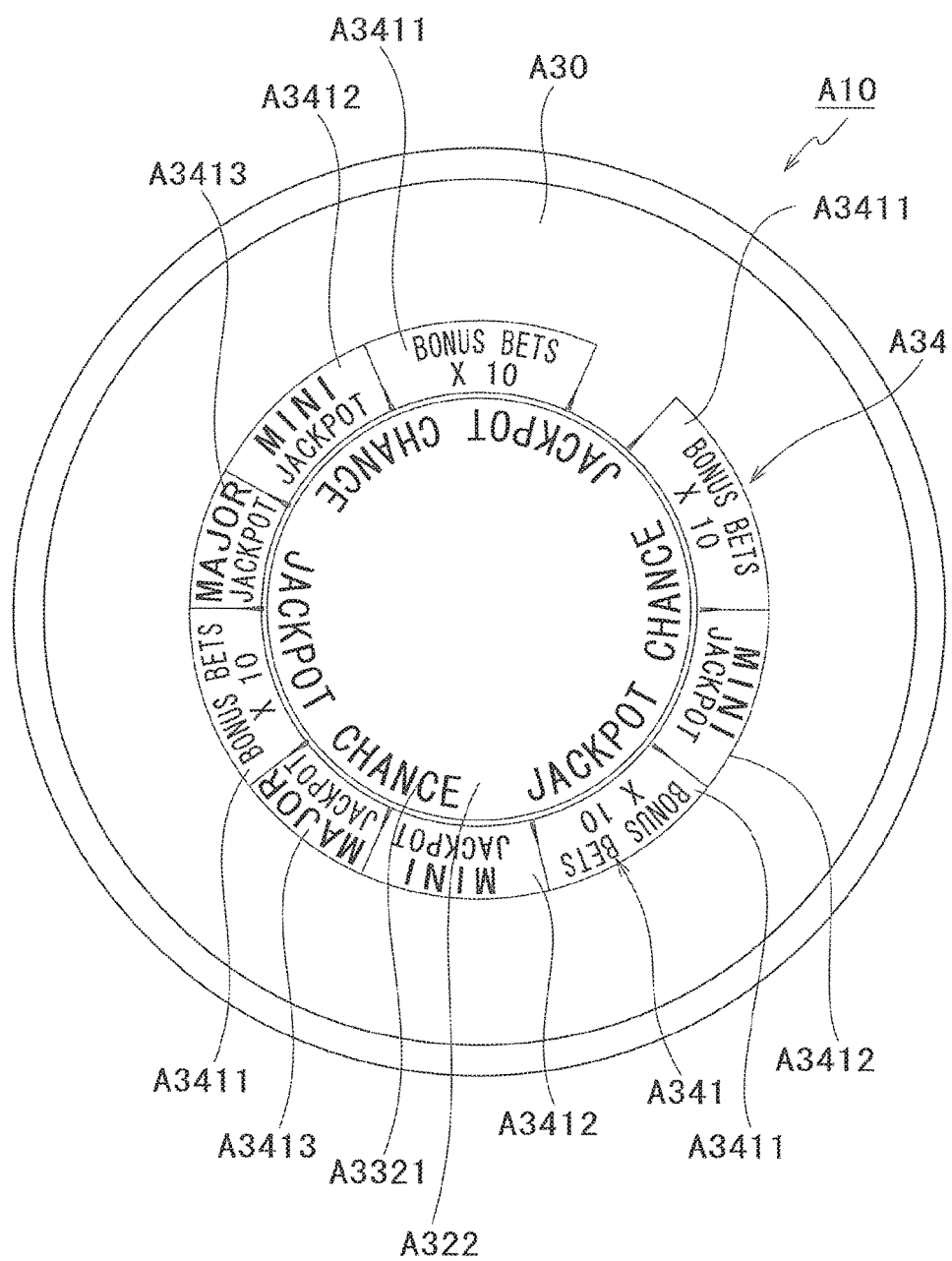

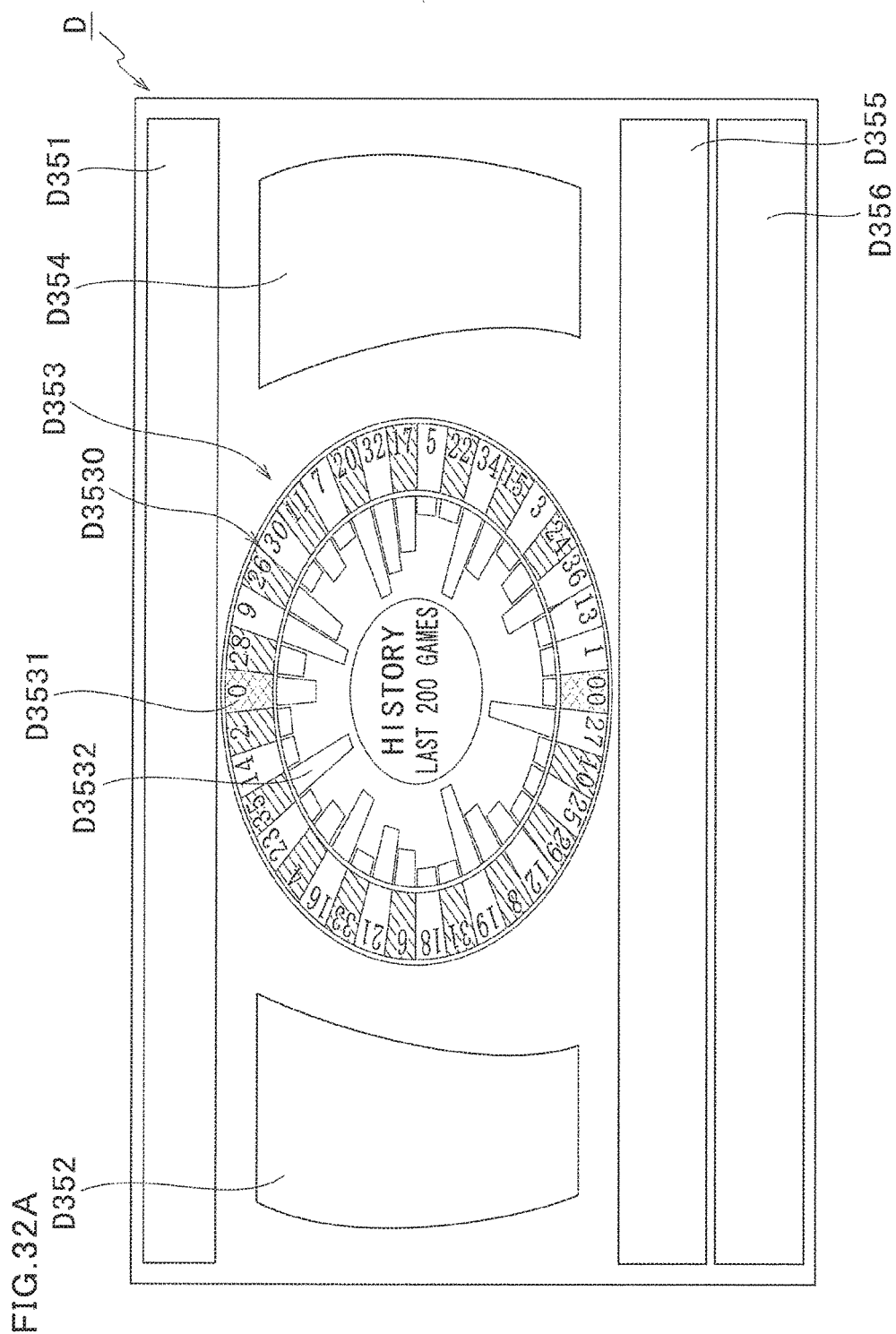

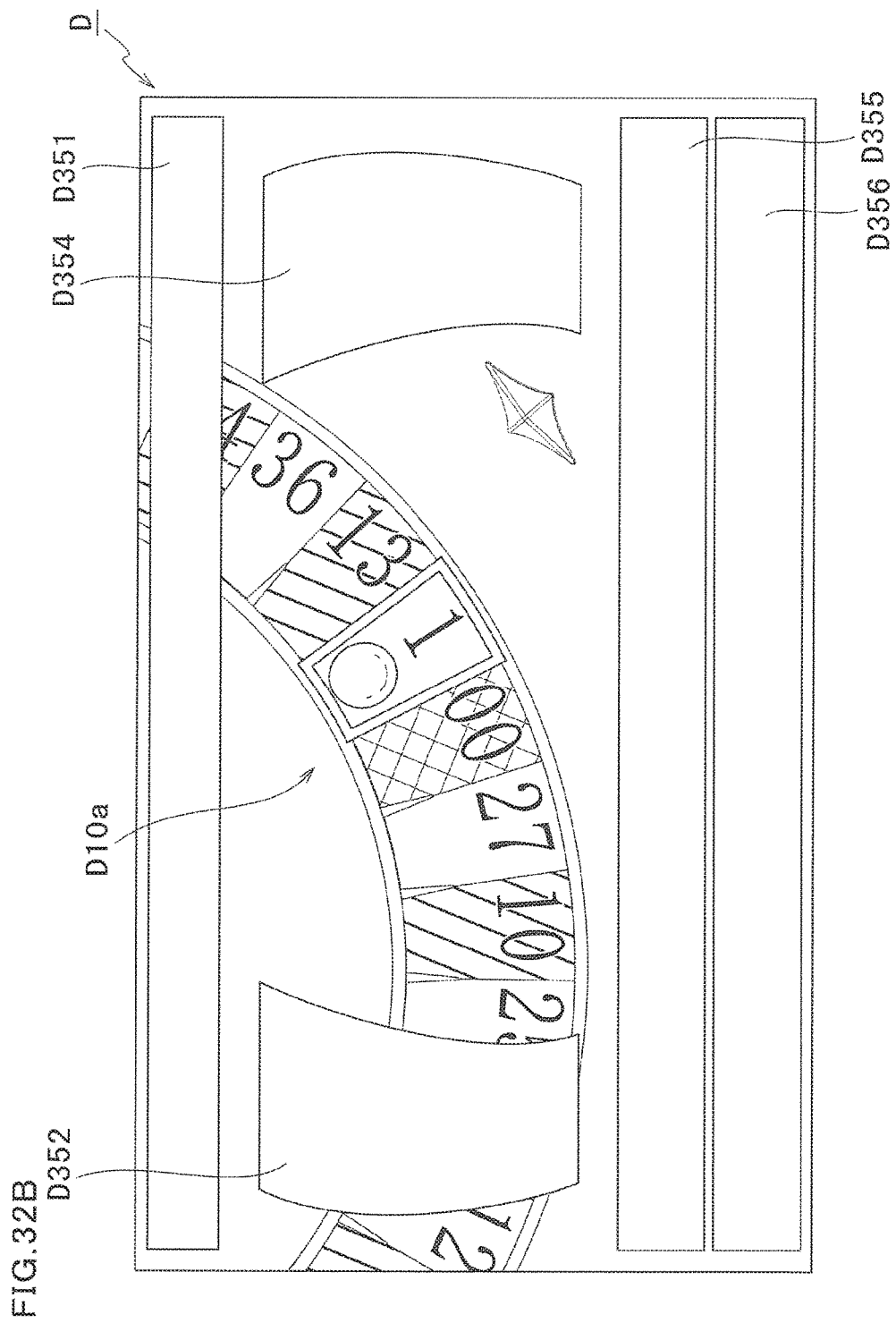

| MEGA JACKPOT | HK$3000.44 |
| MAJOR JACKPOT | HK$300.02 |
| MINI JACKPOT | HK$30.22 |

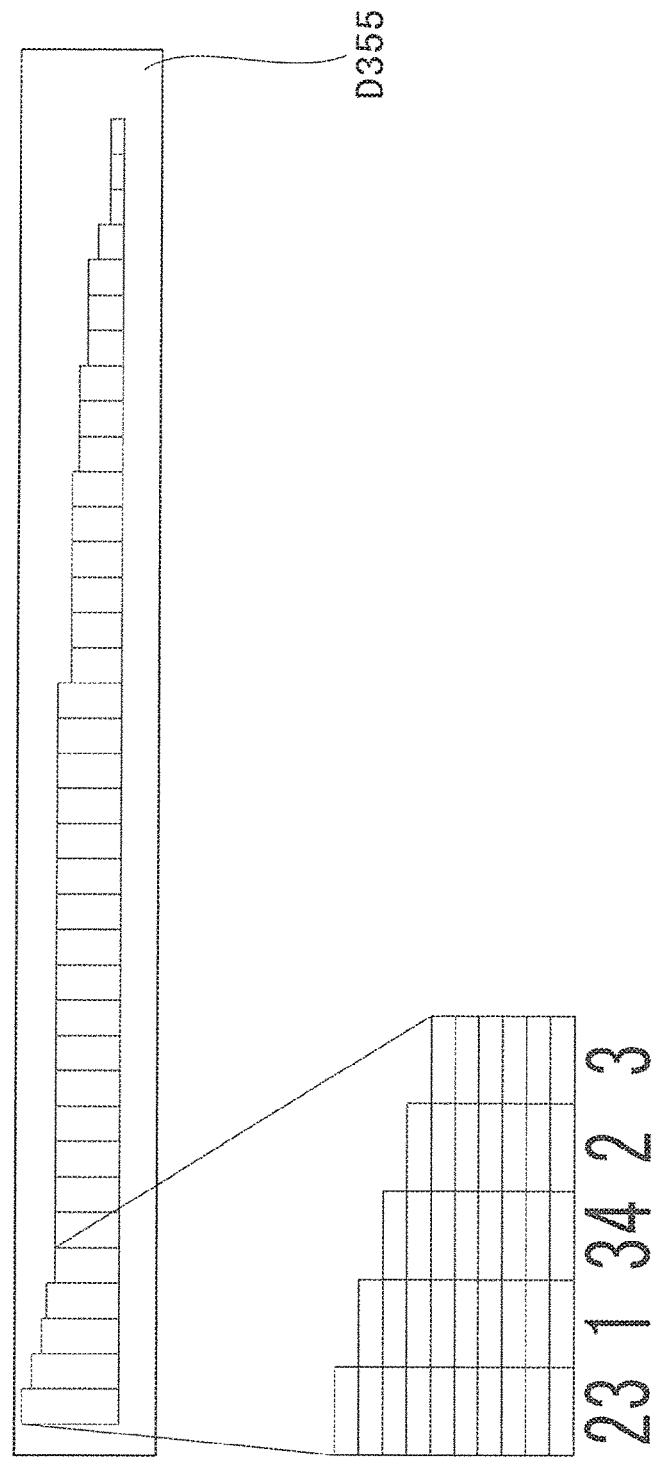

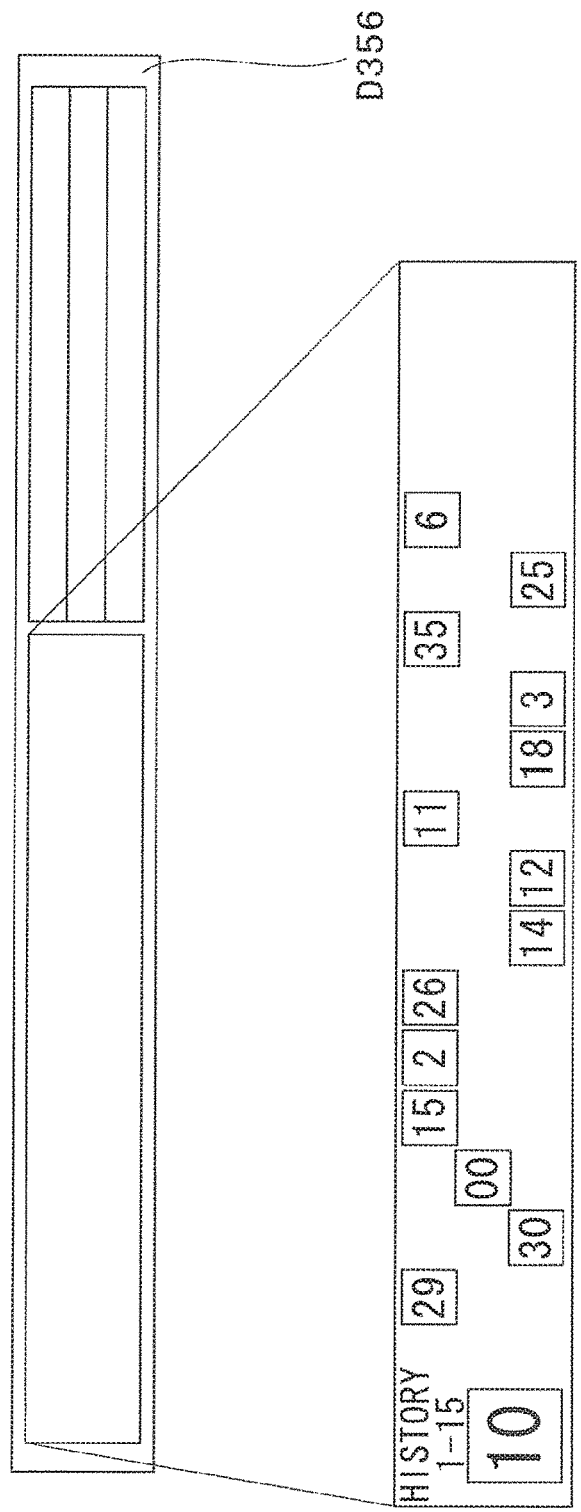

FIG.34A

| No. | FALLING START POSITION | FALLING ANGLE | CONTACT WITH CAT'S EYE 1 | AFTER CONTACT WITH CAT'S EYE 1 |
|---|---|---|---|---|
| 1 | A | 45° | 0 | FORWARD TRAVEL |
| 2 | B | 50° | ① | BACKWARD TRAVEL |
| 3 | C | 55° | ② | |
| 4 | D | 60° | ③ | |
| 5 | E | 65° | ④ | |
| 6 | F | 68° | ⑤ | |
| 7 | G | 71° | ⑥ | |
| 8 | H | 74° | ⑦ | |
| 9 | I | 77° | ⑧ | |
| 10 | J | 79° | ⑨ | |
| 11 | K | 81° | ⑩ | |
| 12 | L | 82° | | |
| 13 | M | 83° | | |
| 14 | N | 84° | | |
| 15 | O | 85° | | |
| 16 | P | | | |
| 17 | Q | | | |
| 18 | R | | | |
| 19 | S | | | |
| 20 | T | | | |
| 21 | | | | |
| BRANCH FREQUENCY | 20 | 15 | 11 | 2 |
| NOTES | | *MAXIMUM FALLING ANGLE IS ADJUSTED IN ACCORDANCE WITH SIZE OF WHEEL | *④ AND ⑤ ARE NOT APPLICABLE WHEN FALLING ANGLE IS EQUAL TO OR LARGER THAN 81° *⑨ AND ⑩ ARE NOT APPLICABLE WHEN FALLING ANGLE IS EQUAL TO OR SMALLER THAN 50° | *"BACKWARD TRAVELING" WHEN ①, ⑦, ⑧, ⑨, OR ⑩ IS SELECTED AT CONTACT WITH CAT'S EYE 1 *"FORWARD TRAVELING" WHEN ②, ③, ④, ⑤, OR ⑥ IS SELECTED AT CONTACT WITH CAT'S EYE 1 *THIS SELECTION IS NOT PERFORMED WHEN CONTACT WITH CAT'S EYE 1 IS NO (○) |

FIG.34B

| No. | CONTACT WITH CAT'S EYE 2 | AFTER CONTACT WITH CAT'S EYE 2 | | REGION BETWEEN CAT'S EYE AND POCKET | |
|---|---|---|---|---|---|
| | | FORWARD TRAVEL | BACKWARD TRAVEL | I (BACKWARD TRAVEL) | II (GOING STRAIGHT) |
| | | | | | III (BACKWARD TRAVEL) |
| 1 | ○ | | | | |
| 2 | ① | | | | |
| 3 | ② | | | | |
| 4 | ③ | | | | |
| 5 | ④ | | | | |
| 6 | ⑤ | | | | |
| 7 | ⑥ | | | | |
| 8 | ⑦ | | | | |
| 9 | ⑧ | | | | |
| 10 | ⑨ | | | | |
| 11 | ⑩ | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| BRANCH FREQUENCY | 11 | 2 | | 3 | |
| NOTES | | * "BACKWARD TRAVEL" WHEN ①, ⑦, ⑧, ⑨, OR ⑩ IS SELECTED AT CONTACT WITH CAT'S EYE 2<br>* "FORWARD TRAVEL" WHEN ②, ③, ④, ⑤, OR ⑥ IS SELECTED AT CONTACT WITH CAT'S EYE 2<br>* THIS SELECTION IS NOT PERFORMED WHEN CONTACT WITH CAT'S EYE 2 IS NO (○) | | * WHEN THERE IS NO CONTACT WITH CAT'S EYE, ONLY "II" OR "III" IS SELECTABLE<br>* WHEN "FORWARD TRAVEL" IS SELECTED AFTER DIRECTLY PRECEDING CONTACT WITH CAT'S EYE, "II" OR "III" IS SELECTABLE<br>* WHEN "BACKWARD TRAVEL" IS SELECTED AFTER DIRECTLY PRECEDING CONTACT WITH CAT'S EYE, "I" OR "II" IS SELECTABLE | |

FIG.36A

|    | 1st |   |   |   | 2nd | 3rd |
|----|-----|---|---|---|-----|-----|
|    | 1   | 2 | 3 |   | 5   | 5   |
| 1  | a | a | a | e | — | — |
| 2  | a | a | b | e | — | — |
| 3  | a | a | c | e | — | — |
| 4  | a | a | d |   | f | h |
| 5  | a | a | d |   | g | — |
| 6  | a | a | e | — | — | — |
| 7  | a | b | a | e | — | — |
| 8  | a | b | b | e | — | — |
| 9  | a | b | c | e | — | — |
| 10 | a | b | d |   | f | h |
| 11 | a | b | d |   | g | — |
| 12 | a | b | e | — | — | — |
| 13 | a | c | b | e | — | — |
| 14 | a | c | c | e | — | — |
| 15 | a | c | d |   | f | h |
| 16 | a | c | d |   | g | — |
| 17 | a | c | e | — | — | — |
| 18 | a | d |   |   | f | h |
| 19 | a | d |   |   | g | — |
| 20 | a | e | — | — | — | — |
| 21 | b | a | a | e | — | — |
| 22 | b | a | b | e | — | — |
| 23 | b | a | c | e | — | — |
| 24 | b | a | d |   | f | h |
| 25 | b | a | d |   | g | — |
| 26 | b | a | e | — | — | — |
| 27 | b | b | a | e | — | — |
| 28 | b | b | b | e | — | — |
| 29 | b | b | c | e | — | — |
| 30 | b | b | d |   | f | h |
| 31 | b | b | d |   | g | — |
| 32 | b | b | e | — | — | — |
| 33 | b | c | b | e | — | — |
| 34 | b | c | c | e | — | — |
| 35 | b | c | d |   | f | h |
| 36 | b | c | d |   | g | — |

FIG.36B

|    | 1st |   |   |   | 2nd | 3rd |
|----|-----|---|---|---|-----|-----|
|    | 1   | 2 | 3 |   | 5   | 5   |
| 37 | b | c | e | — | — | — |
| 38 | b | d |   |   | f | h |
| 39 | b | d |   |   | g | — |
| 40 | b | e | — | — | — | — |
| 41 | c | b | a | e | — | — |
| 42 | c | b | b | e | — | — |
| 43 | c | b | c | e | — | — |
| 44 | c | b | d |   | f | h |
| 45 | c | b | d |   | g | — |
| 46 | c | b | e | — | — | — |
| 47 | c | c | b | e | — | — |
| 48 | c | c | c | e | — | — |
| 49 | c | c | d |   | f | h |
| 50 | c | c | d |   | g | — |
| 51 | c | c | e | — | — | — |
| 52 | c | d |   |   | f | h |
| 53 | c | d |   |   | g | — |
| 54 | c | e | — | — | — | — |
| 55 | d |   |   |   | f | h |
| 56 | d |   |   |   | g | — |
| 57 | e | — | — | — | — | — |

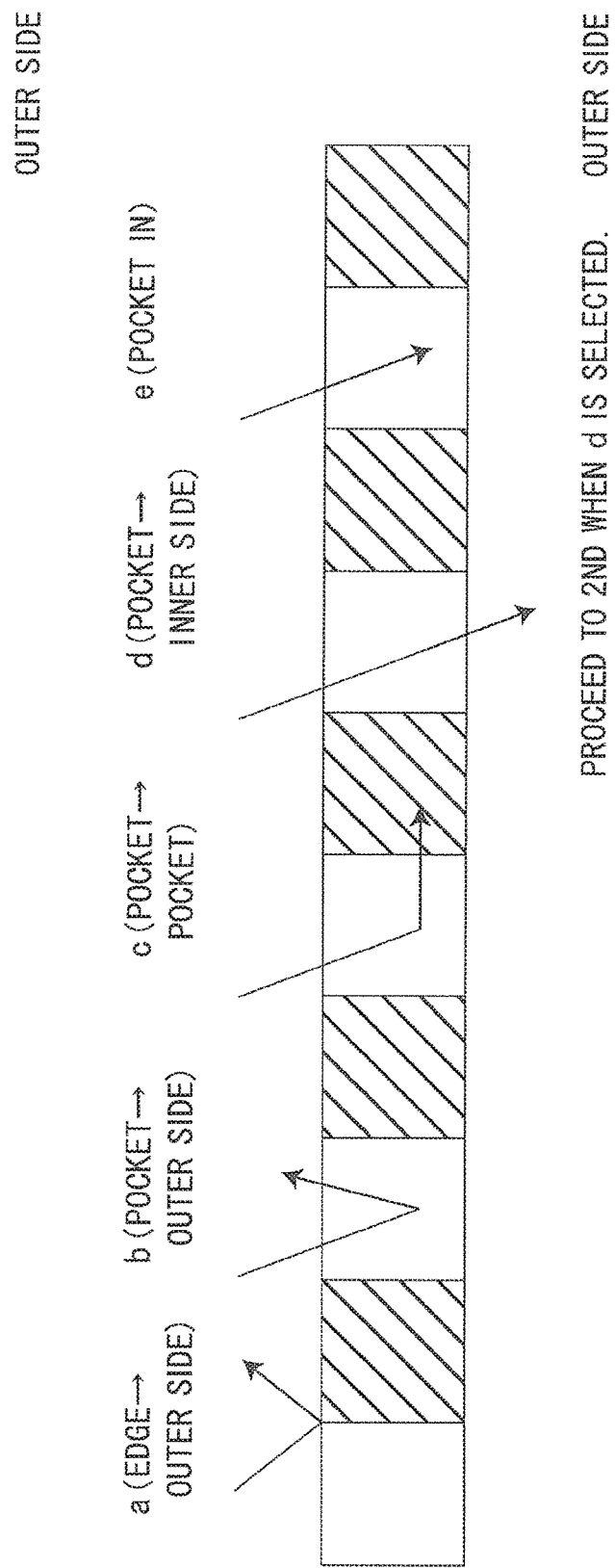

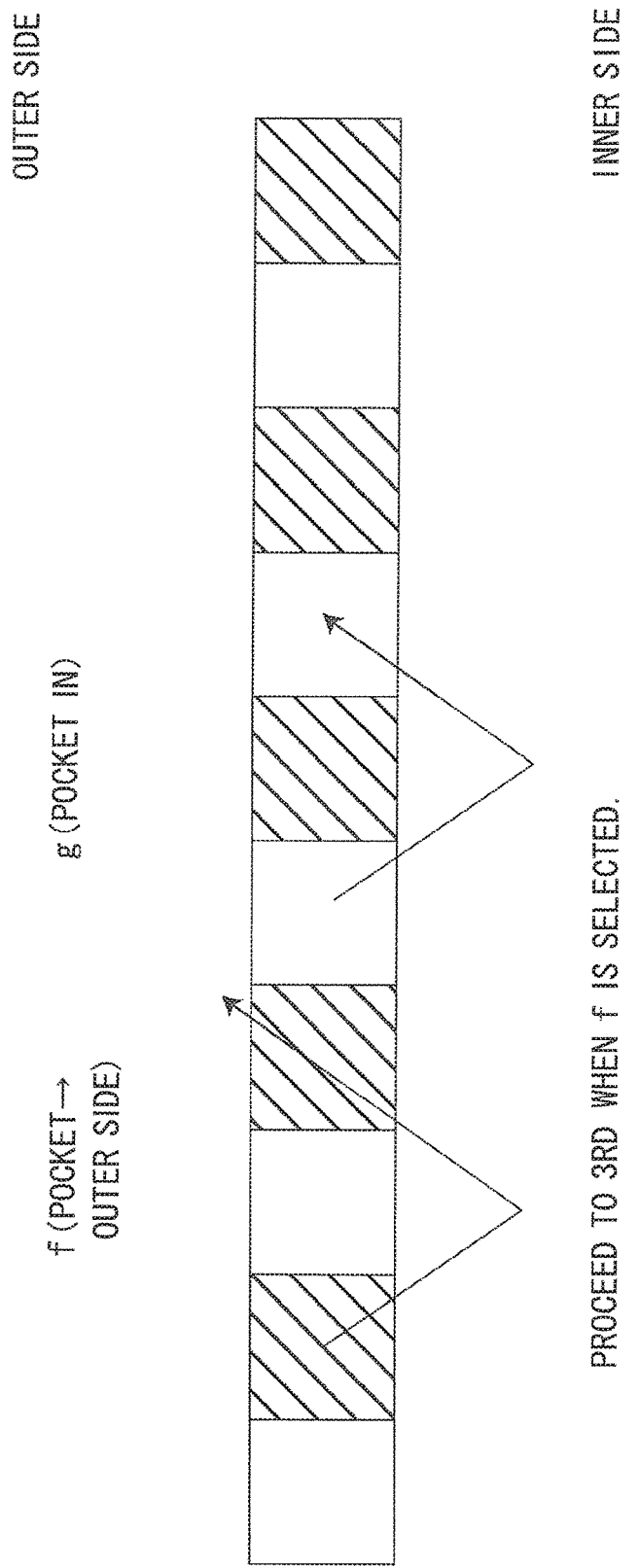

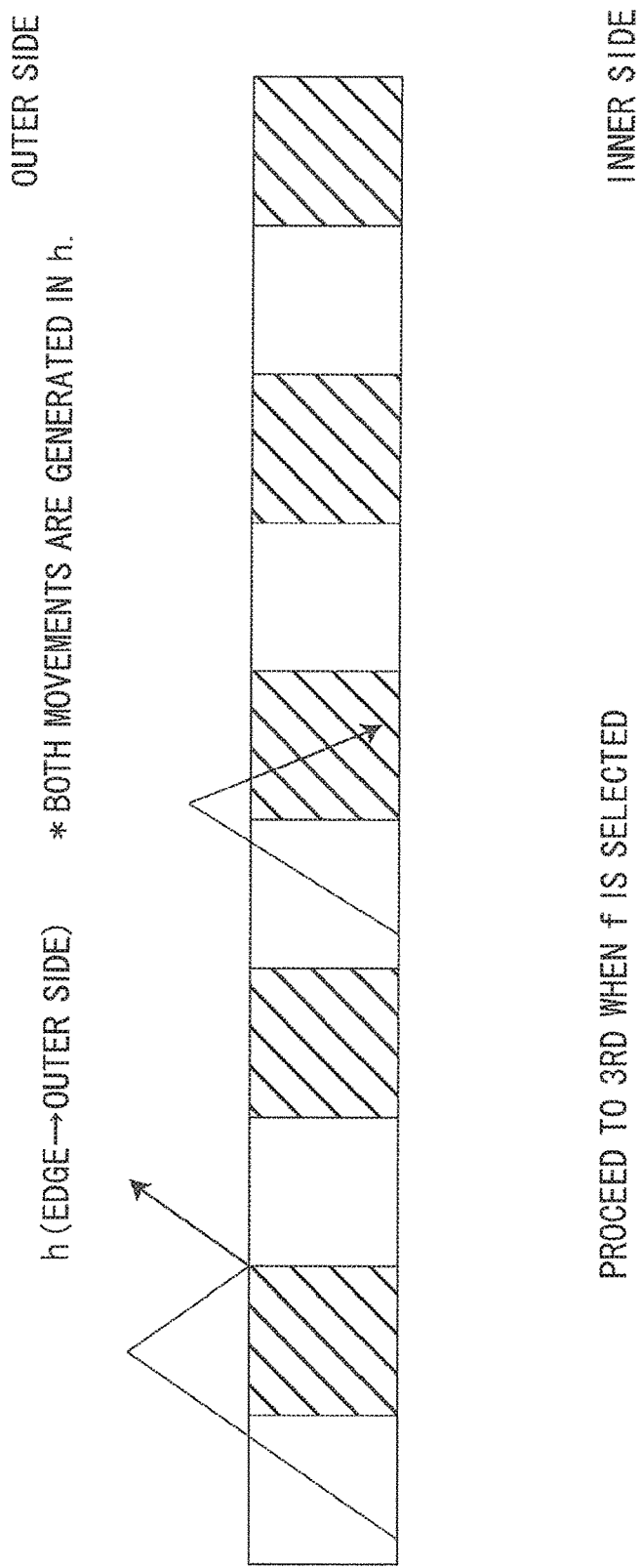

FIG.38A

BALL MOVEMENT 1ST PATTERN a

|    | MOVING DISTANCE | SIZE OF CURVATURE | SPEED |
|----|----|----|----|
| 01 | -5 | LARGE | NORMAL |
| 02 | -3 | MIDDLE | QUICK |
| 03 | -1 | MIDDLE | NORMAL |
| 04 | 1 | MIDDLE | NORMAL |
| 05 | 3 | SMALL | NORMAL |
| 06 | 6 | MIDDLE | NORMAL |
| 07 | 9 | MIDDLE | NORMAL |

FIG.38B

BALL MOVEMENT 1ST PATTERN b          INSIDE POCKET

|    | MOVING DISTANCE | SIZE OF CURVATURE | SPEED  | START REPRODUCTION① | NUMBER OF REBOUNDS |
|----|-----------------|-------------------|--------|---------------------|--------------------|
| 01 | -2              | SMALL             | NORMAL | 3                   | 3                  |
| 02 | 1               | MIDDLE            | NORMAL | 3                   | 3                  |
| 03 | 3               | SMALL             | NORMAL | 3                   | 3                  |
| 04 | 5               | SMALL             | QUICK  | 3                   | 3                  |

FIG.38C

BALL MOVEMENT 1ST PATTERN c          INSIDE POCKET

|    | MOVING DISTANCE | SIZE OF CURVATURE | SPEED  | START REPRODUCTION① | NUMBER OF REBOUNDS |
|----|-----------------|-------------------|--------|---------------------|--------------------|
| 01 | -1              | MIDDLE            | NORMAL | 6                   | 1                  |
| 02 | 1               | MIDDLE            | NORMAL | 6                   | 2                  |
| 03 | 2               | SMALL             | QUICK  | 6                   | 2                  |

FIG.38D

BALL MOVEMENT 2ND PATTERN f

|    | MOVING DISTANCE | SIZE OF CURVATURE | SPEED  |
|----|-----------------|-------------------|--------|
| 01 | -4              | MIDDLE            | NORMAL |
| 02 | -2              | SMALL             | NORMAL |
| 03 | 2               | SMALL             | NORMAL |
| 04 | 5               | SMALL             | NORMAL |
| 05 | 7               | MIDDLE            | NORMAL |

FIG.38E

BALL MOVEMENT 2ND PATTERN g

|    | MOVING DISTANCE | SIZE OF CURVATURE | SPEED  |
|----|-----------------|-------------------|--------|
| 01 | -4              | MIDDLE            | NORMAL |
| 02 | -1              |                   | SLOW   |
| 03 | 1               | MIDDLE            | SLOW   |
| 04 | 4               | MIDDLE            | SLOW   |
| 05 | 5               | SMALL             | NORMAL |

FIG.38F

BALL MOVEMENT 3RD PATTERN h                                                                INSIDE POCKET

| | MOVING DISTANCE | SIZE OF CURVATURE | SPEED | MOVING DISTANCE | SIZE OF CURVATURE | SPEED | START REPRODUCTION① | START REPRODUCTION② | NUMBER OF REBOUNDS |
|---|---|---|---|---|---|---|---|---|---|
| 01 | -2 | SMALL | SLOW | -1 | SMALL | SLOW | 1 | 48 | 2 |
| 02 | -1 | SMALL | SLOW | 1 | SMALL | SLOW | 1 | 30 | 2 |
| 03 | 1 | SMALL | SLOW | 1 | SMALL | SLOW | 1 | 26 | 3 |
| 04 | 2 | SMALL | SLOW | 1 | SMALL | SLOW | 1 | 26 | 3 |
| 05 | 3 | SMALL | NORMAL | -1 | SMALL | SLOW | 1 | 31 | 3 |
| 06 | 3 | SMALL | NORMAL | 2 | SMALL | NORMAL | 1 | 31 | 3 |
| 07 | -2 | SMALL | SLOW | - | - | - | 1 | - | 2 |
| 08 | 0 | SMALL | SLOW | - | - | - | 1 | - | 2 |
| 09 | 1 | SMALL | SLOW | - | - | - | 1 | - | 3 |
| 10 | 3 | SMALL | NORMAL | - | - | - | 1 | - | 3 |

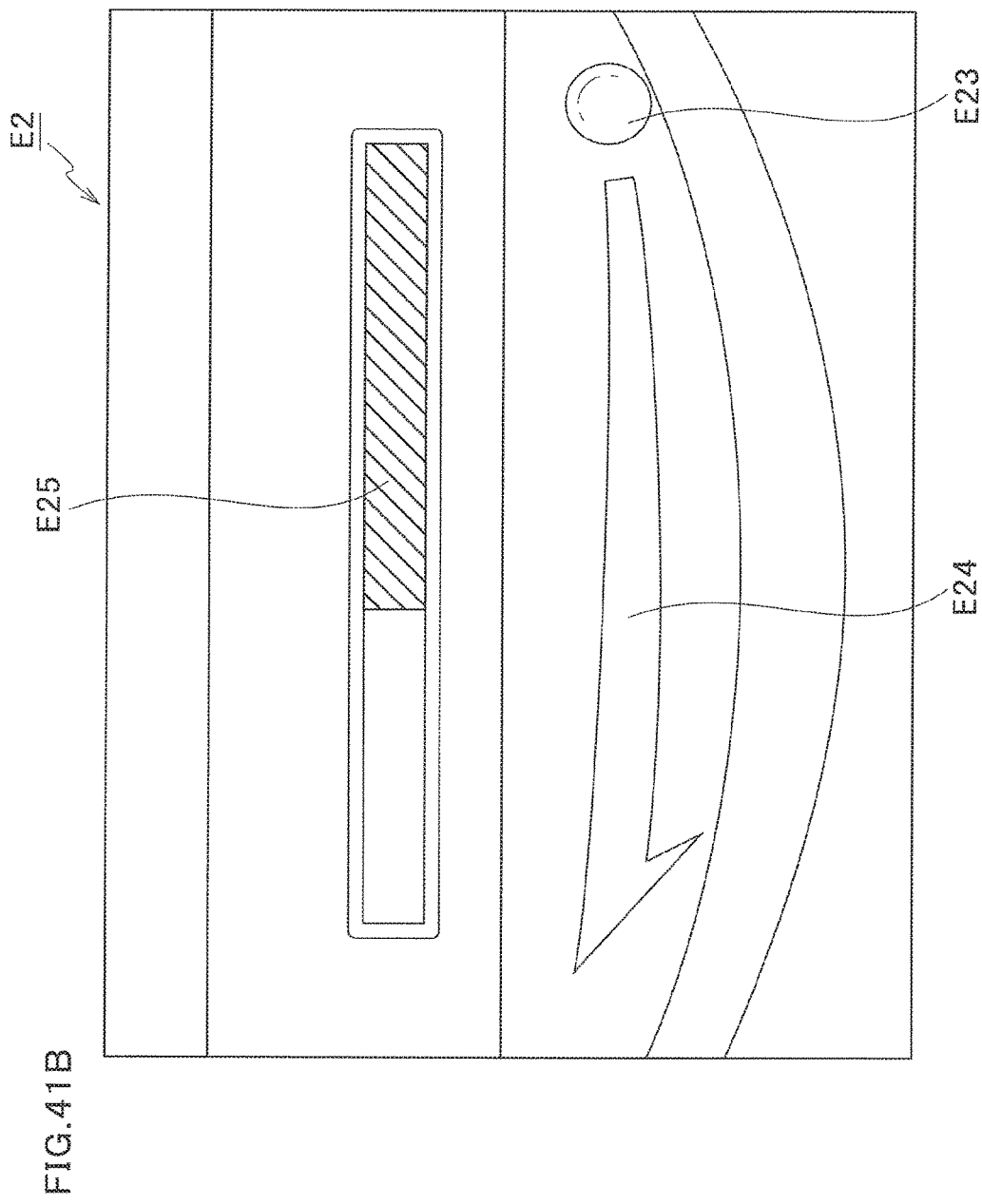

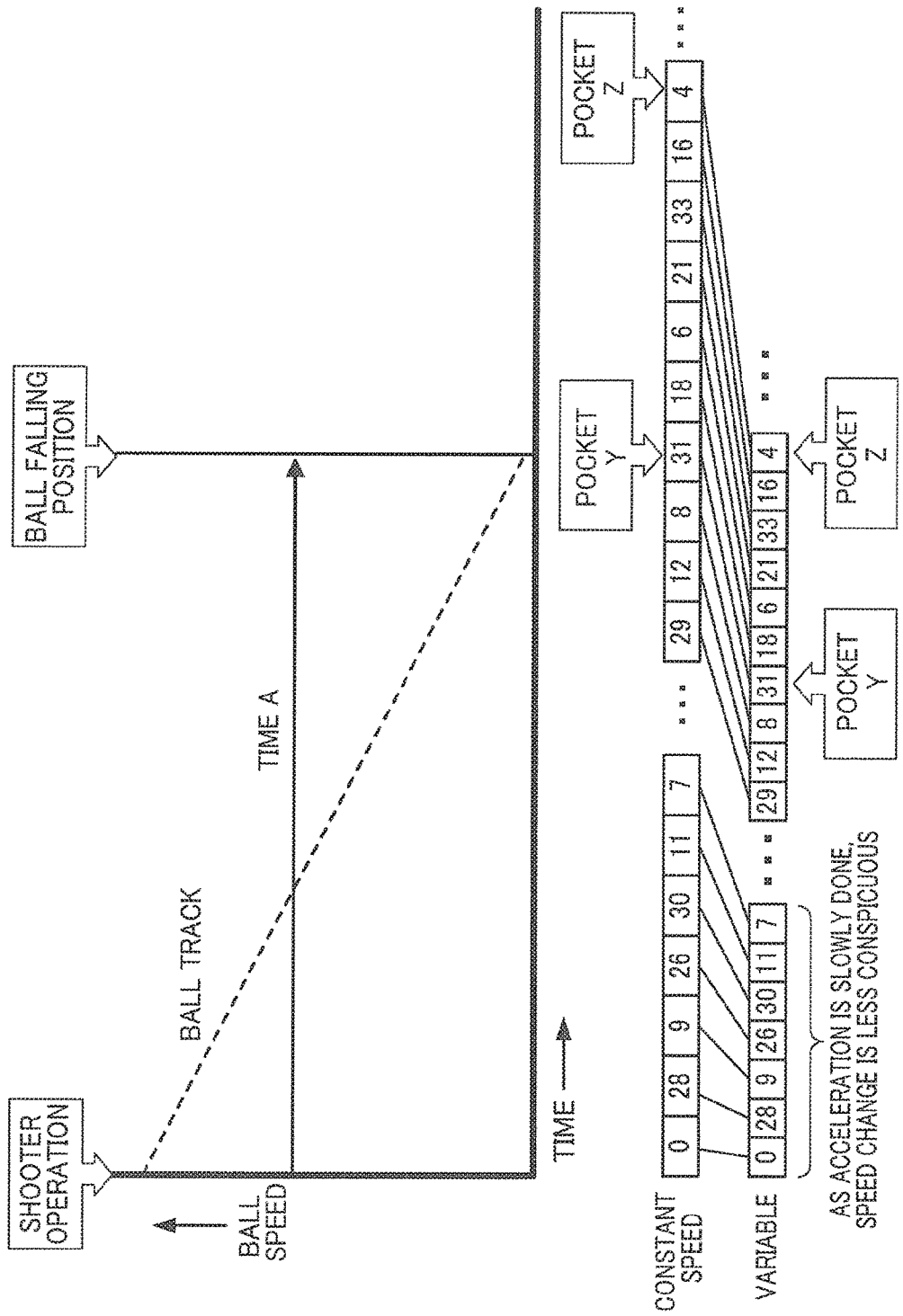

FIG.47

| STATION Err TIMING | RECOVERY TIMING | | | | | | Bet/Credit PROCESS |
|---|---|---|---|---|---|---|---|
| | BET | GAME | RESULT | NEXT BET | NEXT GAME | NEXT RESULT | |
| DURING BET | O | | | | | | CONTINUE GAME WITH SAME BET |
| | | O | | | | | CONTINUE GAME WITH SAME BET |
| | | | O | | | | RESULT PROCESS WITH SAME BET |
| | | | | O | | | AFTER RESULT PROCESS WITH SAME BET, PROCEED TO NEXT BET TIME |
| | | | | | O | | AFTER RESULT PROCESS WITH SAME BET, "PLEASE WAIT" STATE UNTIL NEXT GAME |
| | | | | | | O | AFTER RESULT PROCESS WITH SAME BET, "PLEASE WAIT" STATE UNTIL NEXT GAME |
| DURING GAME | ✕ | O | | | | | CONTINUE GAME WITH SAME BET |
| | ✕ | | O | | | | RESULT PROCESS WITH SAME BET |
| | ✕ | | | O | | | AFTER RESULT PROCESS WITH SAME BET, PROCEED TO NEXT BET TIME |
| | ✕ | | | | O | | AFTER RESULT PROCESS WITH SAME BET, "PLEASE WAIT" STATE UNTIL NEXT GAME |
| | ✕ | | | | | O | AFTER RESULT PROCESS WITH SAME BET, "PLEASE WAIT" STATE UNTIL NEXT GAME |
| DURING RESULT | ✕ | ✕ | O | | | | RESULT PROCESS WITH SAME BET |
| | ✕ | ✕ | | O | | | AFTER RESULT PROCESS WITH SAME BET, PROCEED TO NEXT BET TIME |
| | ✕ | ✕ | | | O | | AFTER RESULT PROCESS WITH SAME BET, "PLEASE WAIT" STATE UNTIL NEXT GAME |
| | ✕ | ✕ | | | | O | AFTER RESULT PROCESS WITH SAME BET, "PLEASE WAIT" STATE UNTIL NEXT GAME |

FIG.48

| MAIN Err TIMING | Bet/Credit PROCESS OF STATION |
|---|---|
| DURING BET | RETURN BET TO PLATER AFTER RETURN TO MAIN |
| DURING GAME | DIFFERENT PROCESS IS EXECUTED DEPENDING ON MAIN SETTING<br>SETTING: BET CANCEL OPTIONS WHEN LOCKUP OCCURS<br>KEEP ALL BETS: AFTER RETURN TO MAIN, PERFORM RESULT PROCESS OF GAME WHERE ERROR OCCURRED<br>CANCEL ALL BETS: AFTER RETURN TO MAIN |
| DURING RESULT | PERFORM RESULT PROCESS OF BETTED GAME AT RETURN |

FIG.49

<POWER UP TEST>

| ITEMS | INITIAL DISPLAY VALUE | DISPLAY VALUES FOR RESPECTIVE CONDITIONS |
|---|---|---|
| PROJECTOR connection test (ADDED TO LOWERMOST STAGE OF ITEMS) | OK | OK:CONNECTION TEST OK<br>NG:CONNECTION TEST NG |
|  |  |  |

FIG.50

<AUDIT>

| ADDED TREE | ERROR NAME |
|---|---|
| MAIN > ERROR METERS > SYSTEM ERRORS (ADDED TO LOWERMOST STAGE OF ITEMS) | PROJECTOR CONNECTION ERROR |
|  |  | ately
GAMING MACHINE AND EFFECT ASSEMBLAGE OF GAMING MACHINE

CROSS-REFERENCE TO RELATED APPLICATION

This application claims the benefit of Japanese Patent Application No. 2015-101284, filed on May 18, 2015, which application is incorporated herein by reference in its entirety.

FIELD OF THE INVENTION

The present invention relates to a gaming machine configured to perform an effect by projecting a game effect image, and an effect assemblage of the gaming machine.

BACKGROUND OF THE INVENTION

Gaming machines for playing various games are installed in a gaming halls such as casino. For example, for a gaming machine in which roulette is played by moving and stopping a roulette ball on a rotating wheel, an arrangement in which operations of a roulette mechanism are displayed by images in addition to a roulette mechanism including a real roulette ball and the like has been proposed (U.S. Pat. No. 8,608, 549).

BRIEF SUMMARY OF THE INVENTION

As such, it has been demanded to increase the degree of freedom in effects in games by not only performing effects by mechanically executing games but also allowing players to see game operations as images.

An object of the present invention is therefore to provide a gaming machine and an effect assemblage thereof, which are capable of increasing the degree of freedom in effects in games.

The present invention relates to a gaming machine including: a projection mechanism including a projector configured to emit projection light by which a game effect image is generated; and a projection target mechanism including a projection surface which is configured to generate a three-dimensional structure corresponding to a game content, in combination with the game effect image generated by projection of the projection light.

According to this arrangement, the gaming machine is able to generate various three-dimensional structures by changing the game effect image and the projection surface, with the result that the degree of freedom in the game effects is increased.

In the present invention, the projection target mechanism includes a light-transmitting projection surface protection plate which is provided to entirely cover the projection surface.

According to the arrangement above, as the projection surface protection plate covers the entirety of the projection surface, the occurrence of malfunction due to contact of a foreign matter with the projection surface and the occurrence of cheating caused by access to the inside of the gaming machine through a part of the projection surface.

In the present invention, the projection mechanism includes a light-transmitting light emission port protection plate which is provided to entirely cover a light emission port of the projector, from which the projection light is emitted.

According to this arrangement, as the transparent plate entirely covers the light emission port of the projector, the transparent plate prevents the occurrence of theft or damage of parts, which is due to access to parts such as a lens inside the projector through the light emission port.

In the present invention, in the projection target mechanism, the projection surface is shaped to be a roulette rotating wheel and a central axis of the projection surface is in parallel to an up-down direction, and the projection mechanism is provided above the projection target mechanism and the game effect image generated by the projection light is a roulette wheel surface image.

According to the arrangement above, as a roulette wheel surface image is projected on the projection surface which has a rotating wheel shape, a roulette structure having various designs and operations appears on the projection surface.

In the present invention, in the projection target mechanism, the game effect image generated by the projection light includes a roulette ball image moving in the wheel surface image.

According to the arrangement above, a roulette structure is generated on the projection surface, and a roulette ball with various sizes, shapes, and operations is moved on this roulette structure.

In the present invention, the projection target mechanism includes a contact member which is provided on the projection surface and is configured to change a traveling direction of a roulette ball.

According to this arrangement, because the contact member with a certain shape is provided on the projection surface, the roulette structure formed of the roulette wheel surface image and the projection surface having a rotating wheel shape looks like a real roulette.

The present invention relates to an effect assemblage for a gaming machine, which is configured to display a process of determining win/loss and a result of the win/loss by random movement of an object, the effect assemblage including: a projector configured to project an image; a game field including a non-flat projection surface which is positioned to receive projection light from the projector; a memory configured to store plural types of video data of images projected on the game field from the projector and table data in which the types of the video data are associated with random numbers generatable by a random number generator, respectively; and a controller configured to execute control so as to sample a type of the video data associated with a random number generated based on a predetermined condition and cause the projector to project an image on the projection surface based on the sampled type of the video data.

According to this arrangement, random movement of an object is realized by project an image on the projection surface of the game field from the projector, the effect assemblage has no moving parts. On this account, maintenance and setting change are easily done and various effects are performable.

The effect assemblage for the gaming machine of the present invention is arranged such that, the win/loss is determined based on a stop position of the object, the memory is capable of storing the stop position of the object and the number of times of stop associated with the stop position, as stop position data and number-of-times-of-stop data, respectively, and the controller stores the stop position and the number of times of stop of the object in the memory each time a game is executed, executes, each time the game is executed, a process of calculating a position frequency indicating the number of times of stop with respect to the total number of times of execution of the game for each stop position, based on the stop position data and the number-of-times-of-stop data stored in the memory, and displays the position frequency in the form of an image, in association with the stop position of the object.

According to the arrangement above, as an image of the position frequency indicating the number of times of stop with respect to the total number of times of execution of the game is displayed in association with the stop position of the object each time the game is executed, the diversity of the effects is further enhanced.

The present invention relates to an effect assemblage for a gaming machine, which is configured to display a process of determining win/loss and a result of the win/loss based on a roulette pocket corresponding to a stop position after random movement of a roulette ball, the effect assemblage including: a projector configured to project an image; a game field including a non-flat projection surface which is positioned to receive projection light from the projector; a memory configured to store plural types of video data of images of the roulette ball and the roulette rotating wheel, which are projected on the game field from the projector, and table data in which the types of the video data are associated with random numbers generatable by a random number generator, the memory being capable of storing a stop position of an object and the number of times of stop associated with the stop position, as stop position data and number-of-times-of-stop data, respectively; and a controller configured to execute control so as to sample a type of the video data associated with a random number generated based on a predetermined condition and cause the projector to project an image on the projection surface based on the sampled type of the video data, store the stop position and the number of times of stop of the roulette ball in the memory each time a game is executed, execute, each time the game is executed, a process of calculating a position frequency indicating the number of times of stop with respect to the total number of times of execution of the game for each stop position, based on the stop position data and the number-of-times-of-stop data stored in the memory, and display the position frequency in the form of an image, in association with the roulette pocket at the stop position in the roulette.

According to the arrangement above, as an image of the position frequency indicating the number of times of stop with respect to the total number of times of execution of the game is displayed in association with the roulette pocket of the roulette at the stop position each time the game is executed, the diversity of the effects is further enhanced.

According to the present invention, the degree of freedom in the effects in the game is improved.

BRIEF DESCRIPTION OF THE DRAWINGS

FIG. 22 shows a basic sequence of a normal game and a JP game.
FIG. 24A illustrates a timing chart of the normal game.
FIG. 30D is an example of the game effect image projected on the projection target mechanism.

FIG. 32A is an example of the game effect image displayed on the display device.

FIG. 32B is an example of the game effect image displayed on the display device.

FIG. 33A is an example of the game effect image displayed on the display device.

FIG. 33D is an example of the game effect image displayed on the display device.

FIG. 33F is an example of the game effect image displayed on the display device.

FIG. 34A illustrates a first movement locus determination table.

FIG. 34B illustrates the first movement locus determination table.

FIG. 36A shows a second movement locus determination table.

FIG. 36B shows the second movement locus determination table.

FIG. 37A illustrates an example of trajectories set in the second movement locus determination table.

FIG. 37B illustrates an example of trajectories set in the second movement locus determination table.

FIG. 37C illustrates an example of trajectories set in the second movement locus determination table.

FIG. 38A illustrates patterns of trajectory elements set in the second movement locus determination table.

FIG. 38B illustrates patterns of trajectory elements set in the second movement locus determination table.

FIG. 38C illustrates patterns of trajectory elements set in the second movement locus determination table.

FIG. 38D illustrates patterns of trajectory elements set in the second movement locus determination table.

FIG. 38E illustrates patterns of trajectory elements set in the second movement locus determination table.

FIG. 38F illustrates patterns of trajectory elements set in the second movement locus determination table.

FIG. 41B illustrates an example of the game effect image displayed on the terminal display.

FIG. 44B illustrates a speed change of a wheel.

FIG. 47 illustrates an operation at each timing of recovery from an error in the gaming terminal.

FIG. 48 illustrates an operation performed for the gaming terminal when an error occurs in the effect assemblage.

FIG. 49 illustrates settings of test for connection with a projector A1 when powered on.

FIG. 50 illustrates settings of an error regarding the connection test in a setting screen.

DETAILED DESCRIPTION OF THE PREFERRED EMBODIMENT (Gaming Machine 1: Outline)

Figure 1:
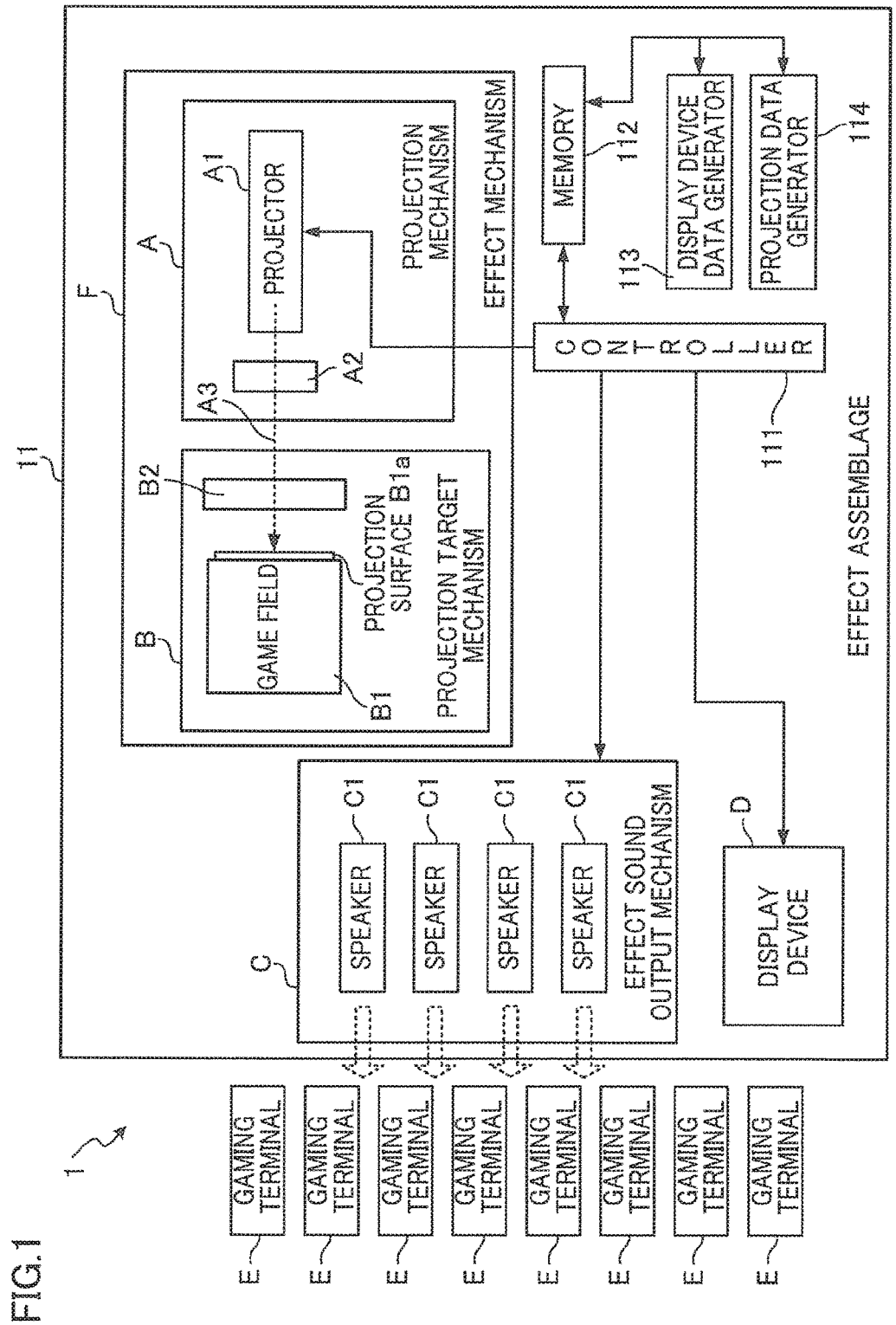
FIG. 1 is a block diagram of a gaming machine.

The following will describe a gaming machine 1 of the present invention with reference to figures. As shown in FIG. 1, the gaming machine 1 includes an effect assemblage 11 configured to execute effects and gaming terminals E which allow players to play games while viewing effects executed by the effect assemblage 11.

The effect assemblage 11 includes an effect mechanism F which is configured to execute a game effect involving movement of an object. The effect mechanism F includes a projection mechanism A and a projection target mechanism B. The projection mechanism A includes a projector A1 which is configured to emit projection light A3 for a game effect image. The projection target mechanism B includes a game field B1 having a non-flat projection surface B1a on which the projection light A3 is projected.

The projection surface B1a is arranged to allow a three-dimensional structure corresponding to a game content to appear, in combination with a game effect image generated by projecting projection light A3. With this, the gaming machine 1 is able to generate various three-dimensional structures by changing the game effect image and the projection surface B1a, with the result that the degree of freedom in the game effects is increased.

To be more specific, in the gaming machine 1, the effect assemblage 11 includes the projector A1 for projecting images, the game field B1 having the non-flat projection surface B1a which is positioned to receive projection light from the projector A1, a memory 112, and a controller 111. The memory 112 stores plural types of video data of images projected on the game field B1 from the projector A1 and table data in which sets of video data are associated with random numbers generatable by a random number generator, respectively. The controller 111 executes control so as to sample a set of video data corresponding to a random number generated in accordance with a predetermined condition, and project an image based on the set of video data on the projection surface B1a from the projector A1. The effect assemblage 11 therefore has no moving parts, and hence maintenance and setting change are easily done and various effects are performable.

The effect assemblage 11 may be arranged as below. The memory 112 is able to store a stop position of an object and the number of times of stop associated with the stop position, as stop position data and number-of-times-of-stop data, respectively. The controller 111 stores a stop position of an object and the number of times of stop in the memory 112 in each execution of a game. Based on the stop position data and the number-of-times-of-stop data stored in the memory 112, the controller 111 executes, in each execution of the game, a process of calculating a position frequency which indicates the numbers of times of stop with respect to the total number of times of execution of the game in each stop position, and displays, as an image, this position frequency in association with the stop position of the object. The effect assemblage 11 having this arrangement is able to perform a more variety of effects by displaying, in each execution of the game, an image of the position frequency indicating the numbers of times of stop with respect to the total number of times of execution of the game, in association with the stop position of the object.

In addition to the above, the effect assemblage 11 may be presumed to be incorporated in a gaming machine 1 which is configured to display a process of determining win/loss and a result of the win/loss based on a roulette pocket corresponding to the stop position of the roulette ball after random movement. The term "win/loss" in this case indicates that whether a winning is achieved or not depends on how a player places a bet. For example, when the roulette ball stops at the roulette pocket "1", the result is a win for a player who has placed a bet on the area "1" and an area corresponding to "1", and is a loss for a player who has placed a bet on other areas. The phrase "process of determining win/loss" indicates a process in which the roulette ball moves on the rotating wheel and stops at a predetermined roulette pocket.

The memory 112 in the case above stores video data of plural types of roulette balls and a roulette rotating wheel that are images projected on the game field B1 from the projector A1 and table data in which sets of video data are associated with random numbers generatable by the random number generator. Furthermore, the memory 112 is able to store a stop position of the object and the number of times of stop associated with this stop position, as stop position data and number-of-times-of-stop data, respectively.

In addition to the above, the controller 111 executes: control so as to sample a set of video data corresponding to a random number generated in accordance with the predetermined condition and project an image based on the set of video data on the projection surface B1a from the projector A1; in each execution of the game, a process of storing the stop position of the roulette ball and the number of times of stop in the memory 112 in each execution of the game and calculating, in each execution of the game, a position frequency indicating the numbers of times of stop with respect to the total number of times of execution of the game for each stop position, based on the stop position data and the number-of-times-of-stop data stored in the memory 112; and display of this position frequency as an image in association with the roulette pocket which is the stop position in the roulette. The effect assemblage 11 arranged as above is able to perform a further variety of effects, by displaying, in each execution of the game, an image of the position frequency indicating the numbers of times of stop with respect to the total number of times of execution of the game, in association with the roulette pocket which is the stop position in the roulette.

In addition to the above, the projection surface B1a of the projection target mechanism B is shaped as a rotating wheel of roulette. The projection surface B1a is horizontally disposed so that its central axis is in parallel to the up-down direction. The game effect image formed on the projection surface B1a by projecting the projection light A3 is an image of a roulette wheel surface. The height position of the projection surface B1a is determined to allow players around the gaming machine 1 to look down the virtual roulette image. With this arrangement, the projection target mechanism B creates a virtual roulette image identical with a real roulette wheel surface and allows players around the gaming machine 1 to feel as if they play real roulette.

Above the projection target mechanism B, the projection mechanism A for emitting the projection light A3 to the projection surface B1a is provided. The height position of the projection mechanism A is determined not to obstruct a player's line of sight toward the projection surface B1a. In the present embodiment, the projection surface B1a of the projection target mechanism B is horizontally disposed and the projection mechanism A is provided above the projection surface B1a in order to cause the players to feel as if playing real roulette. The disclosure, however, is not limited to this arrangement.

For example, the projection surface B1a may be provided at an upper position (including a position directly above and a position obliquely above), and a virtual roulette image may be generated by applying the projection light A3 from the projection mechanism A provided at a lower position to the projection surface B1a. In this case, the players play games while looking up the virtual roulette image. This arrangement is effective when a large number of players play games with mobile terminals, because the players are positioned at or around a position below a large-sized virtual roulette image.

The projection mechanism A above is provided with a light-transmitting light emission port protection plate A2. The light emission port protection plate A2 is provided to cover the entire surface of the light emission port of the projector A1 from which the projection light A3 is emitted. As the light emission port protection plate A2 entirely covers the light emission port of the projector A1, the light emission port protection plate A2 prevents the occurrence of theft or damage of parts, which is due to access to parts such as a lens inside the projector A1 through the light emission port.

In the meanwhile, the projection target mechanism B is provided with a light-transmitting projection surface protection plate B2. The projection surface protection plate B2 is provided to cover the entirety of the projection surface B1a. As the projection surface protection plate B2 covers the entirety of the projection surface B1a, the occurrence of malfunction due to contact of a foreign matter with the projection surface B1a and the occurrence of cheating caused by access of a human body or an instrument to the inside of the gaming machine 1 through a part of the projection surface B1a.

The game effect image generated by the projection light A3 includes a roulette ball image moving in a wheel surface image. With this arrangement, the projection target mechanism B is able to generate a roulette structure on the projection surface B1a and at the same time move the roulette ball with different sizes, shapes, and movements on the roulette structure.

The effect assemblage 11 further includes an effect sound output mechanism C. The effect sound output mechanism C includes plural speakers C1. These speakers C1 are provided on the outer circumferential side of the effect mechanism F. An output operation of each speaker C1 is controlled by the controller 111. The controller 111 causes the speakers C1 to output effect sound in accordance with the movement of the object, with sound volume corresponding to the positional relation between the object and each speaker C1. The effect sound output mechanism C and the controller 111 cause each speaker C1 to output the effect sound with sound volume based on the positional relation between the object and each speaker C1, when the object moves in the effect mechanism F. With this, the effect sound output mechanism C and the controller 111 express the movement of the object in a three dimensional manner, by means of a change in the volume of the effect sound.

To be more specific, the effect assemblage 11 includes the projector A1 for projecting images, the game field B1 having the non-flat projection surface B1a which is positioned to receive projection light from the projector A1, the effect sound output mechanism C in which the speakers C1 are provided on the outer circumferential side of the game field B1, the memory 112, and the controller 111.

The memory 112 stores plural types of video data of images projected on the game field B1 from the projector A1 and table data in which sets of video data are associated with random numbers generatable by the random number generator, respectively. The memory 112 further stores sound volume data corresponding to the positional relation between the object and each speaker C1. The controller 111 executes control so as to sample a set of video data corresponding to a random number generated in accordance with a predetermined condition and project an image based on the set of video data on the projection surface B1a from the projector A1, specifies the positional relation between the object moving on the projection surface B1a projected based on the set of video data and each speaker C1, each time a predetermined period elapses, reads a set of sound volume data of each speaker C1 corresponding to the specified positional relation from the memory 112, and controls the effect sound output mechanism C so that the effect sound is output from each speaker C1 with the sound volume corresponding to the set of sound volume data.

As described above, in the present embodiment, the non-flat projection surface B1a is positioned to receive projection light from the projector A1. The disclosure, however, is not limited to this arrangement. For example, the projection surface may be flat, or a part of the projection surface may be a flat surface. As such, the projector may project images on a flat projection surface.

Each speaker C1 is arranged so that a speaker surface C1a from which the effect sound is output faces the outer circumferential side. On the outer circumferential side of the speakers C1, gaming terminals E for performing game operations corresponding to a game effect are provided. With this arrangement, a high-pitched component having high rectilinearity in the effect sound output from each speaker C1 efficiently reaches a player at each gaming terminal E.

In addition to the above, the gaming machine 1 is arranged so that images of a single object viewed from different view points can be generated at will. To be more specific, the gaming machine 1 includes: display devices D for displaying game effect images; a memory 112 storing three-dimensional data of an object existing in a three-dimensional space, a projection data generator 114 generating projection data of a game effect image of an object in a three-dimensional space viewed from the position of the projector A1 based on three-dimensional data; a display device data generator 113 generating display device data of a game effect image of the object in the three-dimensional space viewed from a view point different from the projector A1 based on the three-dimensional data; and a controller 111. The controller 111 controls the projector A1 so that the projection light A3 representing the game effect image based on the projection data is emitted, and controls each display device D to display a game effect image based on the display device data.

To be more specific, the gaming machine 1 includes: the projection mechanism A including the projector A1 emitting the projection light A3 forming a game effect image downward; the projection target mechanism B including the projection surface B1a which is horizontally provided below the projector A1 and generates a three-dimensional structure corresponding to a game content in combination with the game effect image formed by projecting the projection light A3; the gaming terminals E provided on the outer circumferential side of the projection target mechanism B and provided for performing game operations corresponding to the game effect image; the display devices D provided above the view point of a player at each gaming terminal E and displaying the game effect images; the memory 112 storing three-dimensional data of a roulette ball and a rotating wheel existing in a three-dimensional space; the projection data generator 114 generating projection data of game effect images of the roulette ball and the rotating wheel when viewed from the projector A1 in a three-dimensional space, based on the three-dimensional data; the display device data generator 113 generating display device data of game effect images of the roulette ball and the rotating wheel when viewed from a view point different from the projector A1 in the three-dimensional space, based on the three-dimensional data; and a controller 111 controlling the projector A1 so that the projection light A3 for generating the game effect image is emitted based on the projection data and controlling the display devices D so that the game effect image is displayed thereon based on the display device data.

In addition to the above, the gaming machine 1 is arranged to display a process of determining win/loss and a result of the win/loss by moving a first object image and a second object image relative to each other and stopping the first object image at a predetermined part of the second object image. The effect assemblage 11 used in the gaming machine 1 arranged in this way includes the effect mechanism F displaying a game effect image including the first object image and the second object image, the memory 112 storing first movement data indicating the movement locus and moving speed of the first object image and second movement data indicating the movement locus and moving speed of the second object image, and the controller 111 executing the following processes (a1) to (a5).

The process (a1) is a process of sampling the first movement data and the second movement data from the memory 112. The process (a2) is a process of moving the first object image and the second object image based on the movement locus and the moving speed indicated by the first movement data and the second movement data sampled in the process (a1). The process (a3) is a process of calculating a timing at which the first object image reaches the end of the movement locus based on the first movement data sampled in the process (a1). The process (a4) is a process of correcting the second movement data sampled in the process (a1) so that a predetermined part of the second object image is matched with the end of the movement locus of the first object image at the timing calculated in the process (a3) at which the first object image reaches the end of the movement locus. The process (a5) is a process of moving the second object image based on the movement locus and the moving speed indicated by the second movement data which has been corrected in the process (a4).

In the effect assemblage 11 arranged as above, because the movement locus and the moving speed of the second object image can be changed over time while the second object image is moving, it is possible to display a game effect of stopping the first object image at a predetermined part of the second object image without causing the player to feel uncomfortable.

In the correction of the second movement data in the process (a4), the controller 111 may set an amount of change per unit time of the moving speed indicated by the second movement data to be equal to or smaller than a predetermined amount. The correction of the second movement data can be easily done in this case, because a state of not causing the player to feel uncomfortable is quantitatively defined by a value, i.e., the predetermined amount.

In addition to the above, the memory 112 may store plural different sets of first movement data, and the controller 111 may randomly sample one of the sets of first movement data in the process (a1). Because in this case the first object image is randomly movable relative to the second object image, the degree of freedom in the effects is improved in regard to the movement of the game effect image.

To be more specific, the gaming machine 1 is arranged to display a process of determining win/loss and a result of the win/loss by randomly moving the roulette ball image relative to the rotating wheel image of the roulette and stopping the roulette ball image at one of pocket images provided at the periphery of the rotating wheel image. The effect assemblage 11 used in the gaming machine 1 arranged in this way includes: the projection mechanism A including the projector A1 emitting the projection light A3 by which game effect images including the roulette ball image and the rotating wheel image are generated; the projection target mechanism B including the projection surface B1a on which a three-dimensional structure corresponding to a roulette board in combination with a game effect image formed by projecting the projection light A3; the memory 112 storing the first movement data indicating the movement locus of the roulette ball image which ends at the periphery of the rotating wheel image and the moving speed of the roulette ball image and the second movement data indicating the rotation speed of the rotating wheel image which rotates about its rotational center; and the controller 111 executing the following processes (b1) to (b7).

The process (b1) is a process of randomly selecting one of pocket images in the rotating wheel image. The process (b2) is a process of sampling the first movement data and the second movement data from the memory 112. The process (b3) is a process of rotating the rotating wheel image based on the rotation speed indicated by the second movement data sampled in the process (b2). The process (b4) is a process of moving the roulette ball image based on the movement locus and the moving speed indicated by the first movement data sampled in the process (b2), after the rotation of the rotating wheel image.

The process (b5) is a process of calculating a timing at which the roulette ball image reaches the end of the movement locus, based on the movement locus and the moving speed indicated by the first movement data sampled in the process (b2). The process (b6) is a process of correcting the rotation speed indicated by the second movement data sampled in the process (b2) so that the pocket image selected in the process (b1) is matched with the end of the movement locus indicated by the first object image at the timing calculated in the process (b5) at which the roulette ball image reaches the end of the movement locus. The process (b7) is a process of rotating the rotating wheel image based on the rotation speed indicated by the second movement data which has been corrected in the process (b6).

In the effect assemblage 11 arranged as above, because the rotation speed of the rotating wheel image can be changed over time while the roulette ball image is moving, it is possible to display a game effect of stopping the roulette ball image at the selected pocket image in the rotating wheel image without causing the player to feel uncomfortable.

(Gaming Machine 1: Mechanical Structure)

Figure 2:
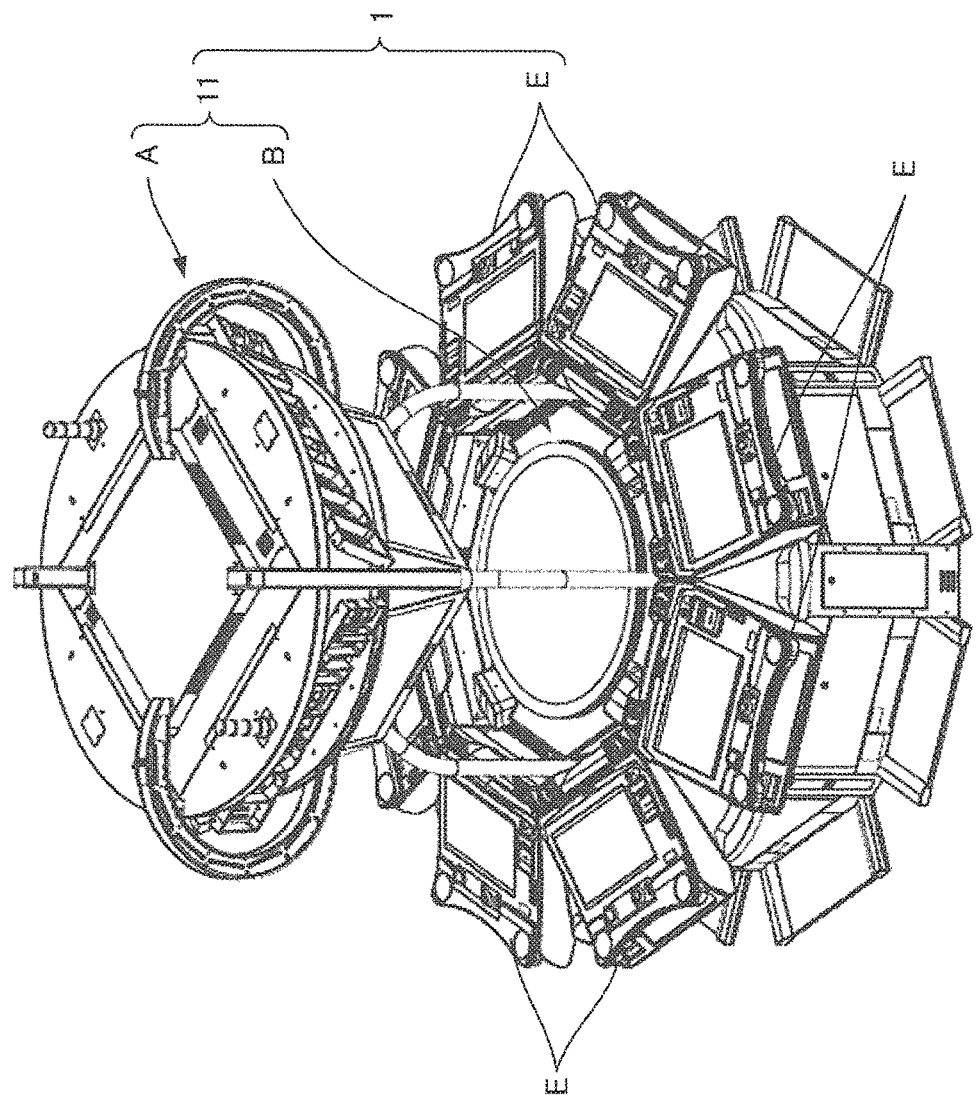
FIG. 2 is a perspective view of the gaming machine.

The following will specifically describe the mechanical structure of the gaming machine 1 with reference to FIG. 2. The gaming machine 1 includes the effect assemblage 11 which executes game effects to be viewable from the outside and the gaming terminals E allowing players to perform game operations. These gaming terminals E are provided around the effect assemblage 11 at regular intervals. Each gaming terminal E is disposed to allow a player to see game effect images.

While the present embodiment describes a case where the gaming machine 1 executes a roulette game and a roulette image is displayed as a game effect image, the disclosure is not limited to this arrangement.

(Gaming Machine 1: Effect Assemblage 11)

Figure 3:
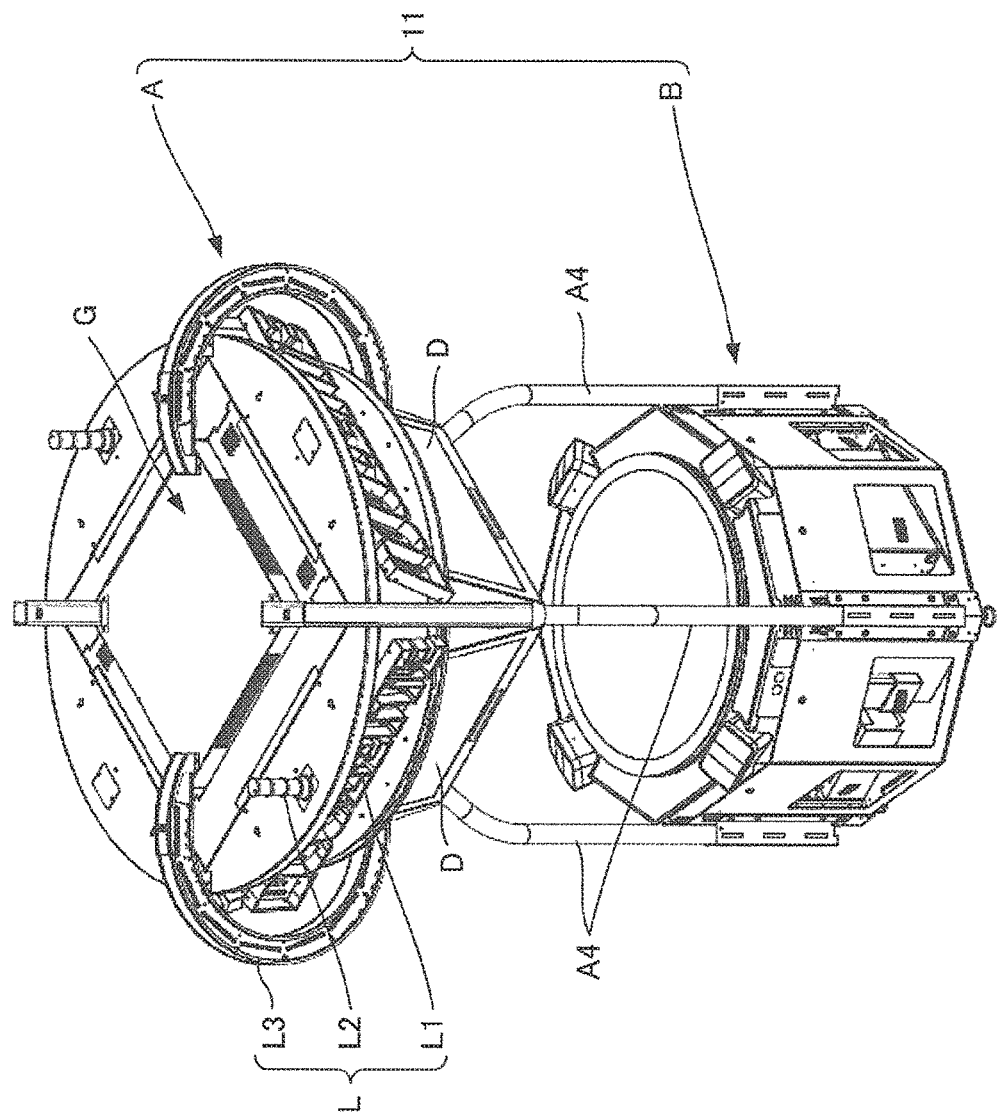
FIG. 3 is a perspective view of an effect assemblage.

As shown in FIG. 3, the effect assemblage 11 includes the projection mechanism A emitting projection light by which a game effect image is generated and the projection target mechanism B on which the projection light is applied from the projection mechanism A. The projection mechanism A and the projection target mechanism B are connected with each other by four arches A4. The positional relation between the projection mechanism A and the projection target mechanism B is such that the projection mechanism A is directly above the projection target mechanism B.

(Gaming Machine 1: Effect Assemblage 11: Projection Mechanism A)

The projection mechanism A includes the four arches A4 described above, the display devices D, signage mechanisms L, and a top base mechanism G. Each arch A4 is disposed so that its central axis is in parallel to the up-down direction. The upper end of each arch is connected with the projection mechanism A, whereas the lower end of each arch is connected with the projection target mechanism B. Each display device D displays various types of information regarding games, and displays the game effect image in a different perspective from the game effect image displayed on the projection target mechanism B. Each signage mechanism L is arranged to be viewable by a person who is at a position remote from the gaming machine 1 in the hall. To achieve this, each signage mechanism L includes a title mechanism L1 for displaying a game title, a tower light L2, and a side ring L3. The top base mechanism G constitutes a top board of the projection mechanism A.

(Gaming Machine 1: Effect Assemblage 11: Projection Mechanism A: Projection Main Body Mechanism H)

Figure 4:
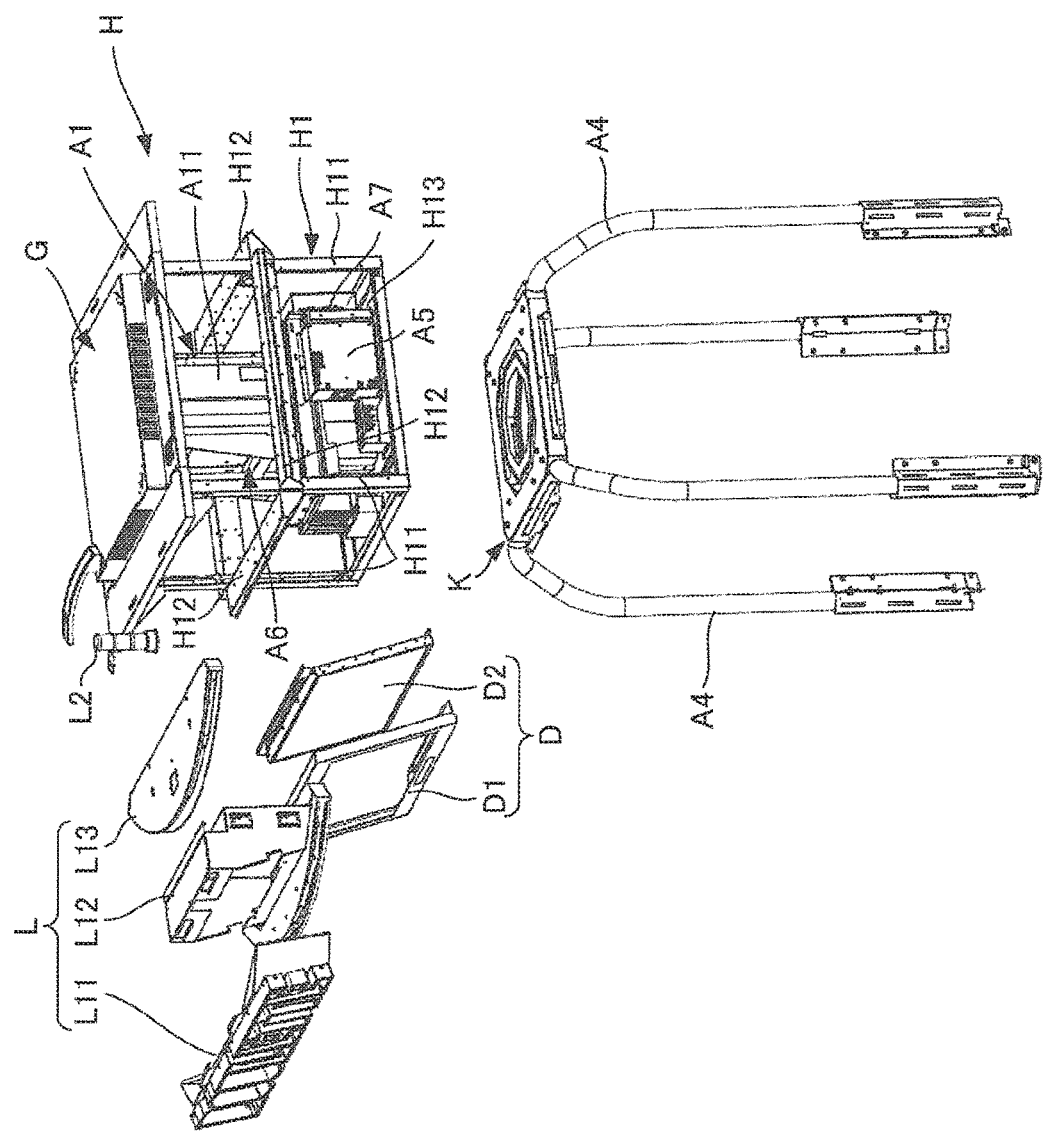
FIG. 4 is an exploded perspective view of a projection main body mechanism.

As shown in FIG. 4, the projection mechanism A further includes a projection main body mechanism H and a light emission port protection mechanism K. The projection main body mechanism H is provided with a cubic frame H1. The frame H1 includes four vertical frame members H11 formed of L beams. The length of these vertical frame members H11 is in parallel to the vertical direction, and the vertical frame members H11 are provided at the respective corners. At the upper ends of the vertical frame members H11, the top base mechanism G which functions as a top board is provided. At intermediate parts of the vertical frame members H11, lateral frame members H12 are provided. The length of each lateral frame member H12 is in parallel to the horizontal direction.

At the lower ends of the vertical frame members H11, a bottom board H13 is provided.

(Gaming Machine 1: Effect Assemblage 11: Projection Mechanism A: Signage Mechanism L)

On each of the front rear, left, and right sides of the frame H1, the signage mechanism L and the display device D are provided. The signage mechanism L is provided between the lateral frame members H12 and the top base mechanism G. The signage mechanism L includes a title display L11 provided with a light emitting member such as LEDs, a display supporting mechanism L12 supporting the vertical frame members H11, and a top plate L13 provided on the top surfaces of the lateral frame members H12. The title display L11 displays a game title in texts so that a person in front of the title display L11 is able to see the game title. To be more specific, a game title "ROULETTE" is formed by the light emitting member such as LEDs.

On the top plate L13, the above-described tower light L2 is provided. The tower light L2 is cylindrical in shape and includes a light source therein. Light emitted from the light source passes the entire side face and goes out from the tower light L2. With this arrangement, the tower light L2 allows a person remote from the gaming machine 1 to easily notice the existence of the gaming machine 1.

(Gaming Machine 1: Effect Assemblage 11: Projection Mechanism A: Display Device D) Below each signage mechanism L, the display device D is provided. The display device D is provided between the lateral frame member H12 and the bottom board H13. The display device D includes a cover member D1 and a display device main body D2 provided on the cover member D1. The display device main body D2 includes a liquid crystal display device. The display device D allows a person in front of the display device D to see the progress of a game and effect images. The display device D is arranged to be able to display game effect images of the roulette ball and the rotating wheel from a view point different from the projector A1 in the three-dimensional space.

(Gaming Machine 1: Effect Assemblage 11: Projection Mechanism A: Projector A1) In the frame H1, the projector A1 emitting projection light to form a game effect image, a power source A5 supplying power to the projector A1, a projector supporting mechanism A6 supporting the projector A1, and various types of control boards A7.

The projector A1 is arranged to emit the projection light downward. The projector A1 includes a projector cabinet A11, a light source employing 3LCD, and an emitting direction adjustor having a lens shifting capability. The light source and the emitting direction adjustor are provided in the projector cabinet A11.

The light source includes three liquid crystal display panels for three primary colors of R (red), G (green), and B (blue), dichroic mirrors by which laser light is split into laser lights of three primary colors, and a prism by which the three primary colors are synthesized. In the projector A1, laser light emitted from a laser diode is split into laser lights of three primary colors by the dichroic mirrors, then the laser lights of three primary colors are caused to pass the liquid crystal panels of the respective colors, the laser lights of three primary colors are synthesized by the prism, and consequentially projection light for forming a game effect image is generated.

The emitting direction adjustor moves the lens that the projection light for forming a game effect image and generated by the light source passes, so as to move a part irradiated by the projection light in any in-plane directions without moving the projector cabinet A11. With this arrangement, the projector A1 is able to highly precisely apply the projection light to a predetermined position of the projection target mechanism B by means of the emitting direction adjustor, even if the light emission port of the light source is not directly above the predetermined position on the projection target mechanism B.

(Gaming Machine 1: Effect Assemblage 11: Projection Mechanism A: Projector Supporting Mechanism A6)

Figure 5:
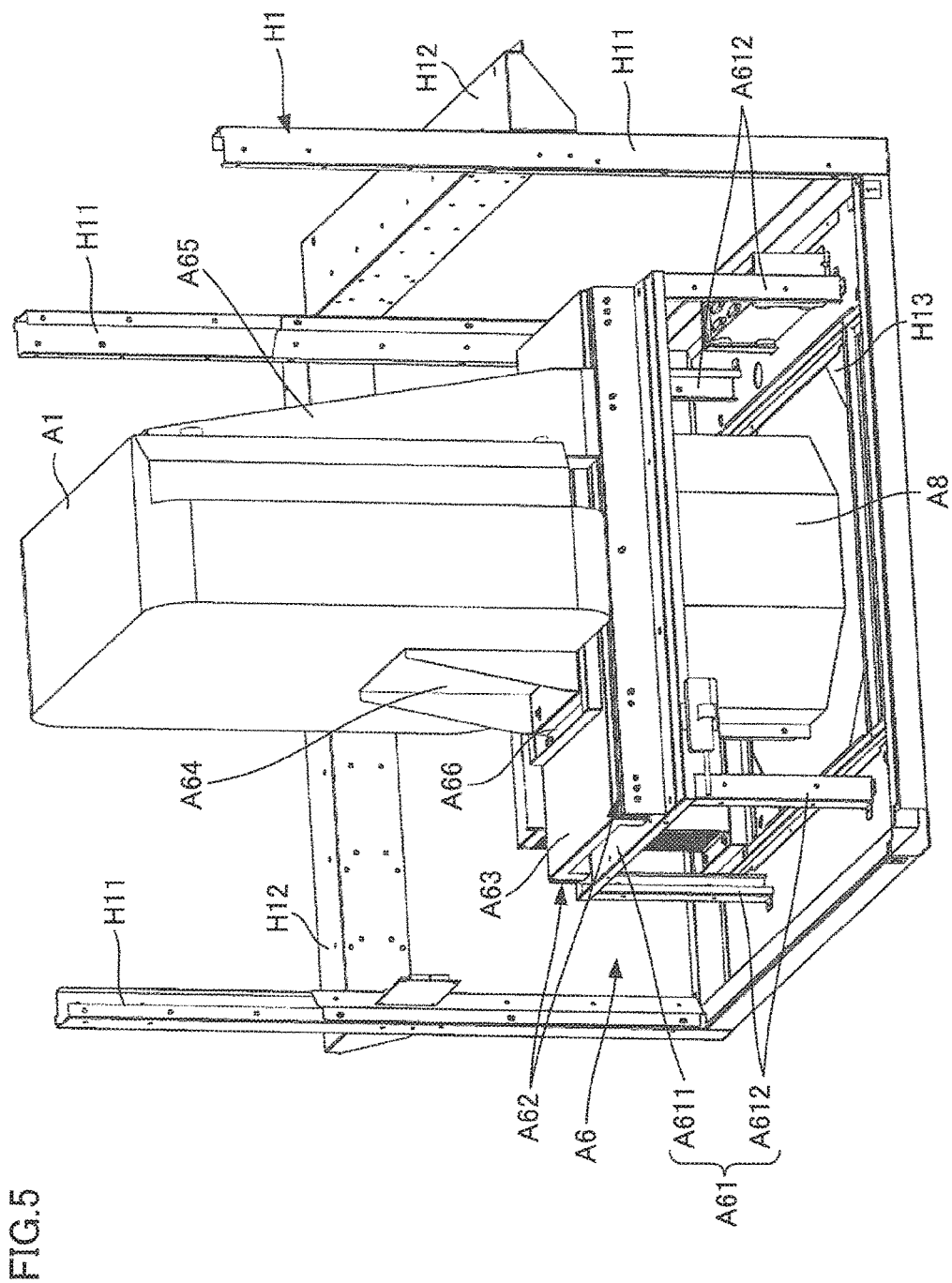
FIG. 5 is a perspective view of the projector supporting mechanism and a projector.

As shown in FIG. 5, the projector A1 is supported by the projector supporting mechanism A6. The projector supporting mechanism A6 includes an intermediate supporting frame body A61, a guide mechanism A62, a projector supporter A63, a first side supporting plate A64, and a second side supporting plate A65.

Figure 6:
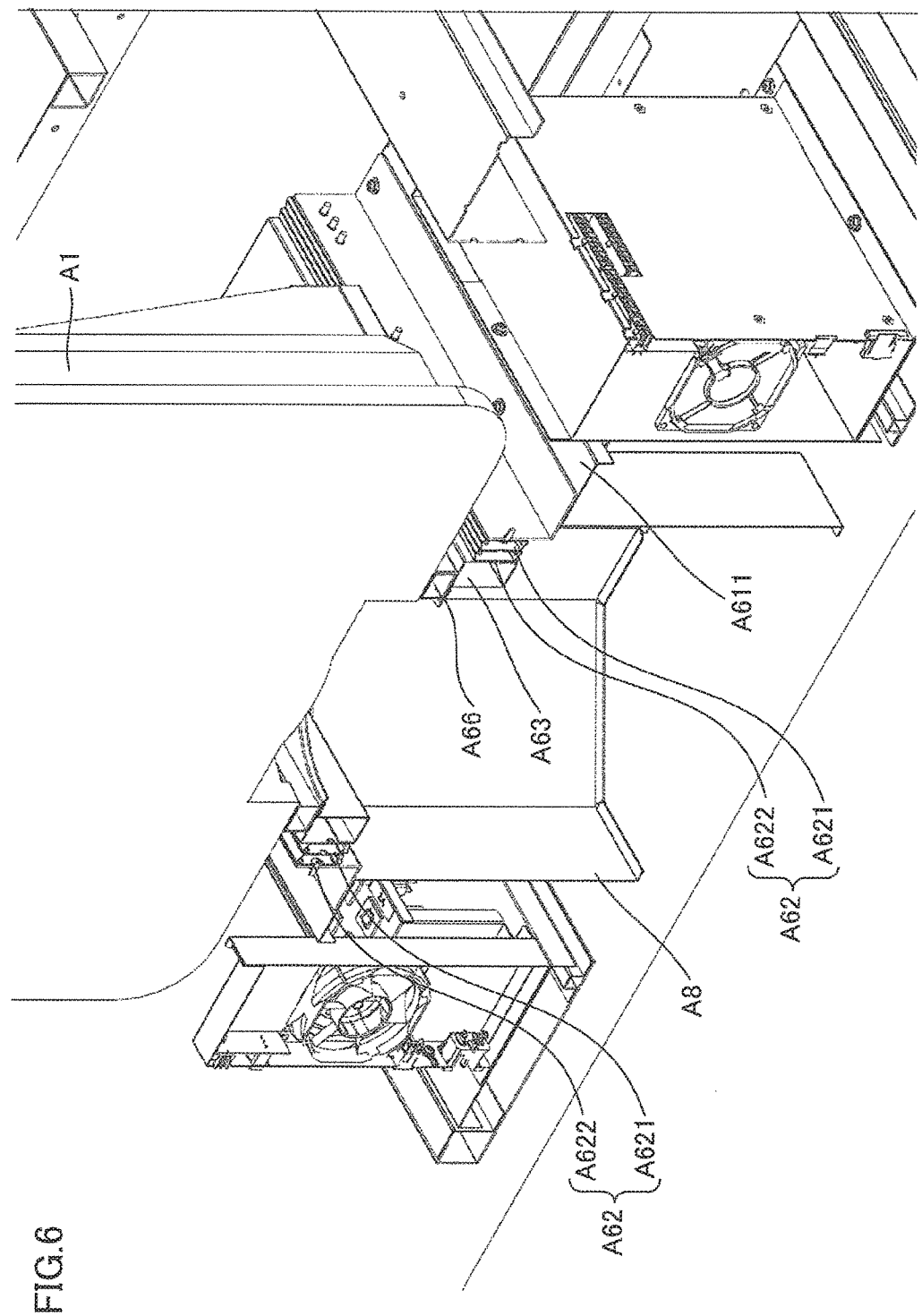
FIG. 6 is a perspective view of a vertical cross section of the projector supporting mechanism and the projector.

The intermediate supporting frame body A61 includes a rectangular supporting flat plate A611 which is horizontally provided and four legs A612 provided at the respective corners of the intermediate supporting frame body A61. On the top surface of the supporting flat plate A611, paired guide mechanisms A62 are provided in a parallel manner. As shown in FIG. 6, each guide mechanism A62 includes a fixed rail A621 horizontally fixed to the supporting flat plate A611 and a movable rail A622 which is internally engaged with each fixed rail A621 to be movable. As shown in FIG. 5, the movable rail A622 is provided with the projector supporter A63. The projector supporter A63 is, on account of the guide mechanisms A62, arranged to be horizontally movable relative to the intermediate supporting frame body A61 and the frame H1.

On the top surface of the projector supporter A63, a projector base A66 is provided. The upper surface of the projector base A66 is connected with a leading end surface on the light emission side of the projector A1 is connected. Furthermore, on the top surface of the projector base A66, the first side supporting plate A64 and the second side supporting plate A65 are provided. Over the projector A1, the first side supporting plate A64 and the second side supporting plate A65 are provided on one side and on the other side in the direction in which the guide mechanisms A62 perform guiding.

The first side supporting plate A64 is in contact with one side face of the projector A1. The second side supporting plate A65 is in contact with the other side face of the projector A1. In this way, the first side supporting plate A64 and the second side supporting plate A65 sandwich the projector A1 from the respective sides. With this arrangement, the first side supporting plate A64 and the second side supporting plate A65 prevent the occurrence of inclination or positional deviation when the movement of the projector A1 by the guide mechanisms A62 in the guiding direction starts or stops.

Figure 7:
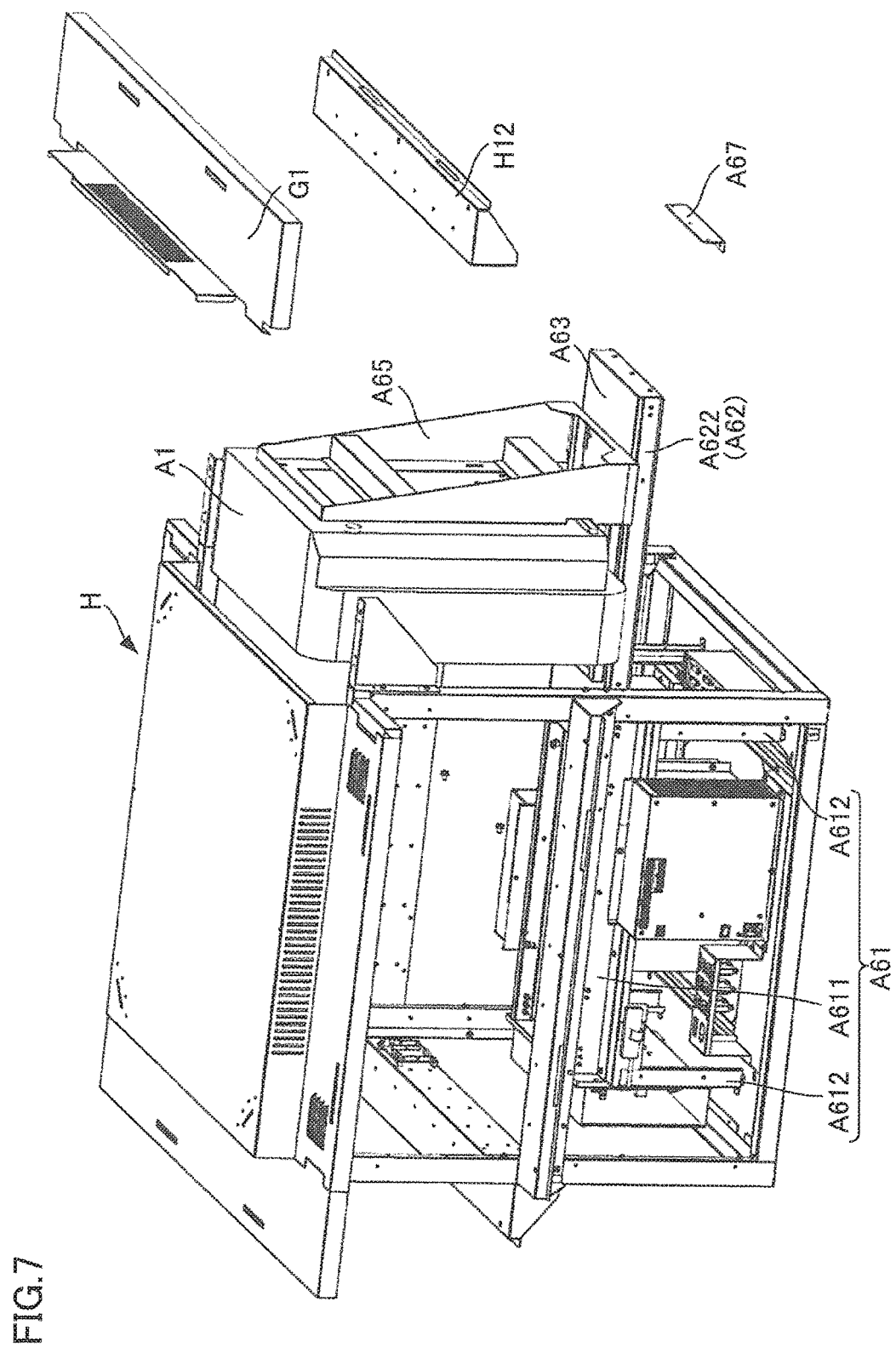
FIG. 7 illustrates a process of detaching the projector from the projection main body mechanism.
Figure 8:
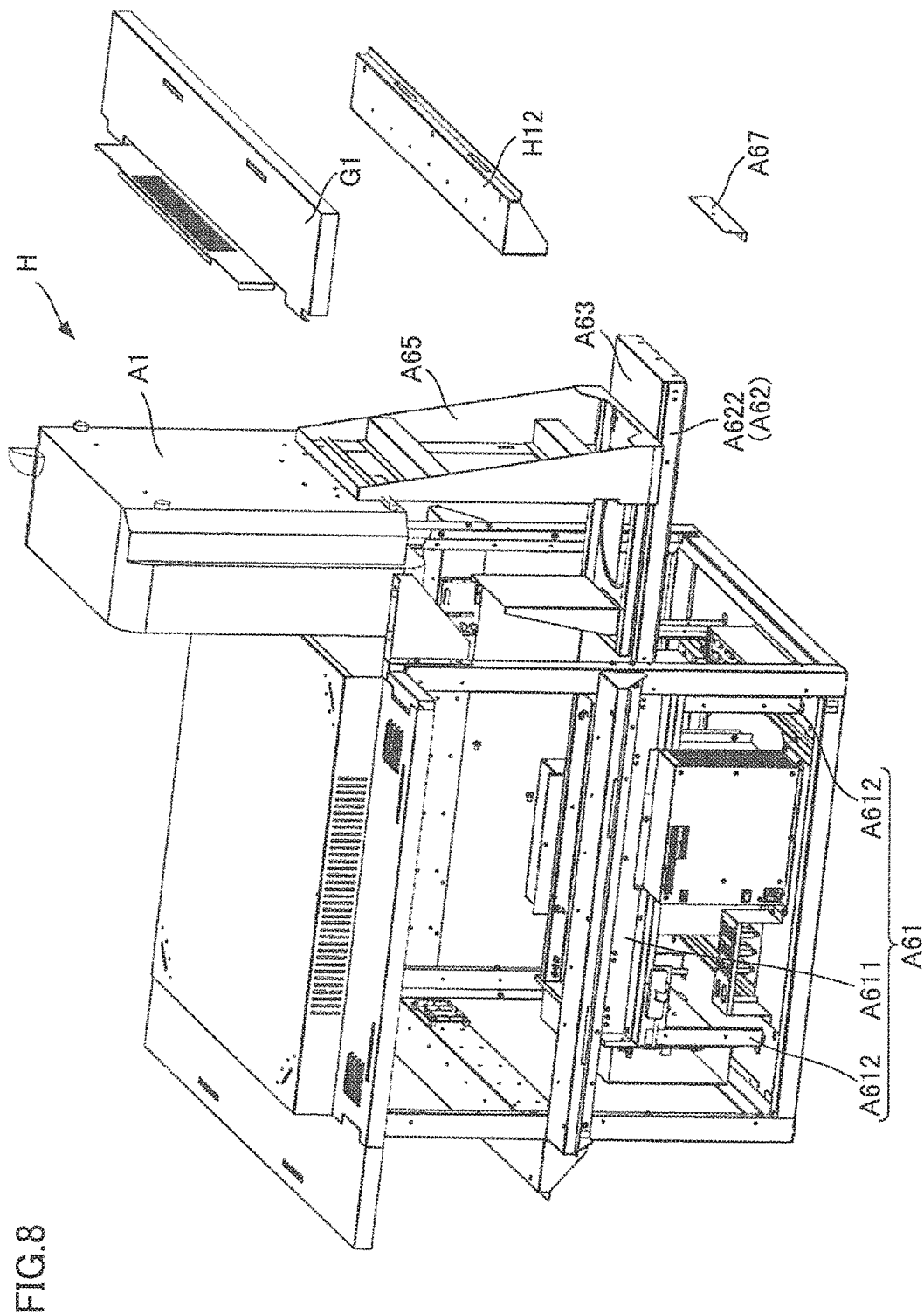
FIG. 8 illustrates a process of detaching the projector from the projection main body mechanism.

As shown in FIG. 7 and FIG. 8, the guide mechanisms A62 prohibit the movement of the movable rail A622 as a side face of the projector supporter A63 is connected with the supporting flat plate A611 of the intermediate supporting frame body A61 by a stopper A67. When the stopper A67 is detached at the time of installation or maintenance of the projector A1, the movable rail A622 of the guide mechanism A62 becomes freely movable.

For example, when the projector A1 is detached from the projection main body mechanism H, the projector A1 is allowed to be movable with respect to the projection main body mechanism H after the stopper A67 is detached. Furthermore, as the lateral frame member H12 and a side member G1 of the top base mechanism G are detached, the movement of the projector A1 becomes no longer obstructed by any member. Thereafter, the projector A1 is horizontally pulled from the projection main body mechanism H, and the space above the projector A1 is opened. The projector A1 is then pulled upward and detached from the projection main body mechanism H. In the meanwhile, when the projector A1 is attached to the projection main body mechanism H, processes reverse to those of detaching the projector A1 are carried out. When the projector A1 is attached or detached, the second side supporting plate A65 may be detached.

Figure 9:
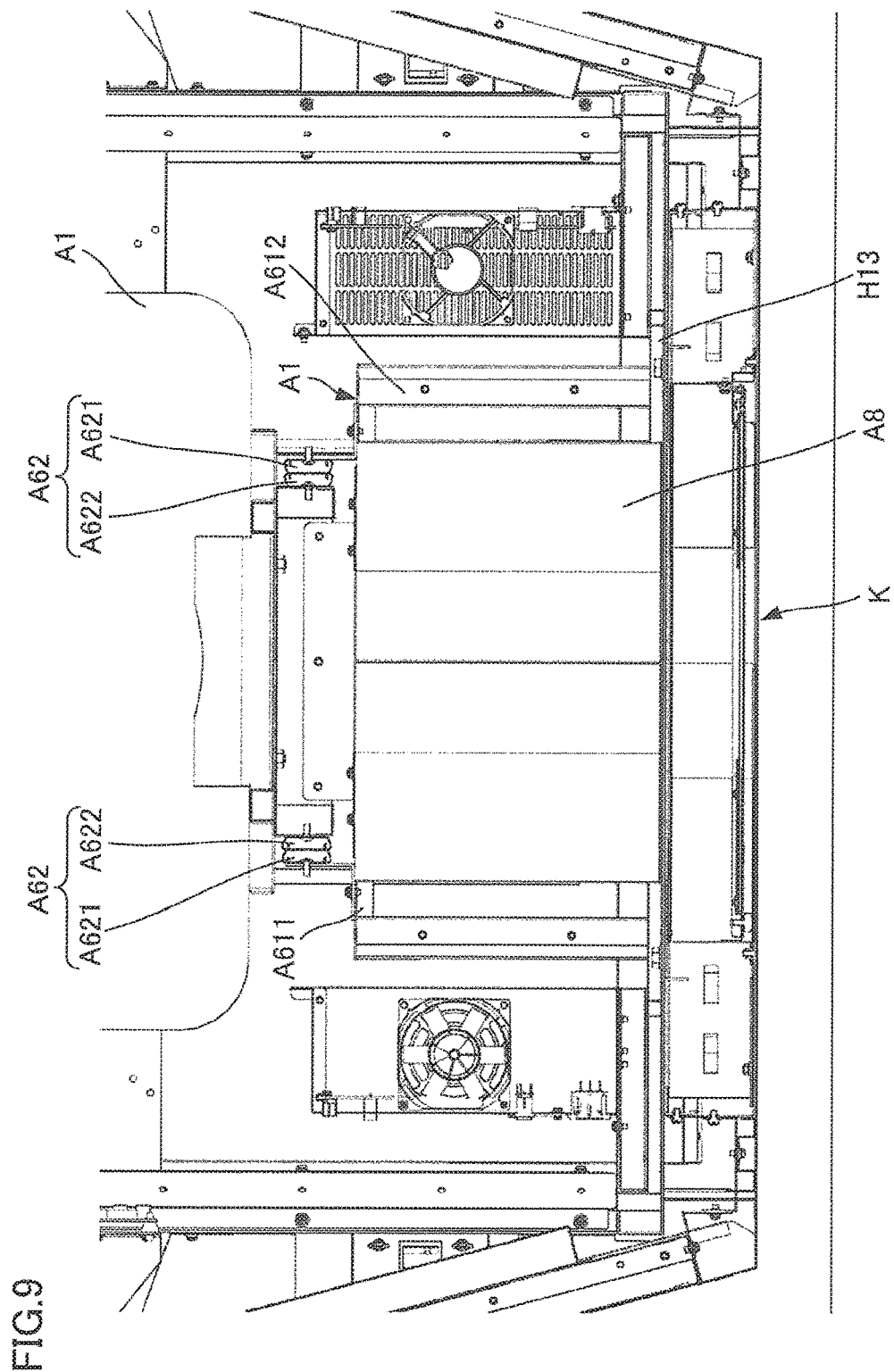
FIG. 9 is a vertical cross section of a light emission port protection mechanism.

As shown in FIG. 9, a cover member A8 is provided below the projector A1. As shown in FIG. 5 and FIG. 6, the cover member A8 is an octagonal cylinder in shape and is open top and bottom. The cover member A8 is connected with the supporting flat plate A611 at the upper edge and is disposed to allow the projection light from the projector A1 to pass from the top face to the bottom face. The bottom face of the cover member A8 is positioned in the vicinity of the top face of the light emission port protection mechanism K.

(Gaming Machine 1: Effect Assemblage 11: Projection Mechanism A: Light Emission Port Protection Mechanism K)

Figure 10:
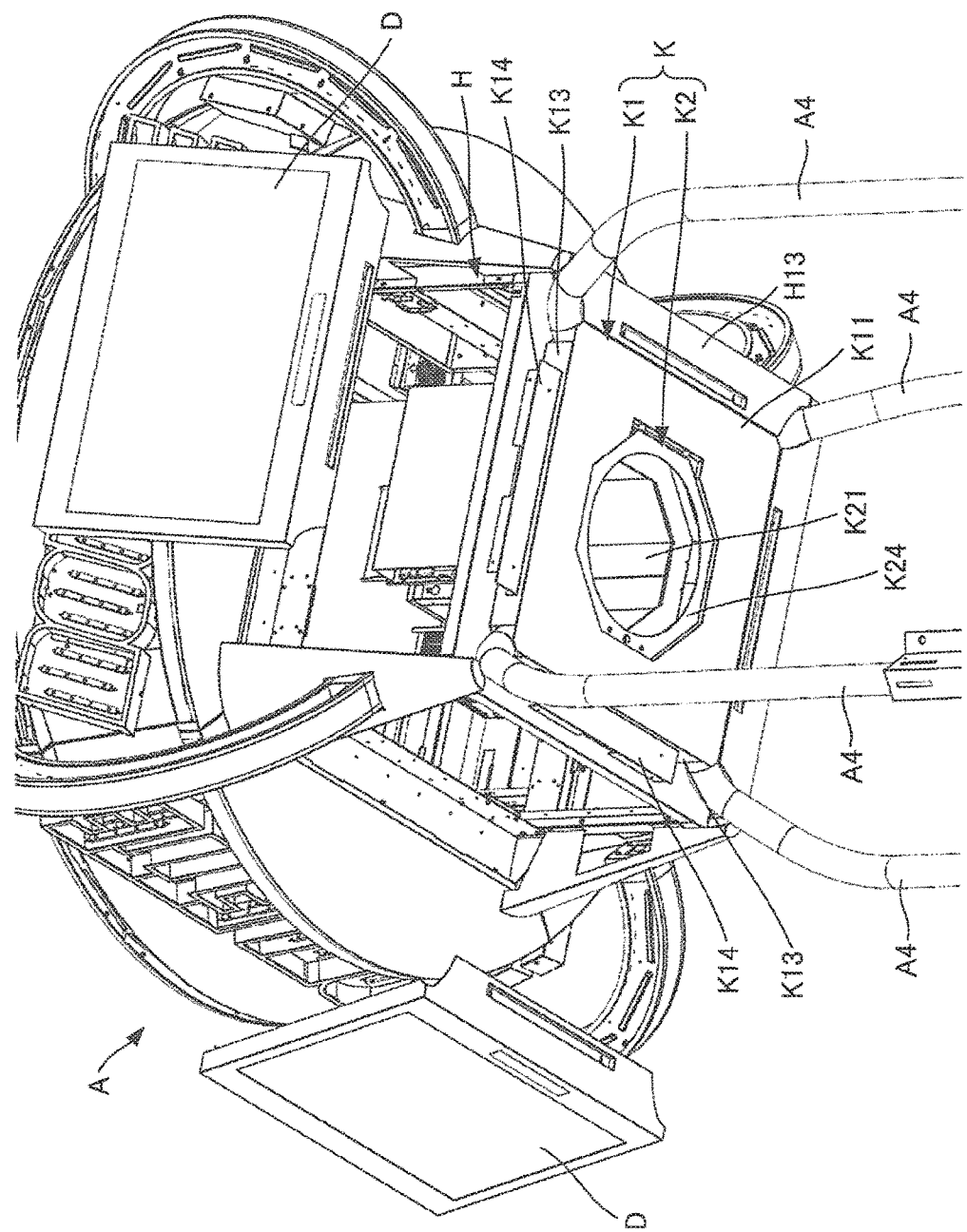
FIG. 10 illustrates a connection relation between the projection main body mechanism and the light emission port protection mechanism.

As shown in FIG. 10, the light emission port protection mechanism K is provided on the bottom surface of the bottom board H13 in the projection main body mechanism H. The light emission port protection mechanism K includes a cover mechanism container K1 having a square top face and a square bottom face and a cover mechanism K2 provided in the cover mechanism container K1. The cover mechanism container K1 includes a bottom plate K11 forming a bottom surface wall and an top plate K12 shown in FIG. 11 forming a top surface wall. A predetermined width in each side of the bottom plate K11 corresponds to a side part K13. The side part K13 is bended upward at a right angle from the bottom plate K11, and the upper side of this side part K13 is connected with the bottom surface of the top plate K12. Each side part K13 is provided with a protruding member K14. The protruding member K14 supports the lower part of the display device D.

Figure 11:
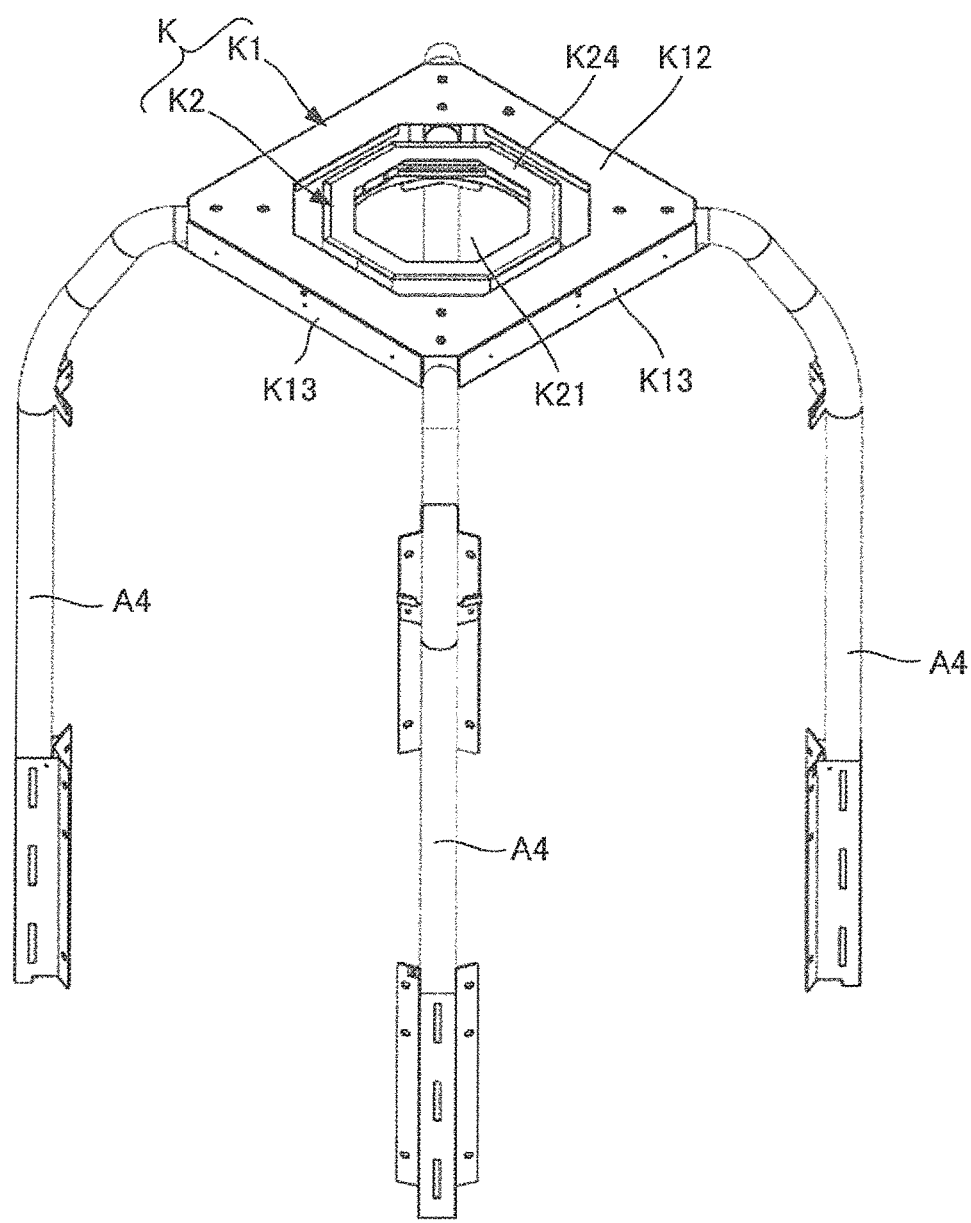
FIG. 11 is a perspective view of the light emission port protection mechanism.

As shown in FIG. 11, at four corners of the cover mechanism container K1, the upper ends of the arches A4 are inserted in and connected with the cover mechanism container K1. At a central portion of the cover mechanism container K1, the cover mechanism K2 is provided. The cover mechanism K2 includes a cover container K24 connected with the cover mechanism container K1 and a cover member K21 provided inside the cover container K24. The cover member K21 is equivalent to the light emission port protection plate A2 shown in FIG. 1.

Figure 12:
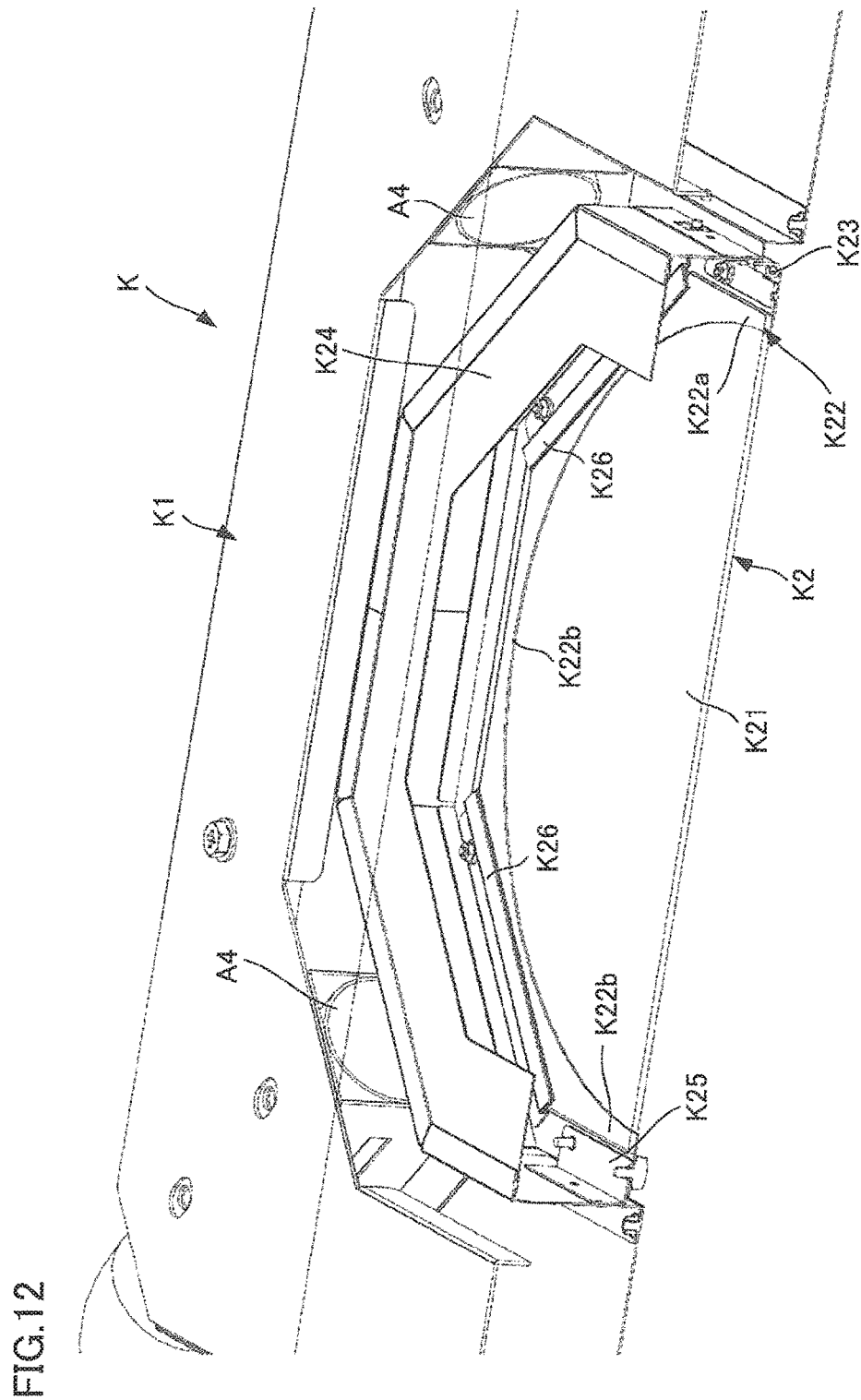
FIG. 12 is a perspective view of a vertical cross section of an important part of the light emission port protection mechanism.

As shown in FIG. 12, the cover member K21 is made of a light transmitting material such as glass and synthetic resin. The cover member K21 is an octagonal thin plate, and is provided at a cover supporting plate K22 having a circular hole K22b. A first side K22a of the cover supporting plate K22 is connected with the cover container K24 to be rotatable by means of a hinge member K23. Furthermore, a second side K22b opposing the first side K22a in the cover supporting plate K22 is detachably connected with the cover container K24 by a fastening member K25.

The cover container K24 is provided with plural contact members K26. The contact members K26 are provided to be able to make contact with the top faces of sides of the cover supporting plate K22, which are different from the first side K22a and the second side K22b. As the contact members K26 are in contact with the top surface of the cover supporting plate K22, the cover supporting plate K22 is horizontally disposed. In other words, in a normal use condition for displaying images, the cover member K21 and the cover supporting plate K22 are horizontally disposed, and as the entire periphery of the cover supporting plate K22 is joined with the cover mechanism container K1 via the cover container K24, the cover member K21 exists on the light path of the projection light emitted from the projector A1.

Figure 13:
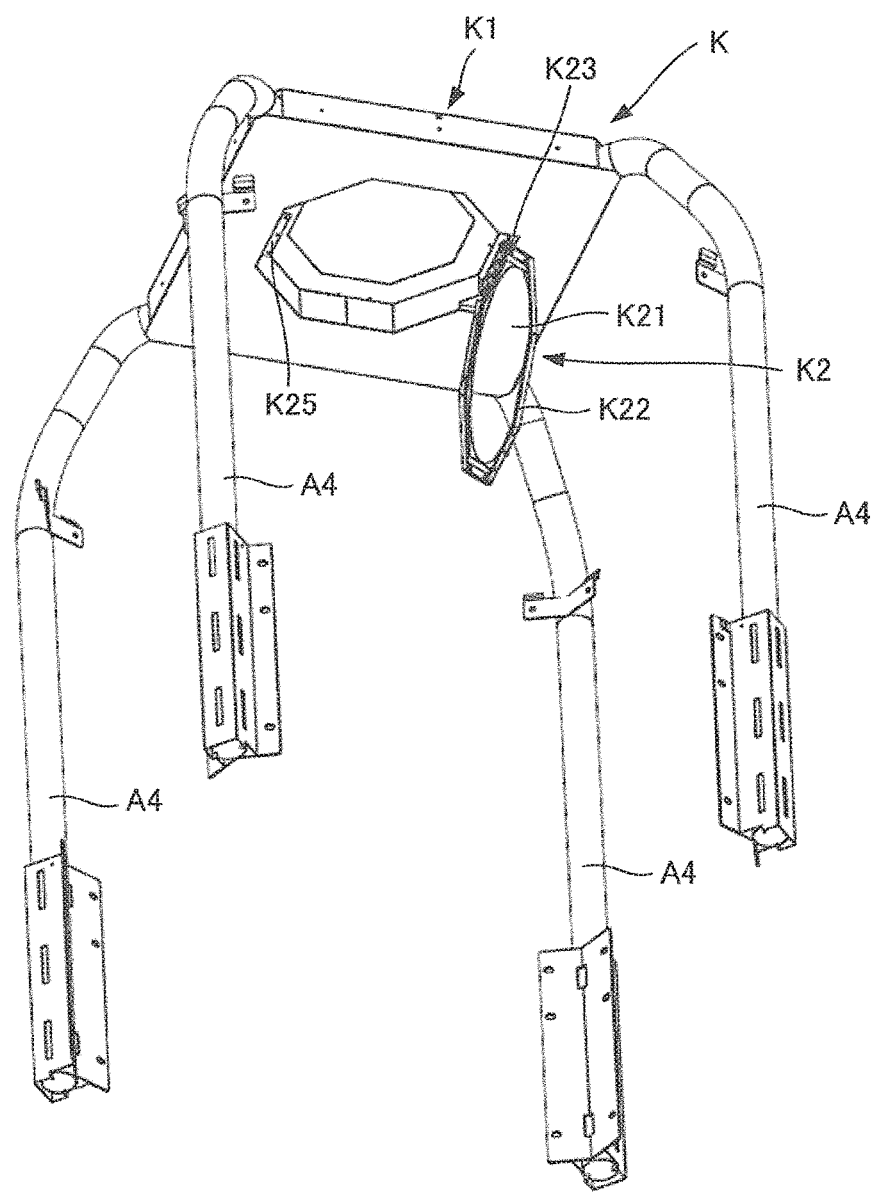
FIG. 13 is a perspective view of the light emission port protection mechanism.

In the meanwhile, in a non-normal use condition such as maintenance, as the fastening of the cover supporting plate K22 by the fastening member K25 is canceled, the cover member K21 and the cover supporting plate K22 becomes rotatably supported by the hinge member K23. As a result, as shown in FIG. 13, the cover supporting plate K22 rotates downward about the hinge member K23 on account of its own weight. When the cover supporting plate K22 is vertically provided, the cover member K21 does not exist on the light path of the projection light.

(Gaming Machine 1: Effect Assemblage 11: Projection Target Mechanism B)

Figure 14:
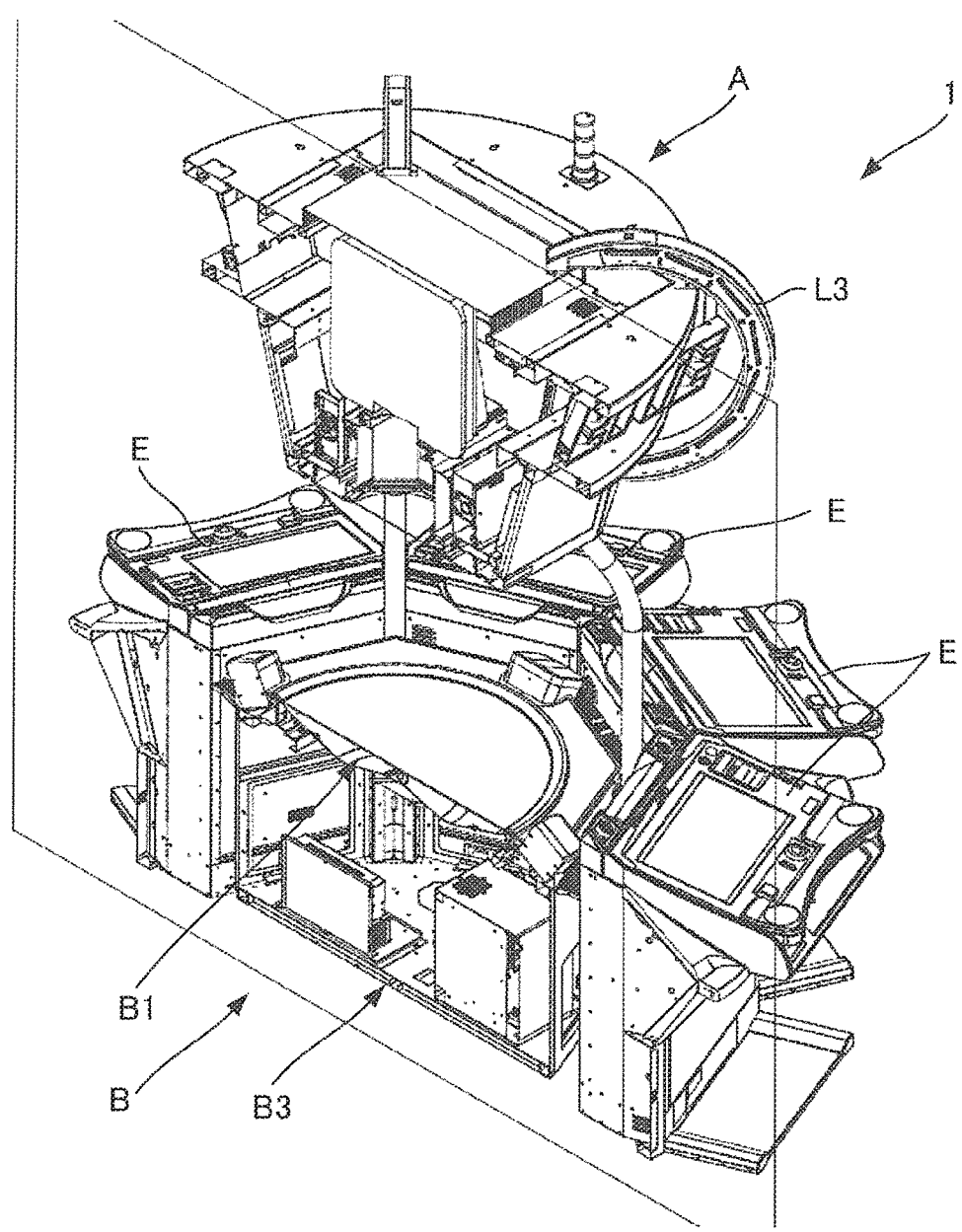
FIG. 14 is a perspective view of a vertical cross section of the gaming machine.

As shown in FIG. 14, below the projection mechanism A arranged as above, the projection target mechanism B is provided. The projection target mechanism B is arranged to generate a three-dimensional structure corresponding to a game content, in combination with a game effect image formed by projecting the projection light.

(Gaming Machine 1: Effect Assemblage 11: Projection Target Mechanism B: Game Field B1)

Figure 15:
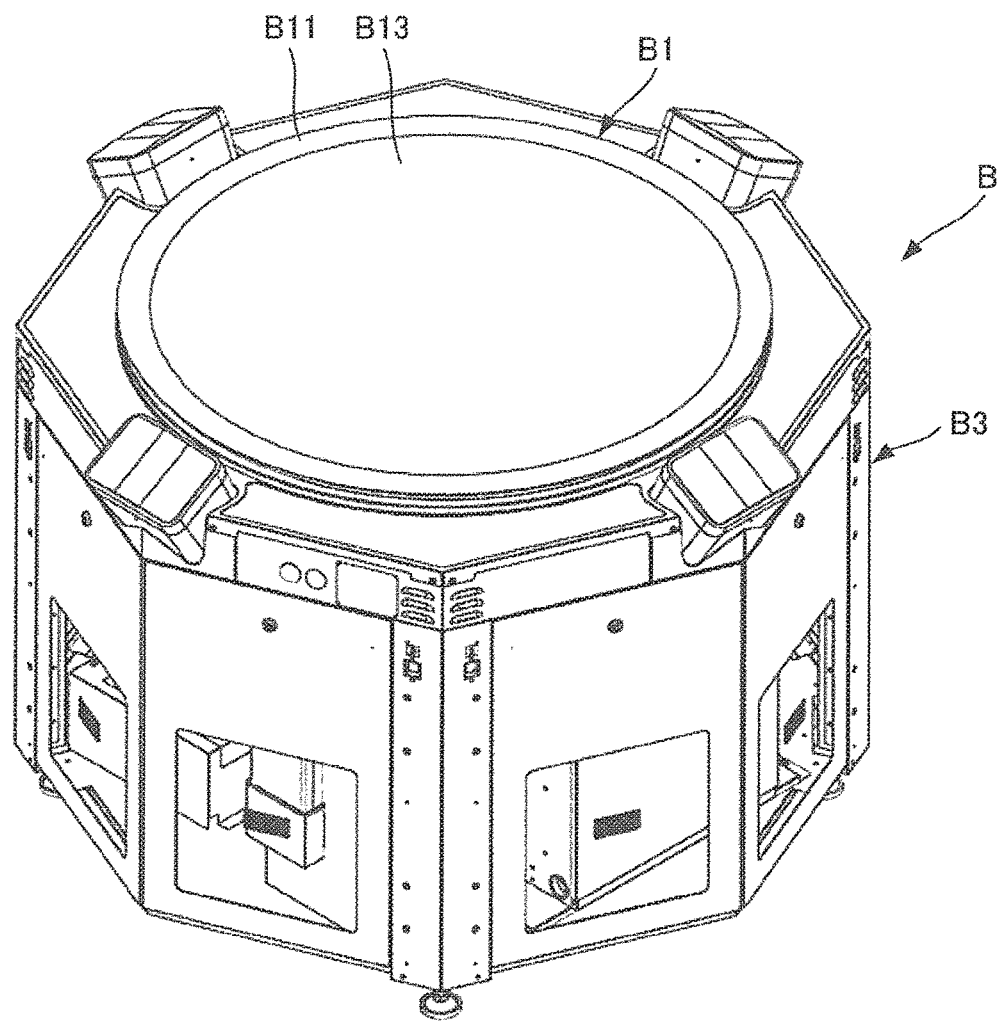
FIG. 15 is a perspective view of a projection target mechanism.
Figure 16:
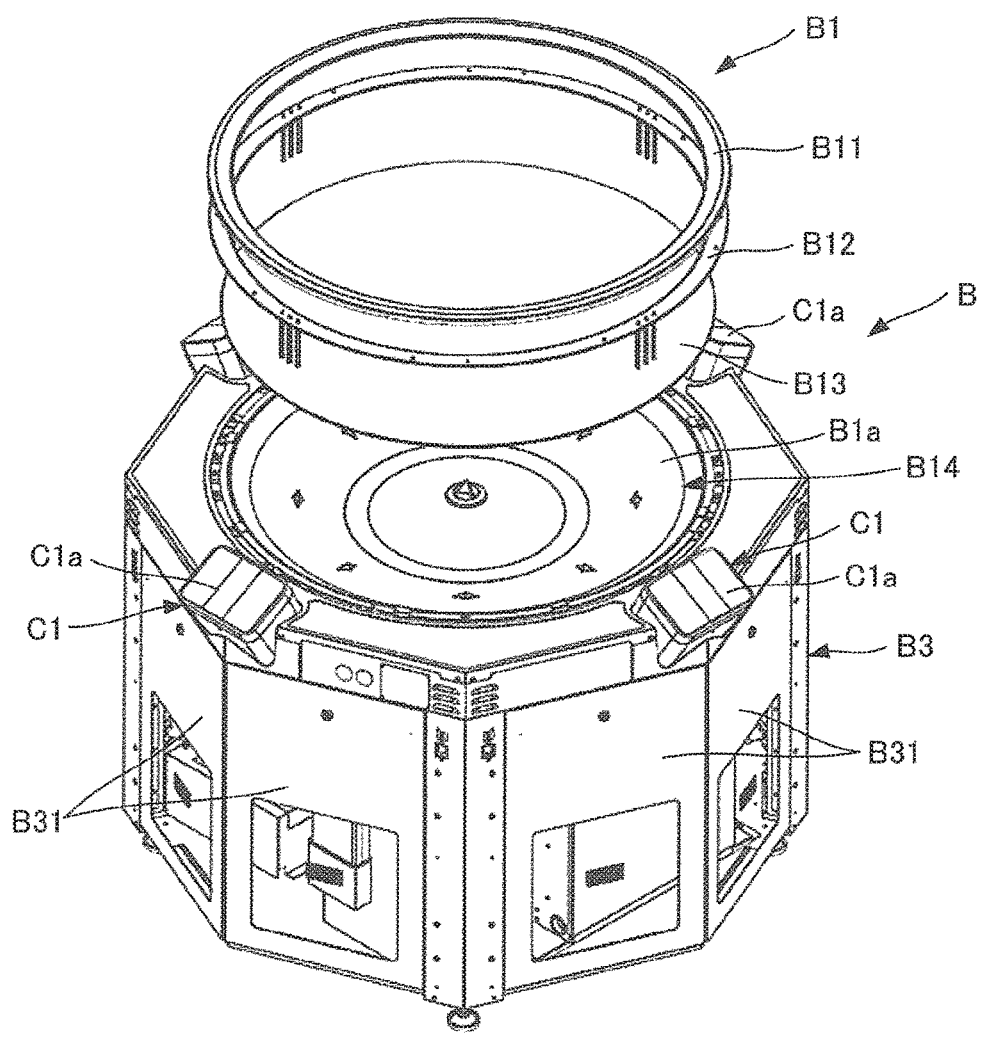
FIG. 16 is an exploded perspective view of the projection target mechanism.

As shown in FIG. 15 and FIG. 16, to be more specific, the projection target mechanism B includes the game field B1 having the non-flat projection surface B1a and a game field cabinet B3 having the game field B1 on the top surface. The game field B1 is provided with a disc member B14 which is identical in shape with the roulette rotating wheel. Above the disc member B14, a cover member B13 is provided. The cover member B13 is made of a light transmitting material such as glass and synthetic resin. The cover member B13 is arranged to cover the entire top surface of the disc member B14. The cover member B13 and a periphery part of the disc member B14 are fixed to the game field cabinet B3 by a ring B11 via an annular ring base B12. The cover member B13 is equivalent to the projection surface protection plate B2 shown in FIG. 1. With this, falling of foreign matters such as duct onto the disc member B14 from above is prevented as the disc member B14 is sealed by the cover member B13, and the occurrence of cheating by accessing to the disc member B14 is prevented.

Figure 17:
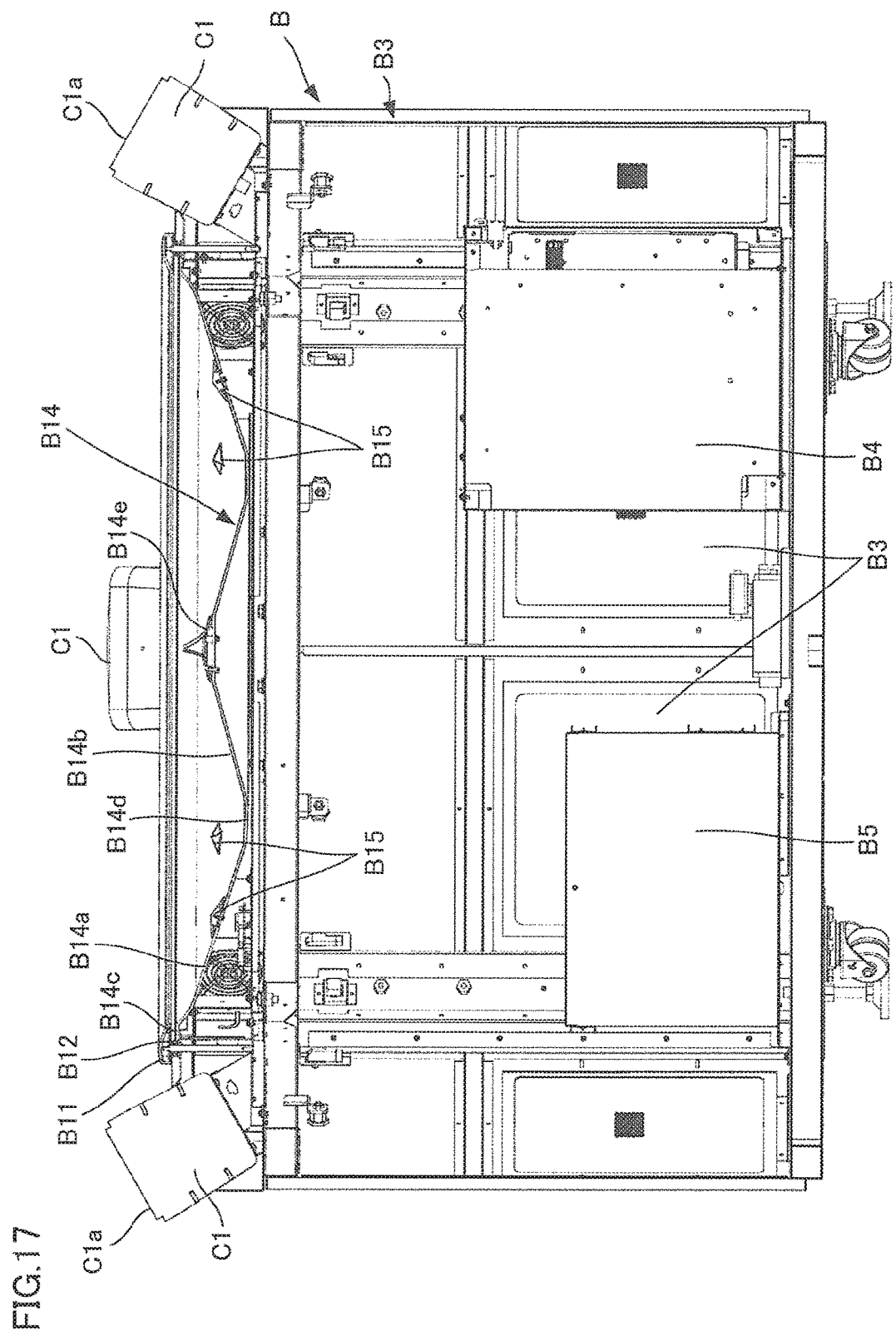
FIG. 17 is a vertical cross section of the projection target mechanism.

As shown in FIG. 17, the disc member B14 includes a peripheral part B14c fixed by the ring B11 described above, a first inclined part B14a which is inclined downward from the peripheral part B14c to a middle part B14d, and a second inclined part B14b which is inclined upward from the middle part B14d to a central part B14e. As a roulette image which is a game effect image is projected by projection light, a three-dimensional structural body of the roulette rotating wheel appears on the disc member B14 on account of the non-flat parts B14a to B14e. On the top surface of the first inclined part B14a, plural protruding members B15 are provided. The protruding members B15 function as contact members for changing the moving direction of the roulette ball image.

(Gaming Machine 1: Effect Assemblage 11: Projection Target Mechanism B: Game Field Cabinet B3)

Figure 18:
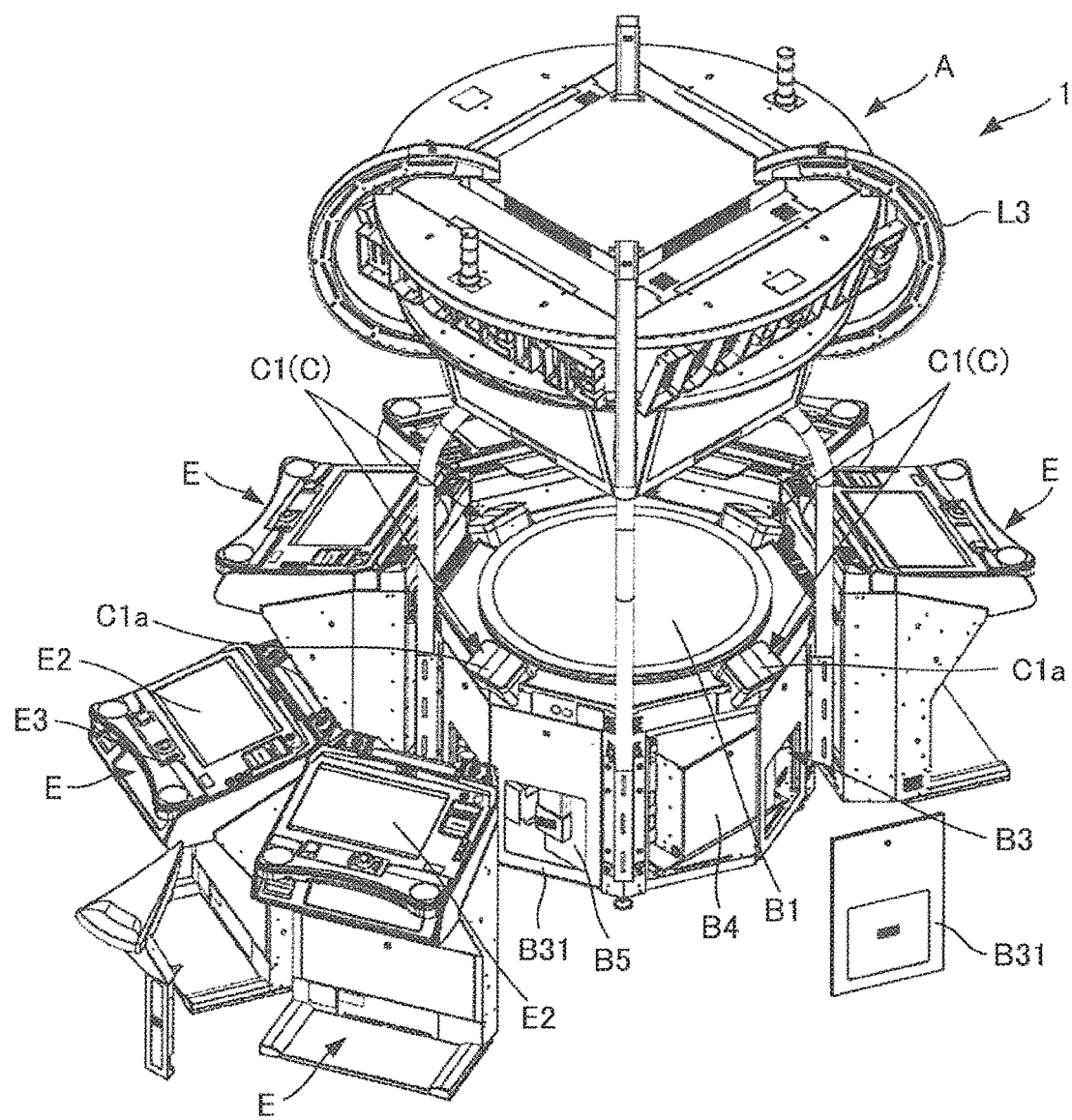
FIG. 18 illustrates how gaming terminals are disposed.

As shown in FIG. 18, the game field cabinet B3 is formed to be an octagonal cylinder having a central axis in parallel to the vertical direction. The central axis of the game field cabinet B3 is preferably matched with the optical axis of the projection light emitted from the projection mechanism A. The game field cabinet B3 houses electric devices and electronic devices such as a control box B4 having a control board and a power source B5. Each side wall face of the game field cabinet B3 is formed of a door member B31. The door member B31 is detachably attached to the game field cabinet B3. As the door member B31 is detached at the time of maintenance or the like, the electric devices and electronic device housed in the game field cabinet B3 become accessible.

(Gaming Machine 1: Effect Assemblage 11: Effect Sound Output Mechanism C)

On the top surface of the game field cabinet B3, the effect sound output mechanism C is provided. The effect sound output mechanism C is provided with four speakers C1. These speaker C1 are provided at the outer circumferential side of the top surface of the game field cabinet B3 to surround the game field B1 of the projection target mechanism B. The four speakers C1 are provided along the circumference at regular intervals. Neighboring speakers C1 form an angle of 90 degrees at the center of the game field B1. The speakers C1 are arranged to produce three-dimensional sound effects by each outputting effect sound with sound volume corresponding to the positional relation with the roulette ball image (object) in the game effect image.

Furthermore, each speaker C1 is arranged so that the speaker surface C1a outputting the effect sound faces the outer circumferential side. With this arrangement, a high-pitched component having high rectilinearity in the effect sound effectively reaches a player playing a game at each of the gaming terminals E provided around the game field cabinet B3.

For example, each of the speakers C1 arranged as above outputs effect sound indicating that the roulette ball is rolling, when the roulette ball is rolling on the rotating wheel in the game effect image projected on the game field B1. In so doing, the speaker C1 increases the volume of the effect sound as the roulette ball gets close to the speaker C1, and decreases the volume of the effect sound as the roulette ball moves away from the speaker C1. In other words, as the roulette ball rolls on the rotating wheel, the speakers C1 outputs large sound one by one.

In this way, because each speaker C1 is able to output effect sound with volume corresponding to the positional relation with the roulette ball image (object) in the game effect image, the player is able to easily identify the roulette ball image (object).

(Gaming Machine 1: Gaming Terminal E)

The gaming terminal E includes a cabinet E1, a terminal display E2 provided on the top surface of the cabinet E1, and an operation button E3 provided in the vicinity of the terminal display E2. The terminal display E2 is able to display a bet table and is provided with a touch panel. The touch panel allows a player to place a bet by pressing the bet table displayed on the terminal display E2.

(Gaming Machine 1: Processes)

The following will describe processes executed by the gaming machine 1.

(Outline of Game)

The gaming machine 1 of the present embodiment shows a game effect image for indicating a game result. The game result is used for determining whether a player having placed a bet wins or not. To put is differently, the gaming machine 1 shows a process of determining win/loss and a result of the win/loss by the effect assemblage 11.

The effect assemblage 11 moves the first object image and the second object image relative to each other, and displays a process of determining win/loss and a result of the win/loss by stopping the first object image at a predetermined part of the second object image. The second object image includes regions which function as bet objects. The player places a bet with prediction that the second object image will stop at one of the regions. When the first object image stops at a region (predetermined part) which is a bet object on which a player has placed the bet, winning is achieved for the player. When the first object image stops at a region different from the region which is the bet object on which the player has placed the bet, the player fails to achieve winning. In this way, the disclosure is not limited to the arrangement that the stop of the first object image at the predetermined part of the second object image (game result) directly indicates win/loss.

The "display of process of determining win/loss" indicates that an effect until the indication of a game result is shown by the first object image and the second object image. On this account, the determination of win/loss and the determination of a game result used for determining win/loss may be done in advance. That is to say, the gaming machine 1 may determine win/loss or a game result in advance, and may execute an effect until the indication of the game result based on the determination. "Display of result of win/loss" indicates that a game result is shown by stopping the first object image at a predetermined part of the second object image.

In the present embodiment, the gaming machine 1 randomly selects one of the bet objects. The selected bet object is the game result. The gaming machine 1 executes effects based on the game result. The effects include notification of the game result. In other words, the gaming machine 1 indicates, by an effect, which one of the bet objects is randomly selected. The gaming machine 1 repeatedly executes a unit game of indicating a game result determined by random selection by an effect.

The gaming machine 1 of the present embodiment executes roulette. In other words, the gaming machine 1 determines in advance in which one of the roulette pockets as the bet objects the roulette ball stops, in the game effect image displayed on the projection target mechanism B and the display device D. The gaming machine 1 then displays, on the projection target mechanism B and the display device D, a game effect image showing that the roulette ball rolls on the rotating wheel and the roulette ball stops at the roulette pocket which is selected in advance.

Figure 19:
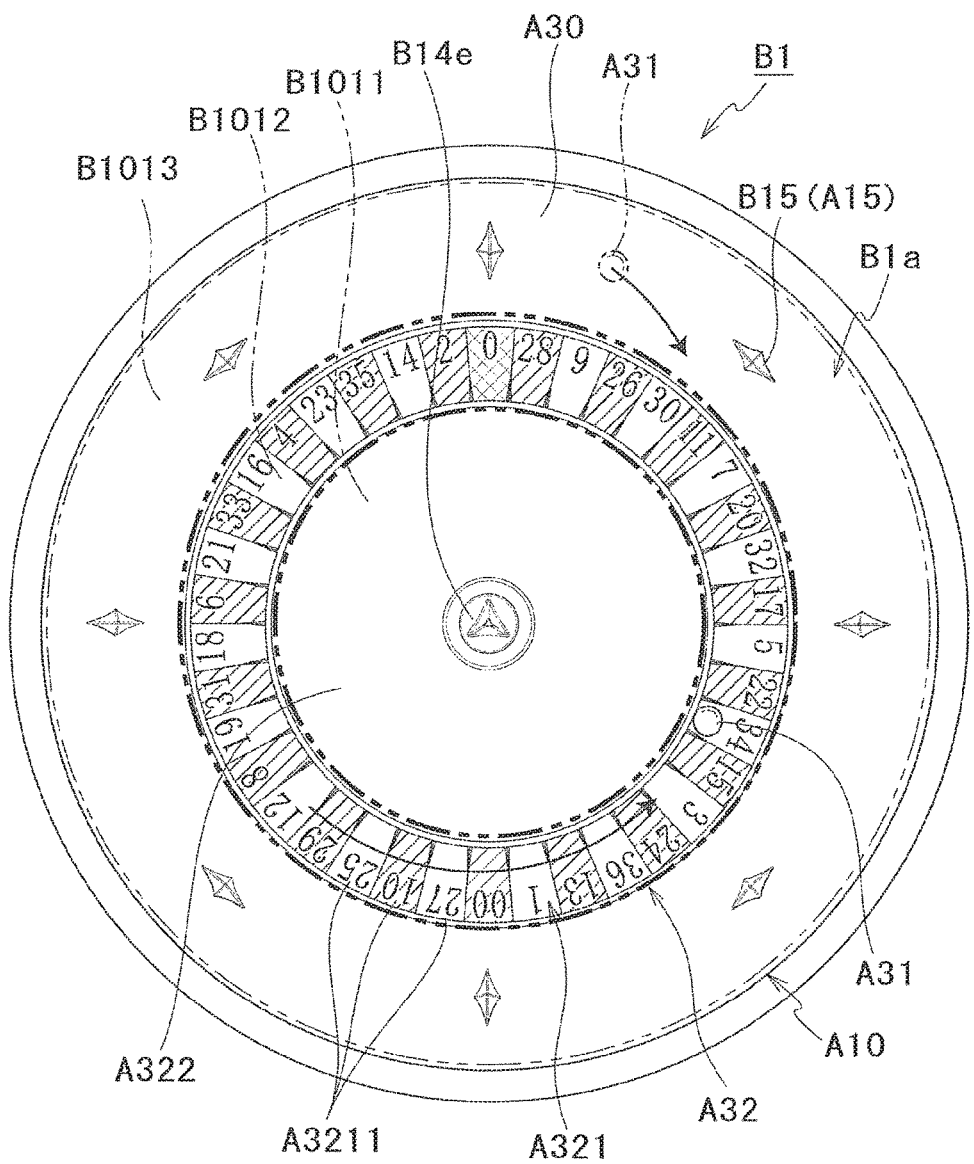
FIG. 19 shows an example of a game effect image projected on the projection target mechanism.

FIG. 19 shows an example of a game effect image projected on the projection surface B1a having a rotating wheel shape in the projection target mechanism B. On the projection surface B1a of the game field B1 of the projection target mechanism B, a roulette wheel surface image is projected, so that a roulette board (rotating wheel A10) is virtually reproduced.

Figure 20:
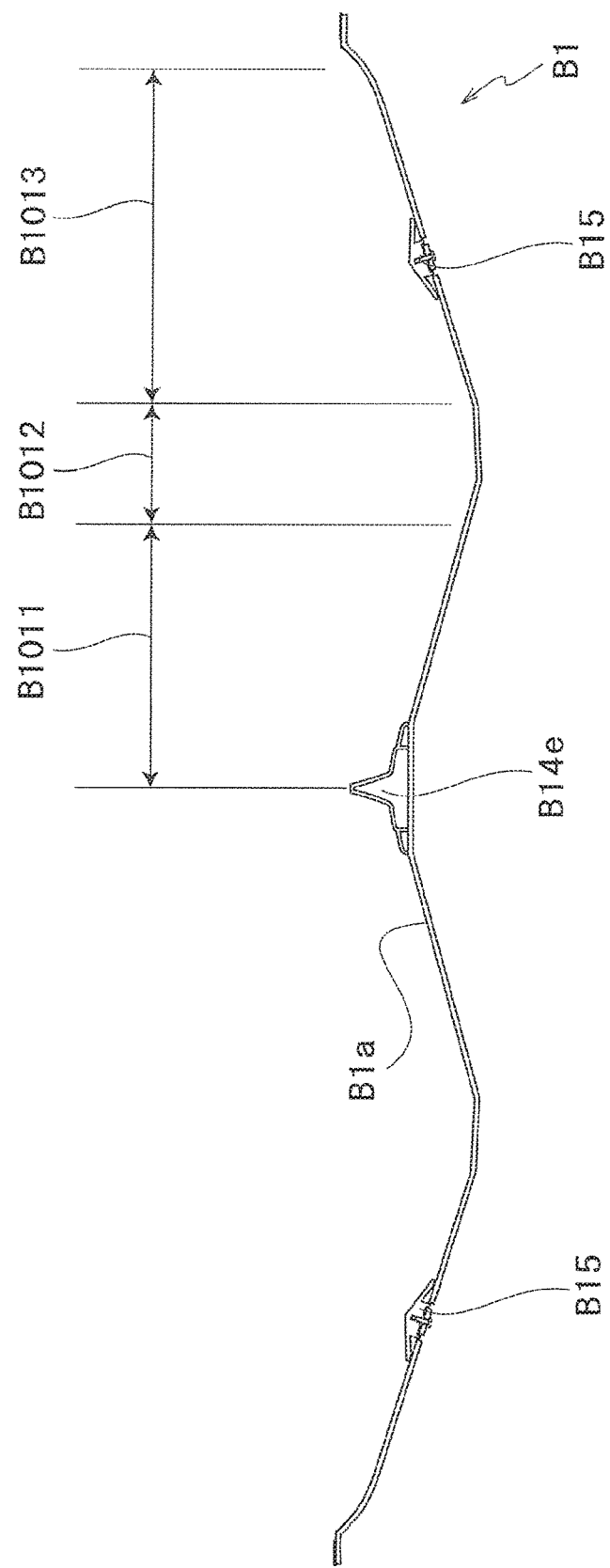
FIG. 20 is a cross section of a game field in the projection target mechanism.

As shown in FIG. 19 and FIG. 20, the projection surface B1a is virtually divided into a hat area B1011, a number area B1012, and a bank area B1013, by means of different game effect images projected. The hat area B1011 is circular in shape and is centered at a central part B14e which is physically provided on the projection surface B1a. The number area B1012 is provided outside the hat area B1011, and the bank area B1013 is provided outside the number area B1012. The protruding members B15 are physically provided in the bank area B1013. The protruding members B15 may be provided as game effect images, or may be displayed as cat's eye images A15 superposed on the protruding members B15 which are physically provided. Hereinafter, the protruding members B15 and the cat's eye images A15 may be termed cat's eyes.

On such a projection surface B1a, a roulette ball image A31 as the first object image, a wheel A32, and a bank A30 are displayed. The wheel A32 includes a roulette pocket A321 as the second object image and a central portion A322. The central portion A322 is displayed to be substantially matched with the hat area B1011 in shape. Although not illustrated, the central portion A322 shows a wood pattern to cover the area. The roulette pocket A321 is displayed to be substantially matched with the number area B1012 in shape. The roulette pocket A321 is provided with number pockets A3211 which are serially provided along the circumferential direction. The roulette pocket A321 and the central portion A322 are displayed to move in sync with each other. In other words, the wood pattern of the central portion A322 rotates in accordance with the rotation of the roulette pocket A321. The bank A30 is displayed to be substantially matched with the bank area B1013 in shape. The bank A30 is displayed to be always at a standstill.

The roulette ball image A31 is displayed to start the movement in the bank area B1013 and end the movement at one of the number pockets A3211 in the roulette pocket A321. The movement direction of the roulette ball image A31 is arranged to be opposite to the rotational direction of the roulette pocket A321. The process of determining win/loss is notified by displaying how the roulette ball image A31 which is the first object image reaches a predetermined part of the roulette pocket A321 which is the second object image. Furthermore, the result of the win/loss is notified by stopping the roulette ball image A31 which is the first object image at the predetermined part of the roulette pocket A321 which is the second object image.

The roulette ball image A31 and the wheel A32 are displayed based on the three-dimensional data of the objects existing in the three-dimensional space. That is to say, after forming the objects in the three-dimensional space based on the three-dimensional data, the gaming machine 1 generates image data of each object in the three-dimensional space viewed from a predetermined view point. In the present embodiment, the gaming machine 1 generates two sets of image data with different view points. That is to say, the gaming machine 1 generates projection data of the game effect image of the object in the three-dimensional space viewed from the projector A1 based on the three-dimensional data, and projects the game effect image based on the projection data on the projection surface B1a. In this regard, sets of image data with different view points may be generated for the respective display devices D provided on the respective sides.

Figure 21:
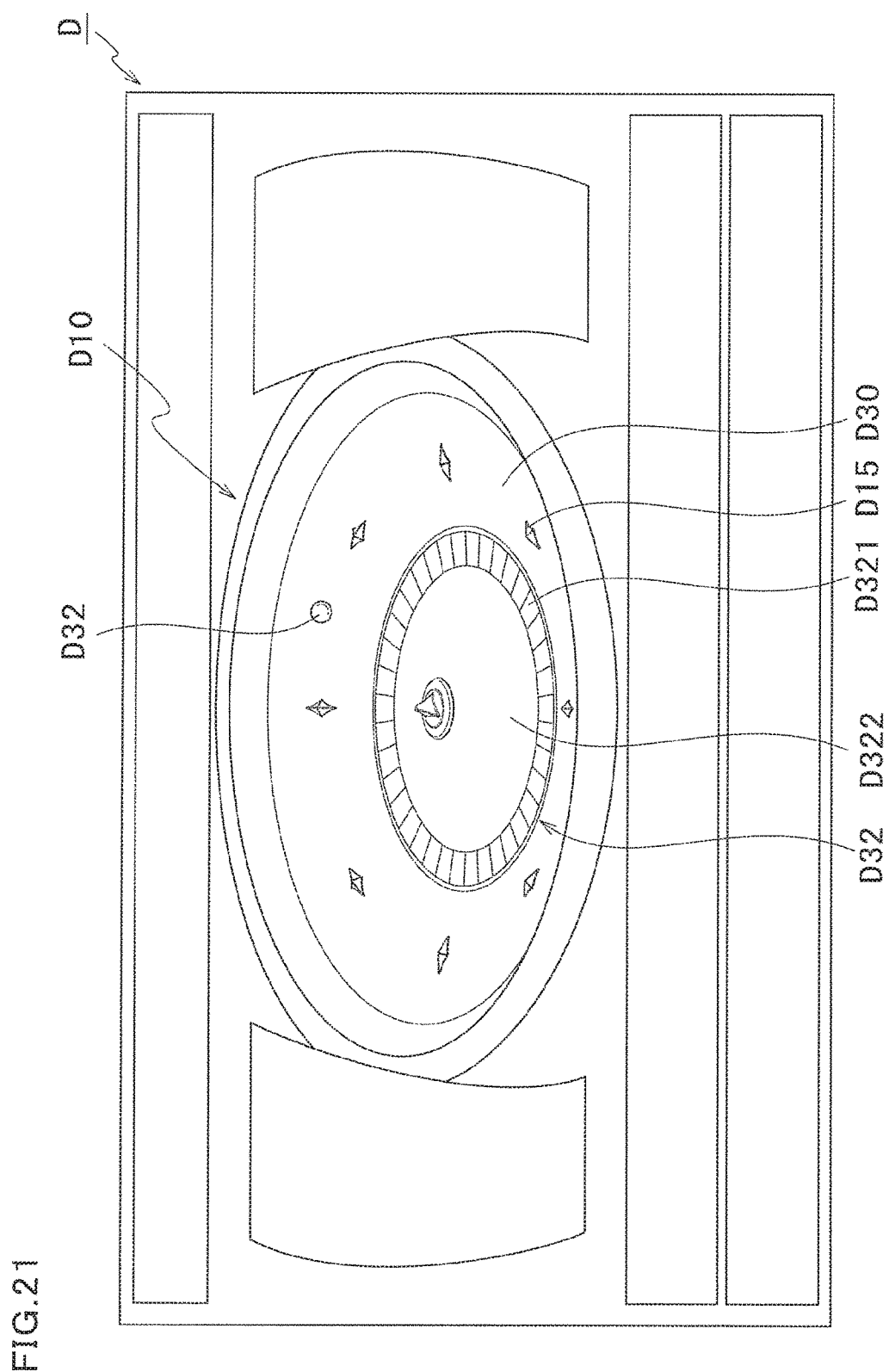
FIG. 21 shows an example of a game effect image displayed on a display device D.

In addition to the above, as shown in FIG. 21, the gaming machine 1 generates, based on the three-dimensional data, the display device data of the game effect images of the roulette ball and the rotating wheel in the three-dimensional space viewed from a view point different from the projector A1, and displays the game effect images based on the display device data on the display device D. As such, on the projection target mechanism B and the display device D, synchronized game effect images which are viewed from different view points are displayed. To be more specific, the display device D displays the roulette ball image D31, the wheel D32 including the roulette pocket D321 and the central portion D322, the bank D30, and the rotating wheel D10 including the cat's eye image D15, which are synchronized with but viewed from a view point different from the view point of the roulette ball image A31, the wheel A32 including the roulette pocket A321 and the central portion A322, the bank A30, and the rotating wheel A10 including the cat's eye image A15, which are projected on the projection target mechanism B.

In the present embodiment, the roulette executed by the gaming machine 1 includes a normal game and a JP (Jackpot) game. The "normal game" is the above-described game in which participation to a single unit game is allowed under condition of betting of a game value. The gaming machine 1 receives betting from players through the gaming terminals E. The betting from a player includes at least one bet object and specification of a bet amount. In other words, the player performs betting by specifying at least one number pocket A3211. When a randomly selected bet object is included in a bet by a player, the gaming machine 1 awards a payout to that player based on the betting. In other words, when the at least one number pocket A3211 specified by the player in the betting includes the number pocket A3211 where the roulette pocket A321 stops, the gaming machine 1 awards a payout to the player based on the betting. As such, the player is able to select in which one of the unit games which are serially executed the player participates, by performing betting through the gaming terminal E.

The "JP game" is a game which is executed when a result of the normal game satisfies a predetermined condition. In other words, the "JP game" is triggered in the normal game. Participation in the "JP game" is allowed on condition that a player has participated in the normal game in which the condition to execute the JP game is satisfied. In the "JP game", a player is able to participate with a fewer game values than in the normal game. The condition "being able to participate in with a fewer game values than in the normal game" includes a case where the bet amount is zero as in the present embodiment. The "JP game" may be realized by one of or a combination of different states such as a state in which more game values are obtainable than in the normal game and a state in which a game value is obtainable with a higher probability than in the normal game. The state "a game value is obtainable with a higher probability than in the normal game" includes a case where a game value is always obtainable as in the present embodiment.

(Basic Sequence)

As shown in FIG. 22, the unit game of the normal game includes a bet time, a shooter time, a game time, and a result time. The bet time is 20 seconds by default, and falls in a range of 15 to 60 seconds. In the bet time, a bet from a player is accepted via a gaming terminal E. The shooter time falls in a range of 5 to 30 seconds. In the shooter time, the gaming machine 1 waits for an operation of a player for starting the rolling of the roulette ball on the rotating wheel, which is to be performed at the gaming terminal E selected as a shooter. Hereinafter, the gaming terminal E selected as the shooter may be referred to as a shooter gaming terminal E, or simply referred to as a shooter. The game time falls within the range of 15 to 25 seconds. In the game time, based on a player's operation, the gaming machine 1 starts the rolling of the roulette ball on the rotating wheel, and stops the roulette ball at the roulette pocket which has been selected in advance. The result time is 6 seconds. In the result time, an effect of notifying the roulette pocket at which the roulette ball has stopped and notifying the number for identifying the roulette pocket having been determined in advance is executed.

Furthermore, as shown in FIG. 22, the unit game of the JP game is executed after the end of the unit game of the normal game which satisfies the predetermined condition. The JP game includes a JP game time and a JP result time. The JP game time and the JP result time fall within the range of 35 to 40 seconds in total. Hereinafter, a combination of the JP game time and the JP result time may be referred to as a JP game time. In the JP game, a payout is awarded to all of the participants.

(Random Determination Flow)

Figure 23:
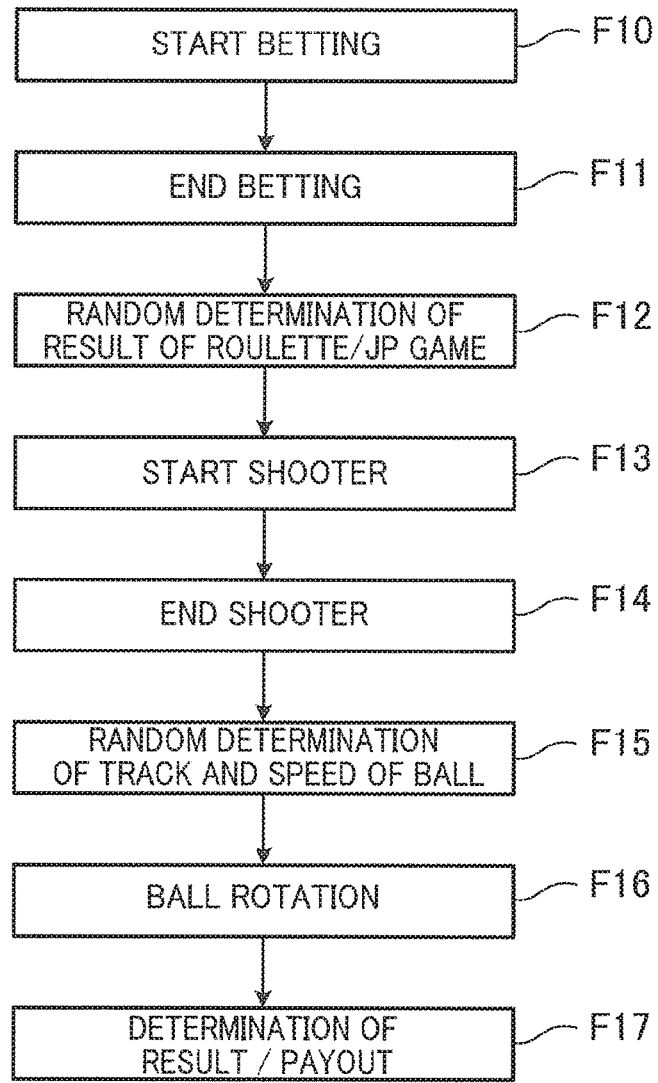
FIG. 23 illustrates a process of random determination of a game result.

FIG. 23 shows a process of random determination of a game result in the gaming machine 1. As shown in FIG. 23, after starting the acceptance of betting in the bet time (F10), the gaming machine 1 finishes the acceptance of betting when a predetermined time elapses (F11). After the finish of the acceptance of betting, the gaming machine 1 executes random determination of a result of the normal game (F12). In the present embodiment, random determination of a result of the JP game is executed during the result time of the normal game in which the JP game has been triggered. The disclosure, however, is not limited to this arrangement. Because the JP game requires no betting, the step F10 and the step F11 are not executed. For the random determination of the result of the normal game and the random determination of the result of the JP game, 64-bit random numbers are used. That is to say, each bet object is allocated to a predetermined range of 64-bit random numbers, and the bet object associated with the range to which the generated random number belongs is selected as the game result.

Thereafter, the gaming machine 1 starts the shooter time of accepting an operation to roll the roulette ball on the rotating wheel input to the gaming terminal E (F13). When a player's operation is done or a predetermined time elapses, the shooter time ends (F14). Thereafter, the track and speed of the roulette ball are randomly determined (F15). Then roulette ball movement display is controlled based on the randomly-determined track and speed of the roulette ball (F16). Then the game result is determined and win/loss of each player is determined, and a payout is awarded if applicable (F17).

As such, the gaming machine 1 randomly determines the results of the normal game and the JP game. Furthermore, the gaming machine 1 randomly determines the track and speed of the roulette ball.

(Game Effect Images)

The following will describe, with reference to timing charts, the game effect image projected onto the projection surface B1a of the game field B1 of the projection target mechanism B by the projection light A3 from the projector A1 of the projection mechanism A, and the game effect image displayed on the display device D. Hereinafter, explanations may be made while only a projected game effect image is depicted in a figure. Furthermore, the explanations below presuppose that the protruding members B15 are not used and only the cat's eye images A15 are displayed.

(Game Effect Images: Projection Target Mechanism B: Normal Game)

Figure 24B:
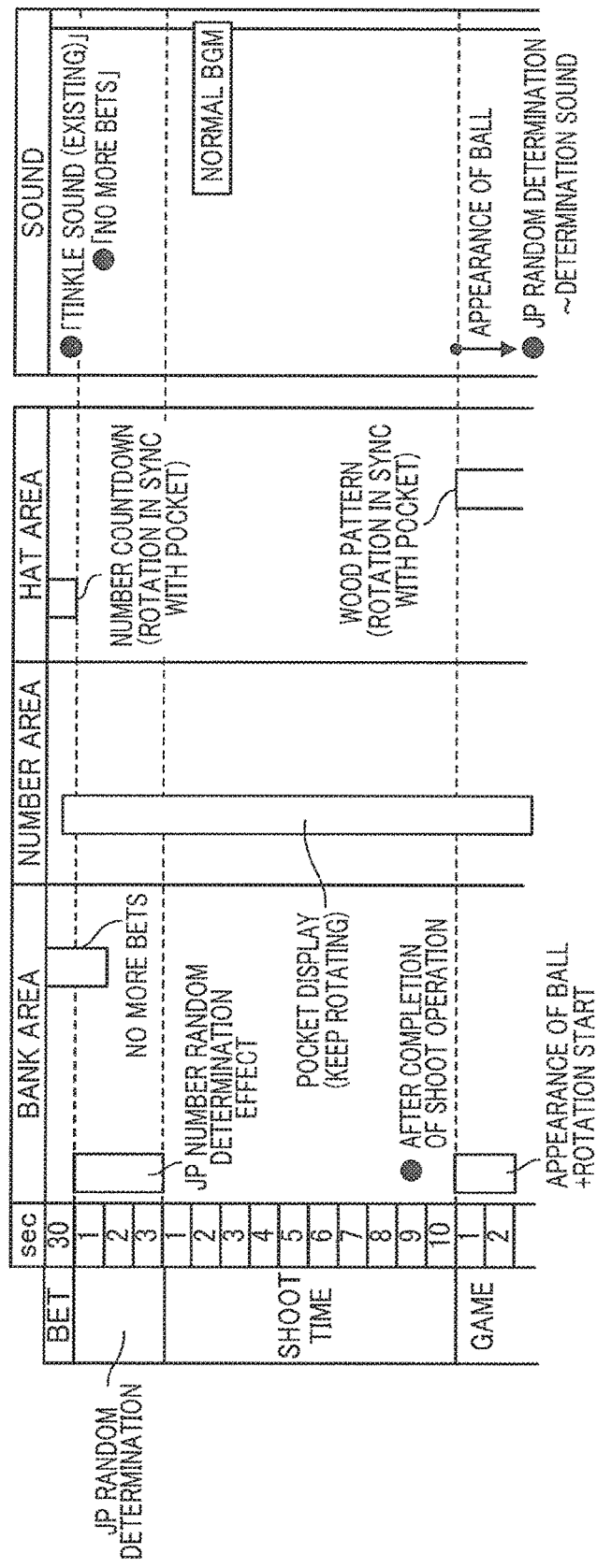
FIG. 24B illustrates a timing chart of the normal game.
Figure 24C:
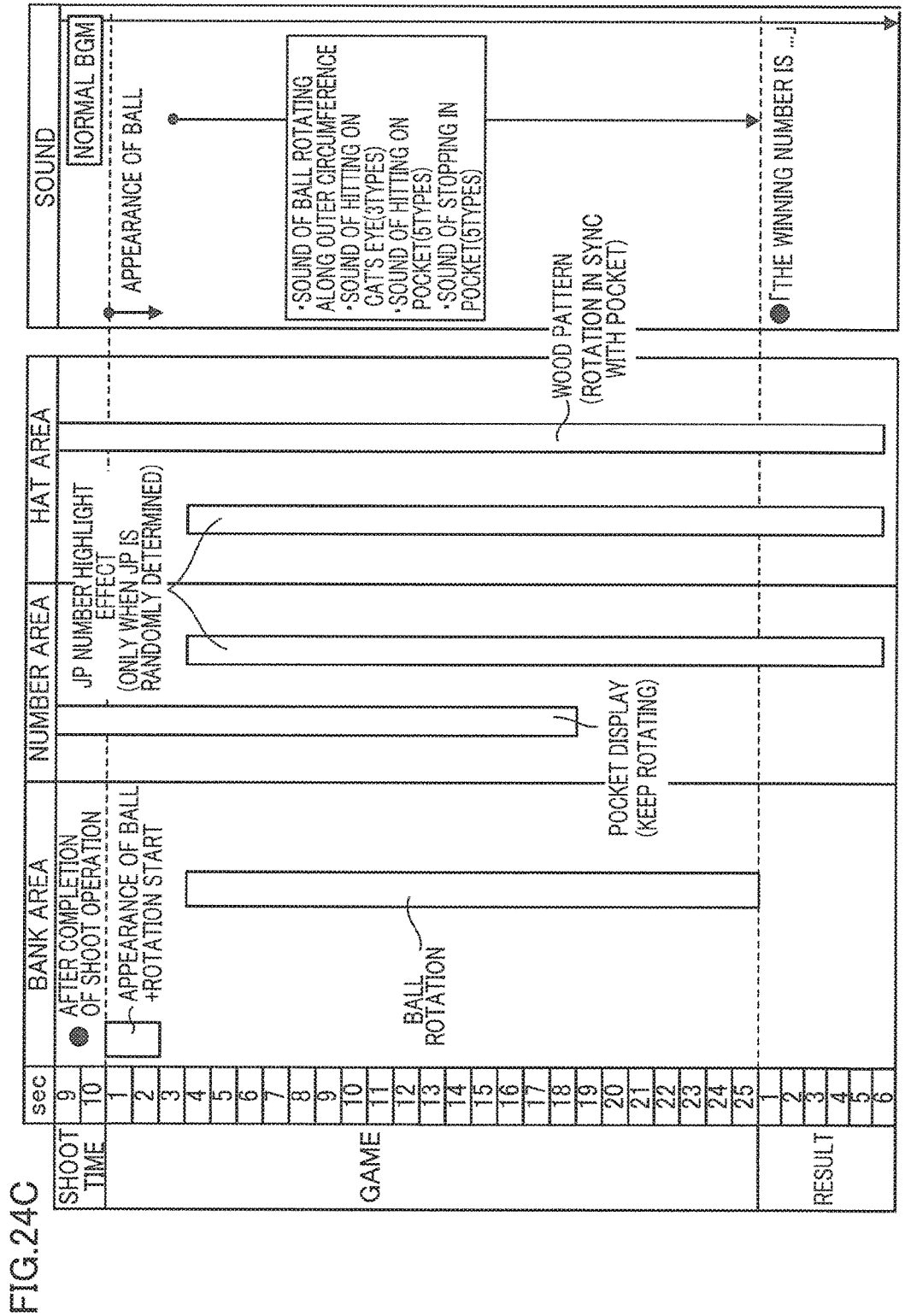
FIG. 24C illustrates a timing chart of the normal game.

FIG. 24A, FIG. 24B, and FIG. 24C show timing charts in the normal game of game effect images in the hat area B1011, the number area B1012, and the bank area B1013 (see FIG. 19 and FIG. 20), respectively, and a sound effect executed by the effect sound output mechanism C. The following will describe the effects executed by the projection target mechanism B and the effect sound output mechanism C in the normal game.

(Game Effect Images: Projection Target Mechanism B: Normal Game: Bet Time)

As shown in FIG. 24A to FIG. 24C, in the bet time of the normal game, an effect indicating the start of a new unit game and acceptance of betting in that unit game is executed.

Figure 25A:
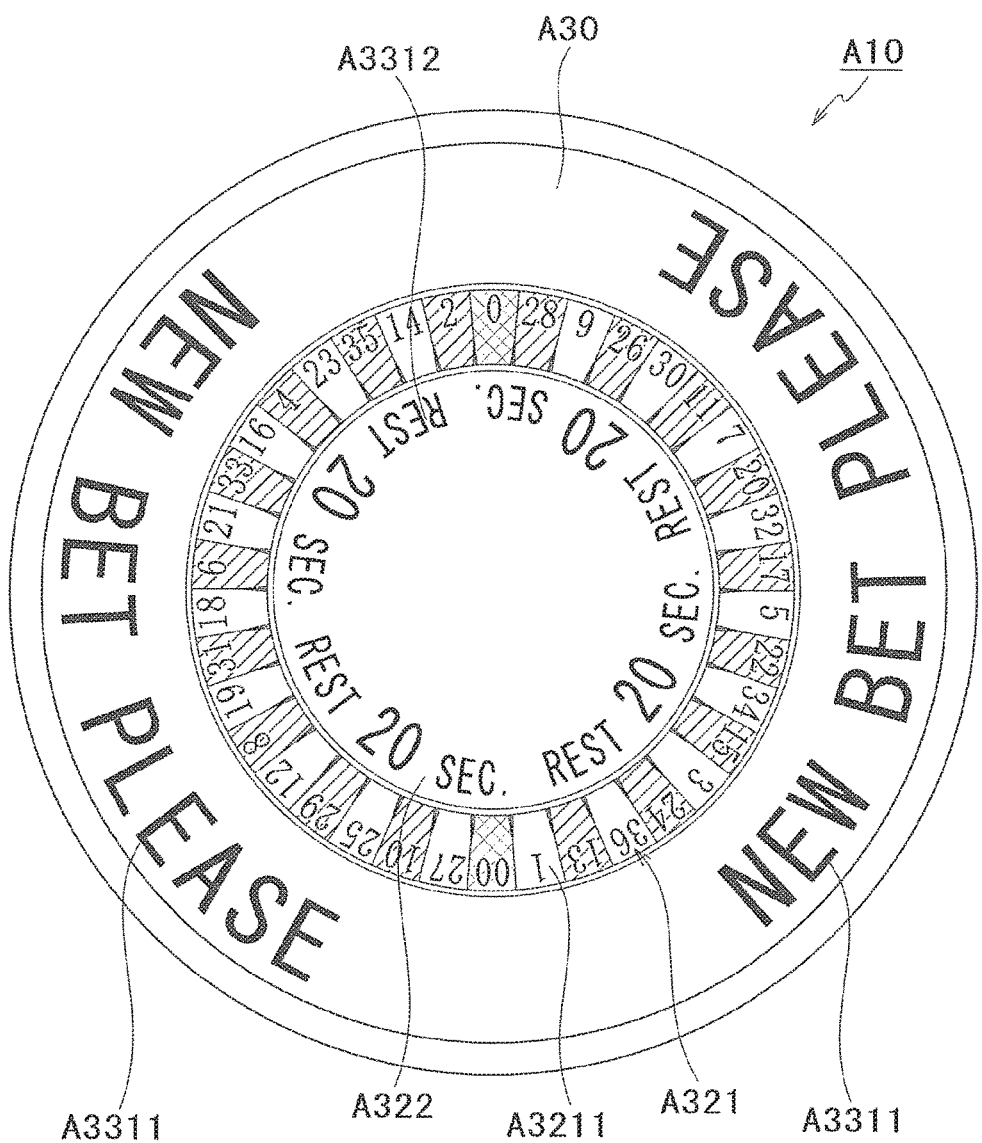
FIG. 25A is an example of the game effect image projected on the projection target mechanism.

To be more specific, as shown in FIG. 25A, images A3311 each showing "NEW BET PLEASE" are displayed on the bank A30. Two images A3311 are displayed to oppose each other over the central part B14e. The two images A3311 rotate about the central part B14e while maintaining the positional relation above. In the hat area B1011 and the number area B1012, the wheel A32 is rotationally displayed. That is to say, in the number area B1012, the serial number pockets A3211 are displayed in a moving manner. In the hat area B1011, a countdown image A3312 is displayed and the countdown of the bet time starts. The countdown image A3312 is displayed in the form of "REST oo SEC.". Furthermore, the speaker C1 outputs sound "NEW BET PLEASE", and starts the output of normal background music.

Figure 25B:
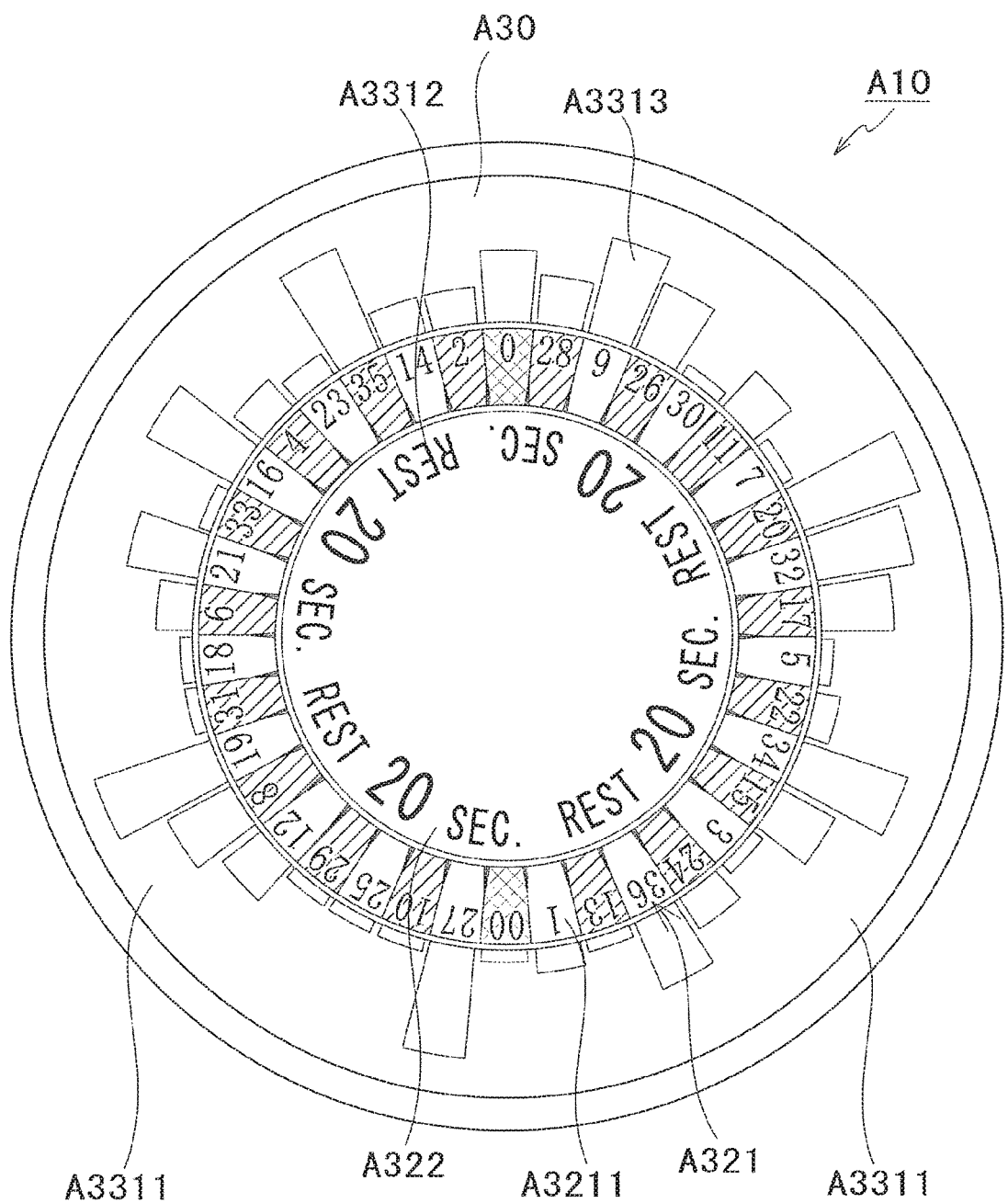
FIG. 25B is an example of the game effect image projected on the projection target mechanism.

As shown in FIG. 25B, when 2 seconds pass, how many times the roulette ball has stopped at each number pocket A3211 in the past 200 unit games is displayed on the bank A30. To be more specific, a graph image A3313 is displayed at a position of the bank A30 corresponding to each number pocket A3211. Each graph image A3313 is displayed in the bank A30 to be longer radially outward as the number of times the roulette ball stopped in the past 200 unit games gets larger.

Figure 25C:
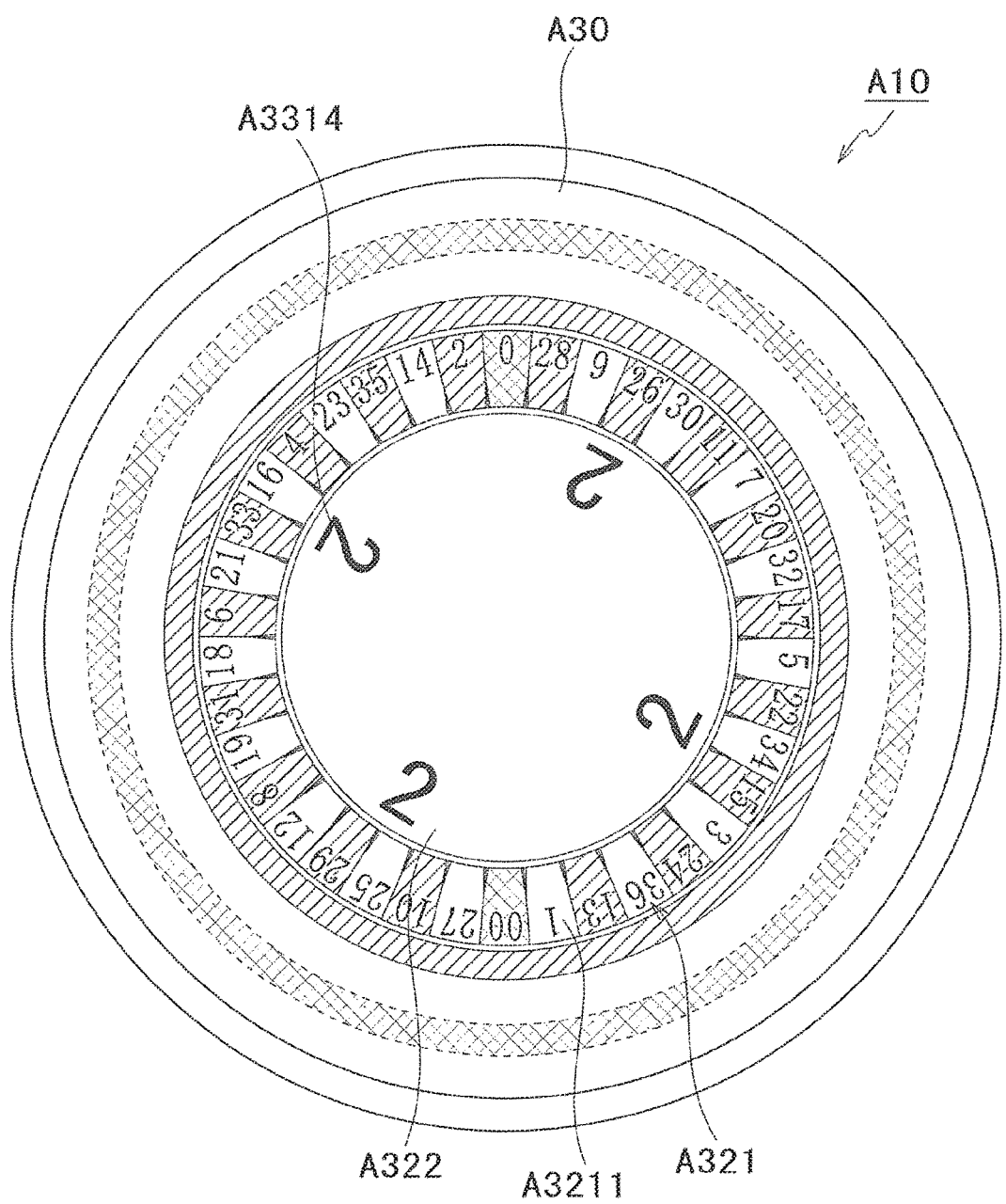
FIG. 25C is an example of the game effect image projected on the projection target mechanism.

As shown in FIG. 25C, when 24 seconds pass, the countdown starts in the bank A30, too. To be more specific, the bank A30 is radially divided into five regions with different colors. Then an effect that the five regions disappear one by one from the outermost one from 5 seconds to zero to one second to zero of the countdown is executed. Furthermore, the countdown image A3312 in the hat area B1011 is changed to a countdown image A3314 which solely displays remaining seconds. Furthermore, the speaker C1 outputs countdown voice and an effect sound, from 5 seconds to zero to one second to zero of the countdown.

Figure 25D:
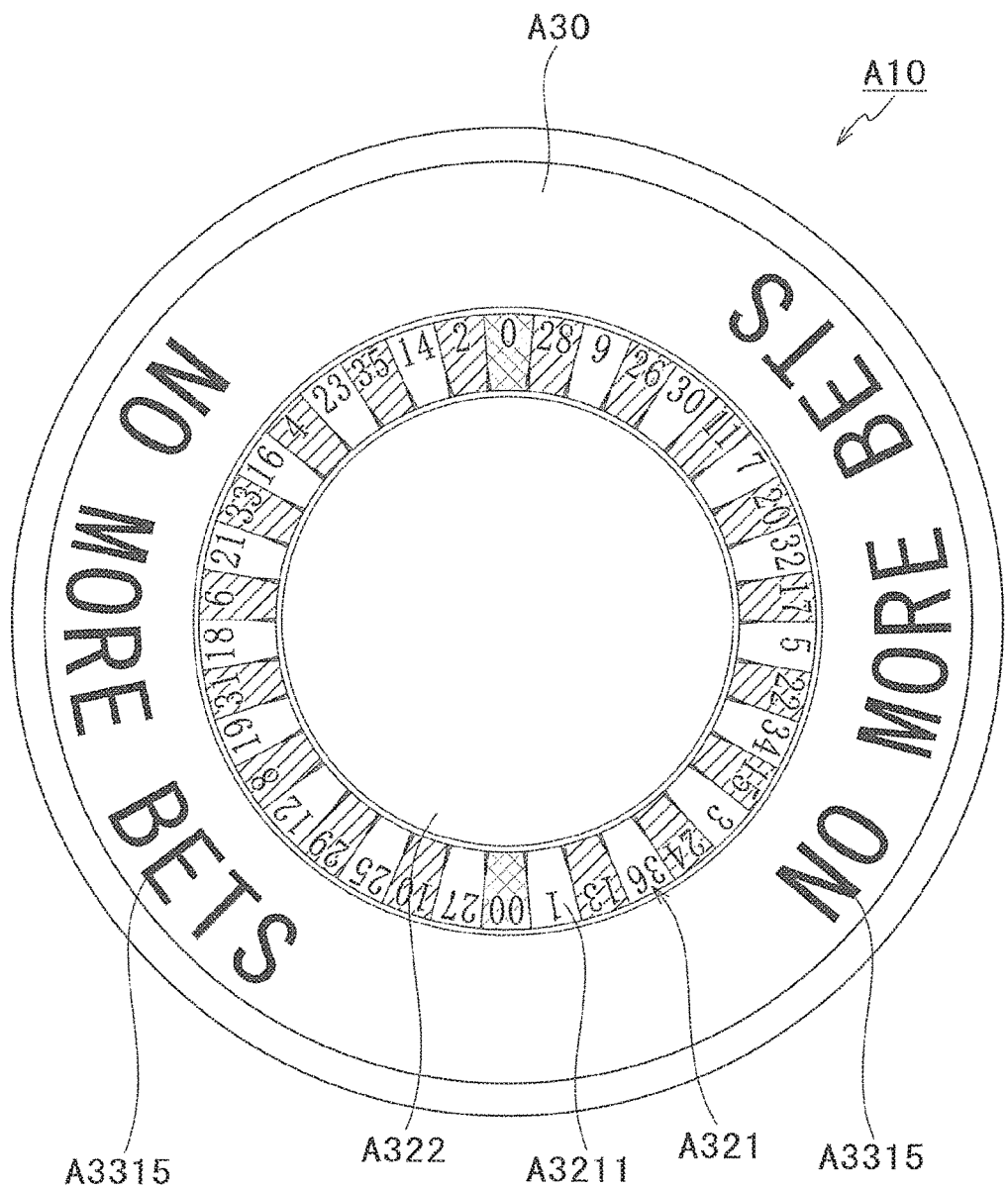
FIG. 25D is an example of the game effect image projected on the projection target mechanism.

As shown in FIG. 25D, when 30 seconds pass, images A3315 each showing "NO MORE BETS" are displayed in the bank A30. Two images A3315 are displayed to oppose each other over the central part B14e. The two images A3315 are displayed to rotate about the central part B14e while maintaining the positional relation above. Furthermore, the speaker C1 outputs ring of a bell indicating that the acceptance of betting is finished, and sound "NO MORE BETS" is output.

(Game Effect Images: Projection Target Mechanism B: Normal Game: JP Random Determination Time)

In the present embodiment, there is a JP random determination time after the bet time, in which an effect of JP random determination of displaying a condition required for executing the JP game is executed. The condition required for executing the JP game is stop of the roulette ball image A31 at one or more predetermined number pocket A3211 in the normal game.

As shown in FIG. 24A to FIG. 24C, in the JP random determination effect, an effect of indicating one or more predetermined number pocket A3211 is executed. The JP random determination may not be executed in all unit games. In other words, the JP random determination time may not be provided.

Figure 26A:
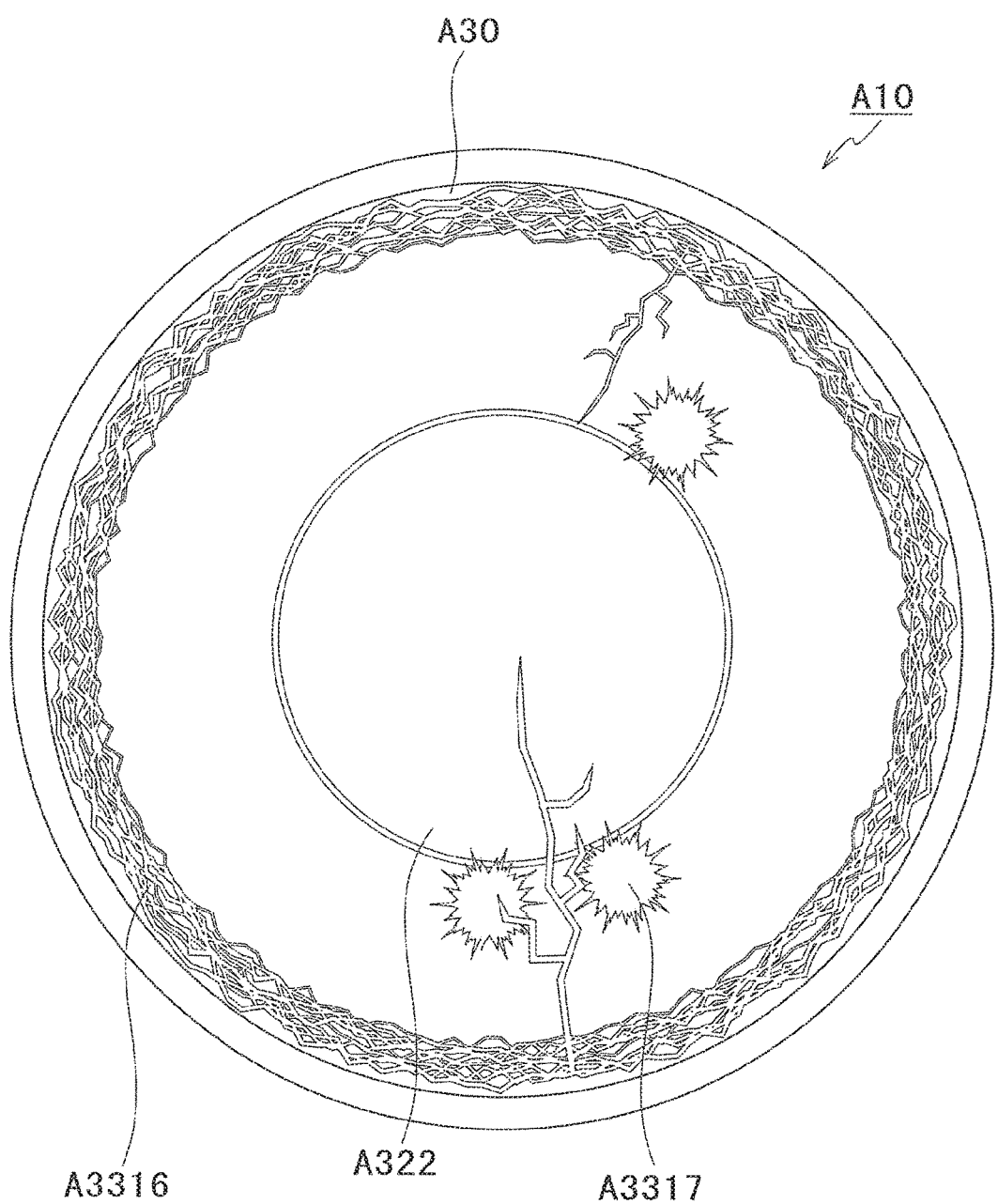
FIG. 26A is an example of the game effect image projected on the projection target mechanism.

As shown in FIG. 26A, when the JP random determination time starts, a lightning image A3316 showing the occurrence of lightning is displayed at the outer periphery of the bank area B1013. As shown in FIG. 26A, the lightning image A3316 may reach the hat area B1011 and the number area B1012. When this image is displayed, the roulette pocket A321 is not displayed. Then an explosion image A3317 showing explosion is displayed in each of regions (not illustrated) of the predetermined three number pockets A3211 of the roulette pocket A321. In other words, an effect that the lightning image A3316 burns the three number pockets A3211 which are not displayed and the explosion images A3317 are generated is executed.

Figure 26B:
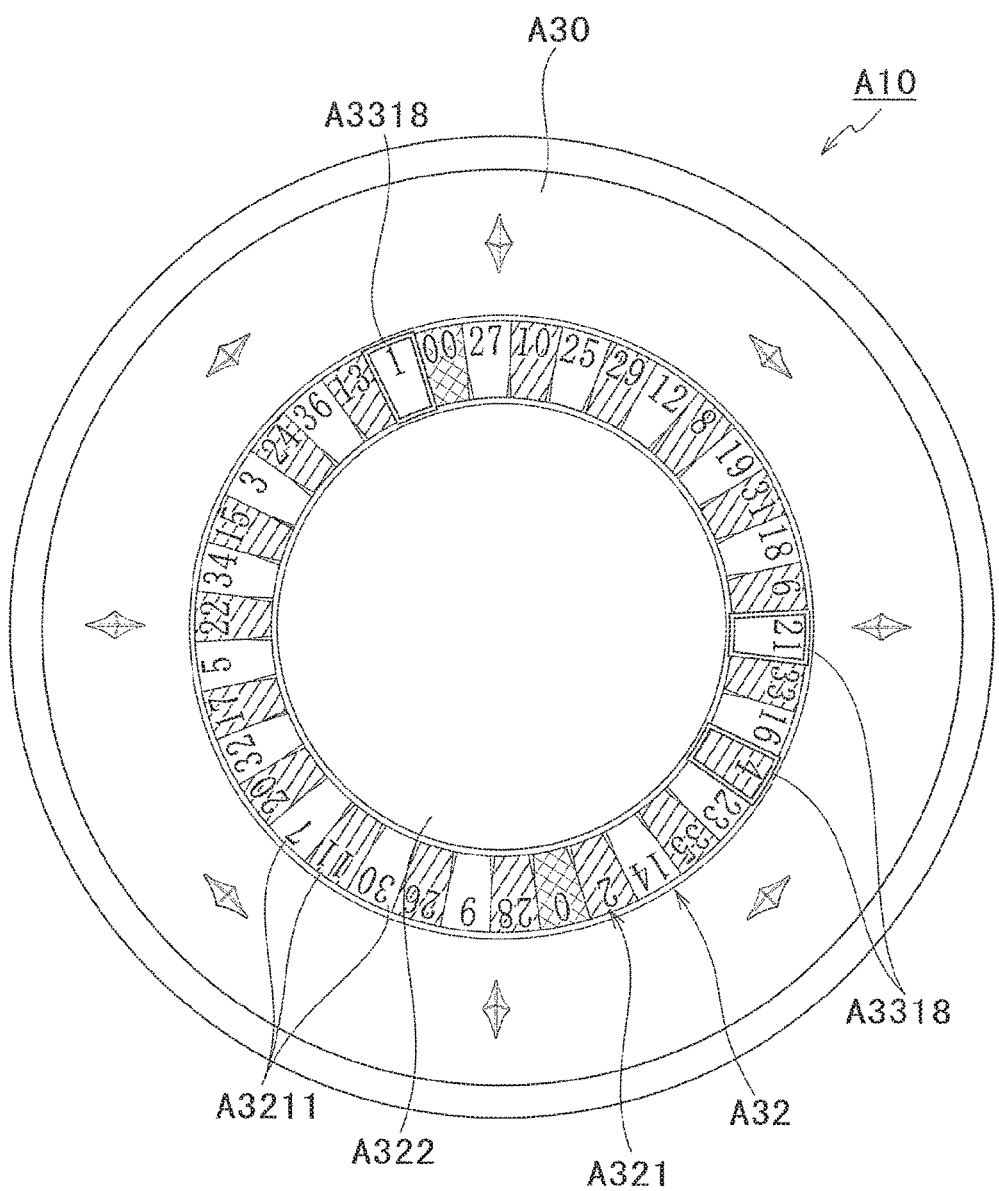
FIG. 26B is an example of the game effect image projected on the projection target mechanism.

Thereafter, as shown in FIG. 26B, the roulette pocket A321 is displayed and a frame image A3318 is displayed at each of the three predetermined number pockets A3211 of the roulette pocket A321 (JP number highlight effect). In the normal game, when the roulette ball image A31 stops at the number pocket A3211 indicated by the frame image A3318, the JP game starts after that execution of the normal game. The frame image A3318 is continuously displayed until the end of the unit game.

(Game Effect Images: Projection Target Mechanism B: Normal Game: Game Time)

As shown in FIG. 24A to FIG. 24C, after the JP random determination time in the normal game, the shooter time starts. In the shooter time, the rotating wheel A32 is continuously displayed in the hat area B1011 and the number area B1012 as shown in FIG. 26B. After the shooter time, the game time starts.

Figure 27A:
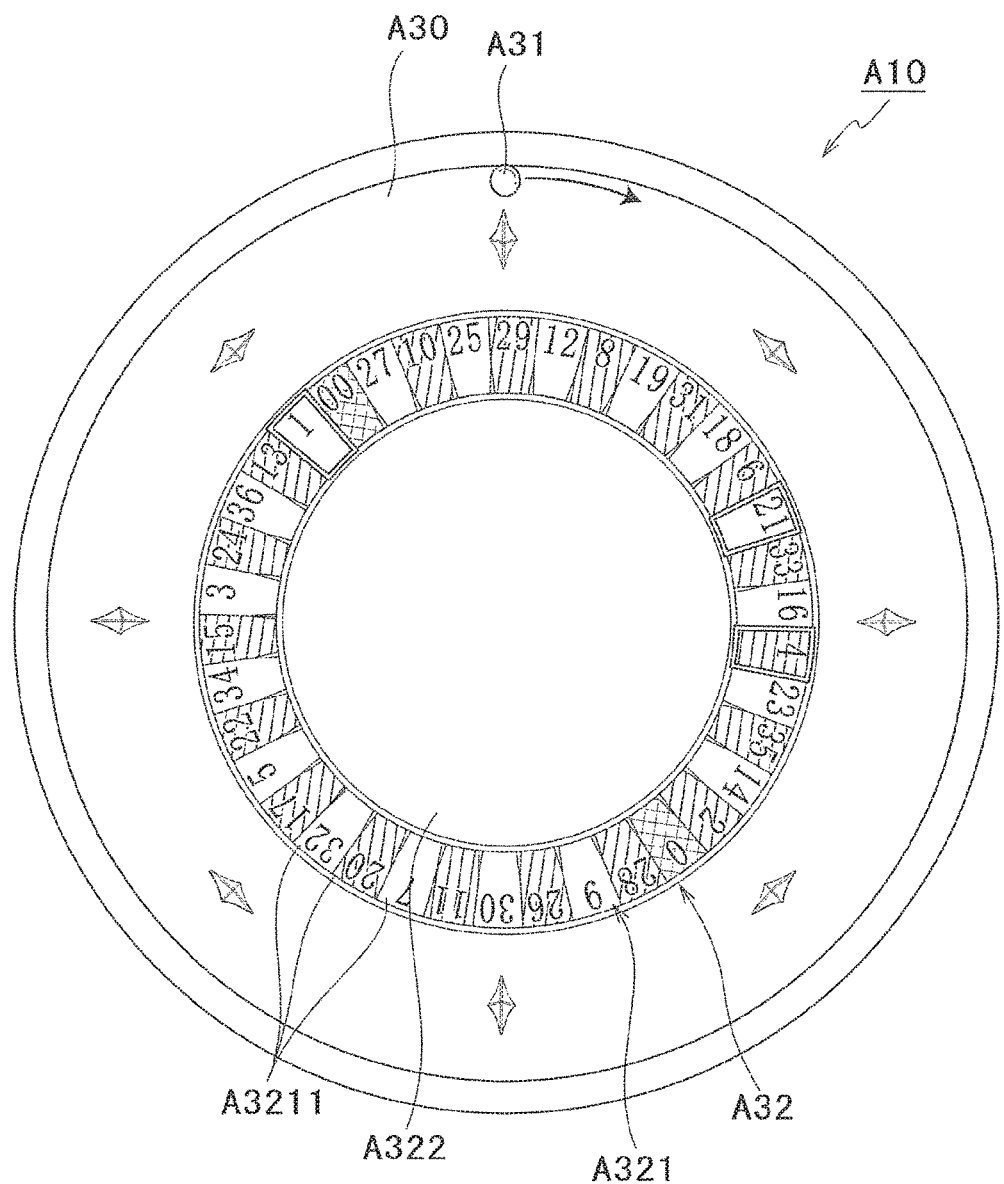
FIG. 27A is an example of the game effect image projected on the projection target mechanism.

As shown in FIG. 27A, in the game time, the roulette ball image A31 appears and starts to move. At the appearance of the roulette ball image A31, sound indicating the appearance is output. The movement of the roulette ball image A31 starts based on a player's operation of the shooter gaming terminal E in the shooter time. The roulette ball image A31 appears in the bank A30 in the vicinity of the shooter gaming terminal E. In the bank A30, the roulette ball image A31 starts the movement along the outer periphery of the bank A30. During the movement of the roulette ball image A31, an effect sound indicating the rolling of the ball is output.

Figure 27B:
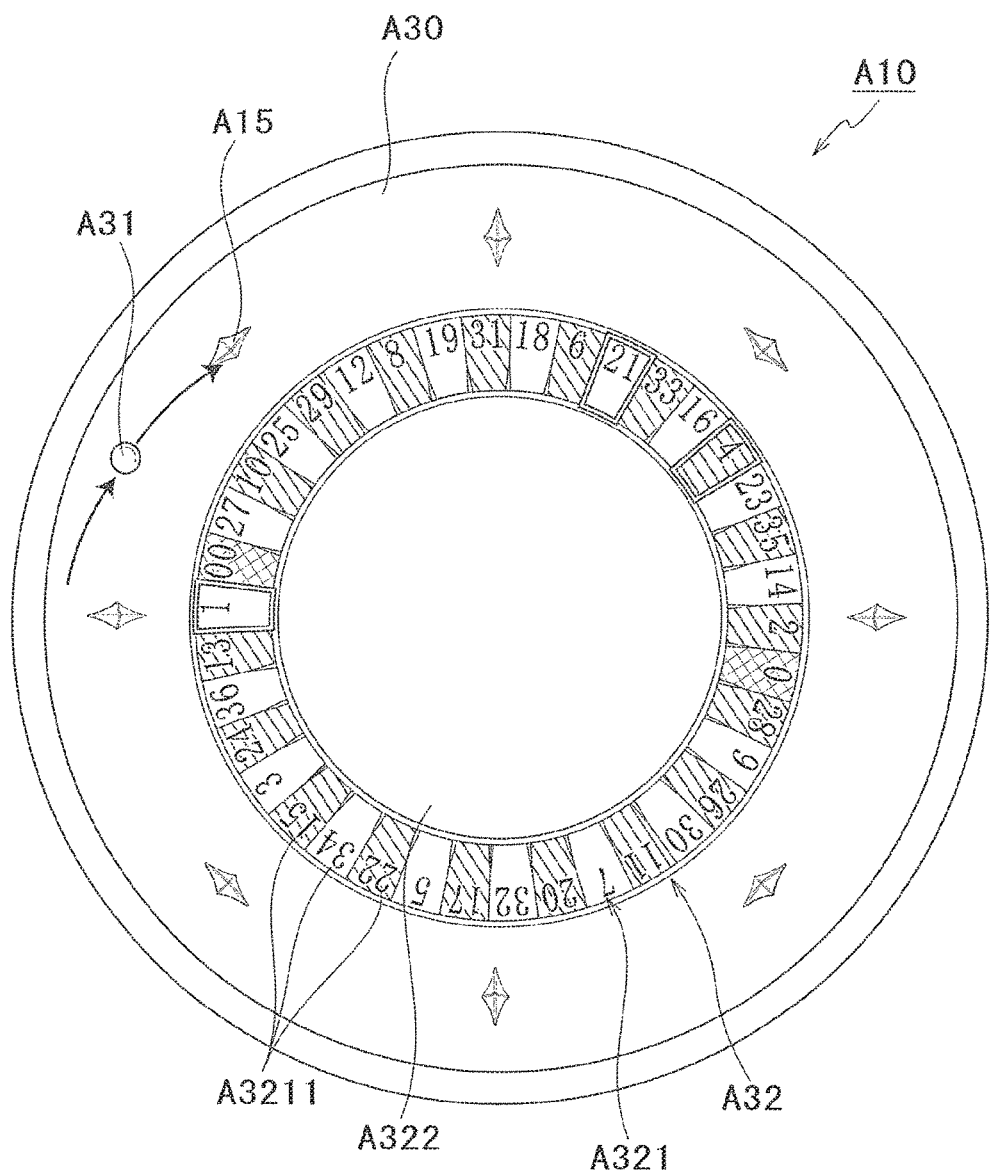
FIG. 27B is an example of the game effect image projected on the projection target mechanism.

Thereafter, as shown in FIG. 27B, the roulette ball image A31 moves in the bank A30 in the circumferential direction while approaching the central portion A322 from the outer periphery of the bank A30. In this regard, when the object of the roulette ball image A31 makes contact with a cat's eye image A15, an effect that the track of the roulette ball image A31 is changed by the cat's eye image A15 is executed. Furthermore, when the object of the roulette ball image A31 makes contact with the cat's eye image A15, one of three types of effect sounds is output in accordance with the state of the contact.

Figure 27C:
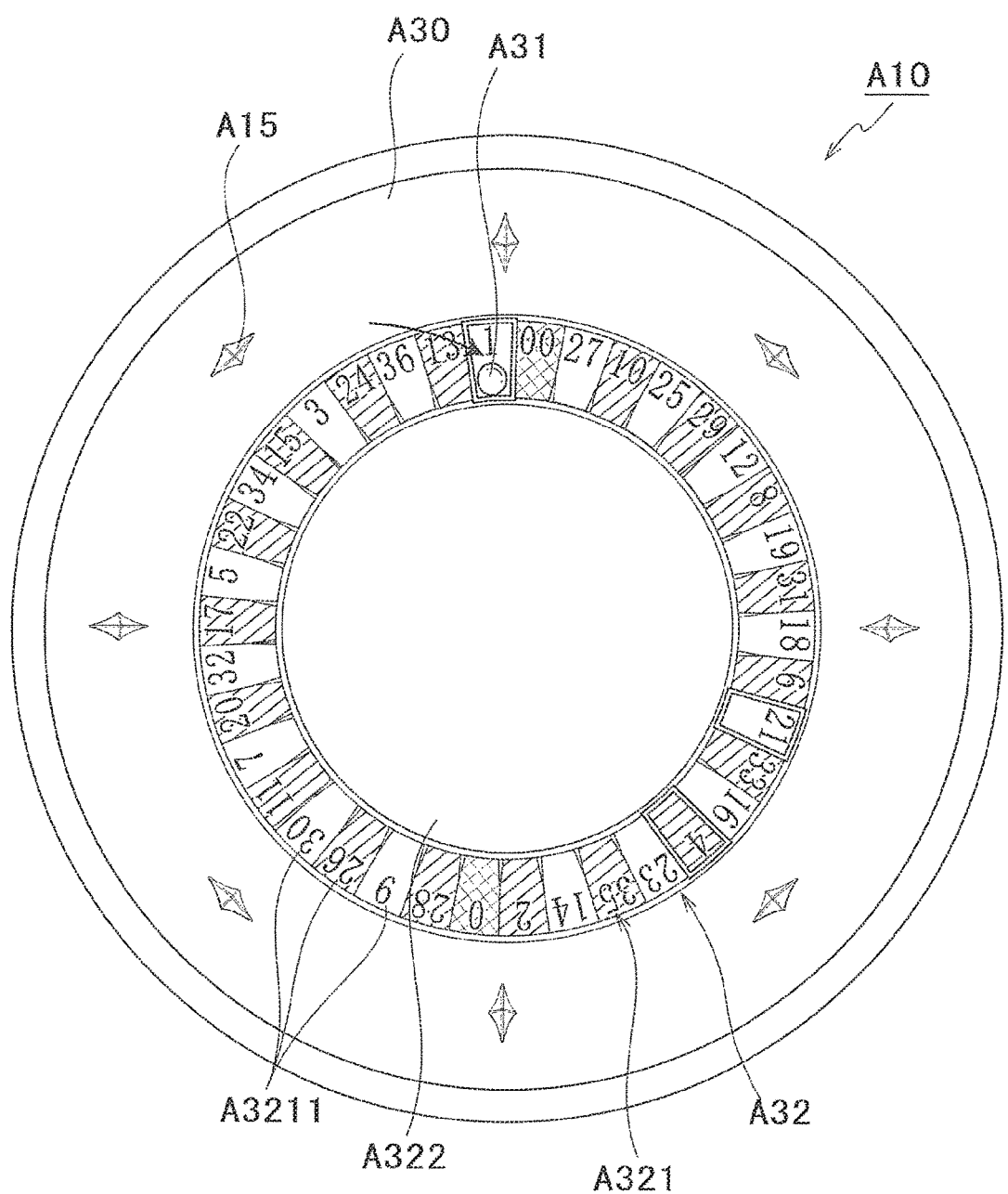
FIG. 27C is an example of the game effect image projected on the projection target mechanism.

Thereafter, as shown in FIG. 27C, the roulette ball image A31 stops at one of the number pockets A3211 of the roulette pocket A321. In this regard, this stop indicates that the roulette ball image A31 relatively stops at a region of a number pocket A3211. In other words, the roulette ball image A31 may be moving in sync with the rotation of the wheel A32. When the roulette ball image A31 makes contact with the number pocket A3211, one of five types of effect sounds is output in accordance with the state of the contact. Furthermore, when the roulette ball image A31 stops at the number pocket A3211, one of five types of effect sounds is output in accordance with the state of the stop.

(Game Effect Images: Projection Target Mechanism B: Normal Game: Result Time)

Figure 28:
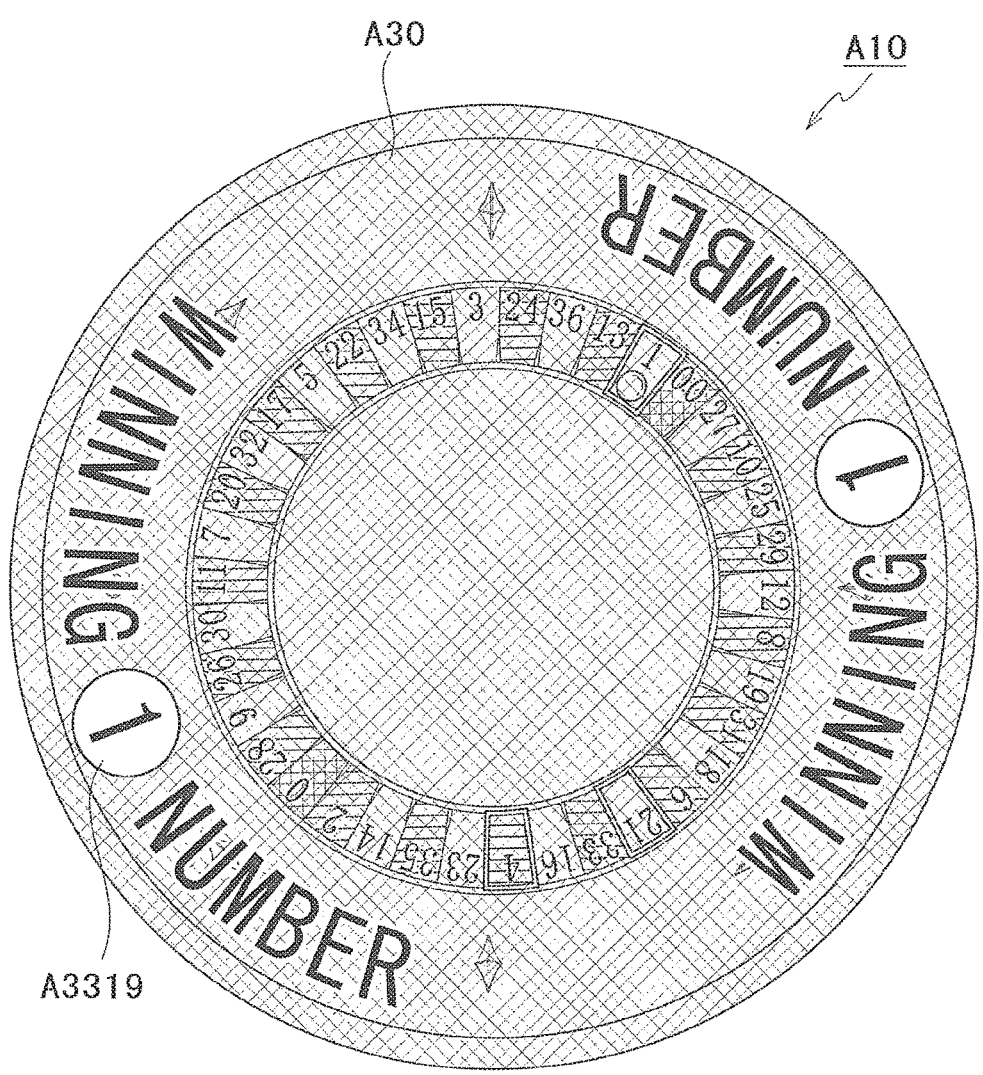
FIG. 28 is an example of the game effect image projected on the projection target mechanism.

As shown in FIG. 28, in the result time, the rotating wheel A10 is grayed out, and a result image A3319 notifying the number pocket A3211 at which the roulette ball image A31 stops is displayed in the bank A30.

The roulette ball image A31 may appear at the start of the shooter time. Furthermore, the roulette ball image A31 may be displayed in the bank A30 at the same time as the roulette pocket A321 is displayed as shown in FIG. 26B after the JP random determination effect shown in FIG. 26A is executed in the JP random determination time.

(Game Effect Images: Projection Target Mechanism B: JP Game)

Figure 29A:
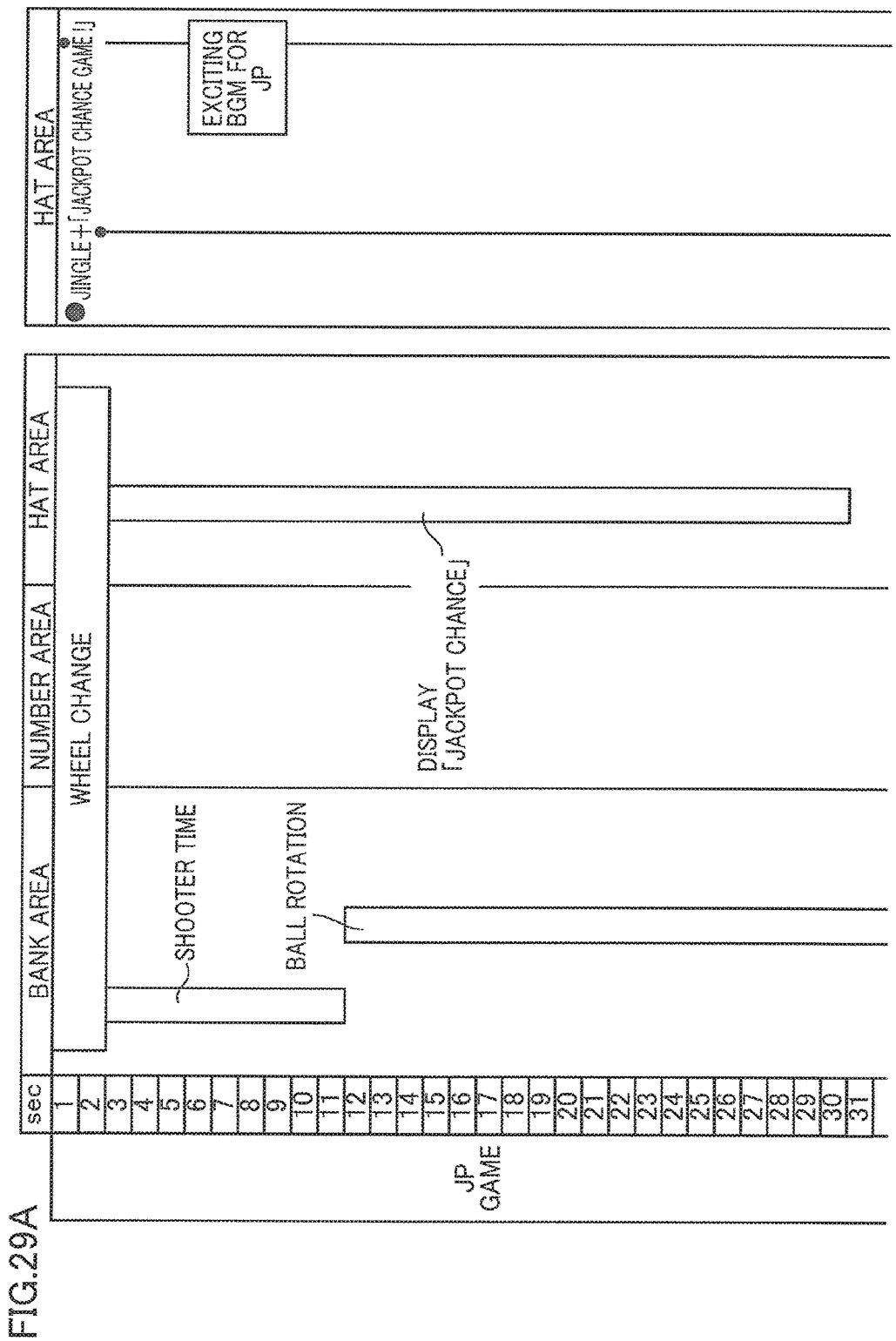
FIG. 29A illustrates a timing chart of the normal game.
Figure 29B:
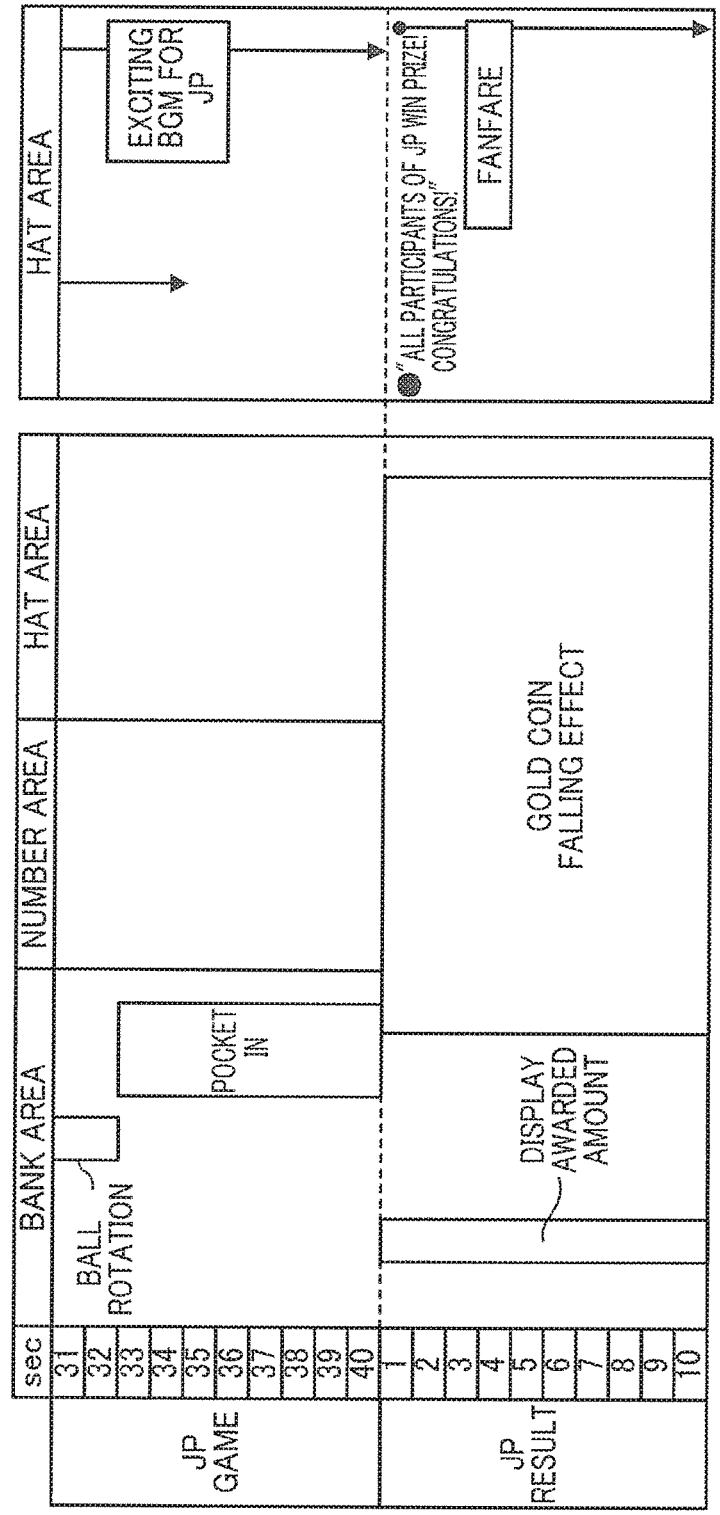
FIG. 29B illustrates a timing chart of the normal game.

FIG. 29A and FIG. 29B show timing charts of the game effect images in the hat area B1011, the number area B1012, and the bank area B1013 (see FIG. 19 and FIG. 20), respectively, and the sound effect executed by the effect sound output mechanism C in the JP game. The following will describe the effects executed by the projection target mechanism B and the effect sound output mechanism C in the JP game.

(Game Effect Images: Projection Target Mechanism B: JP Game: JP Game Time)

Figure 30A:
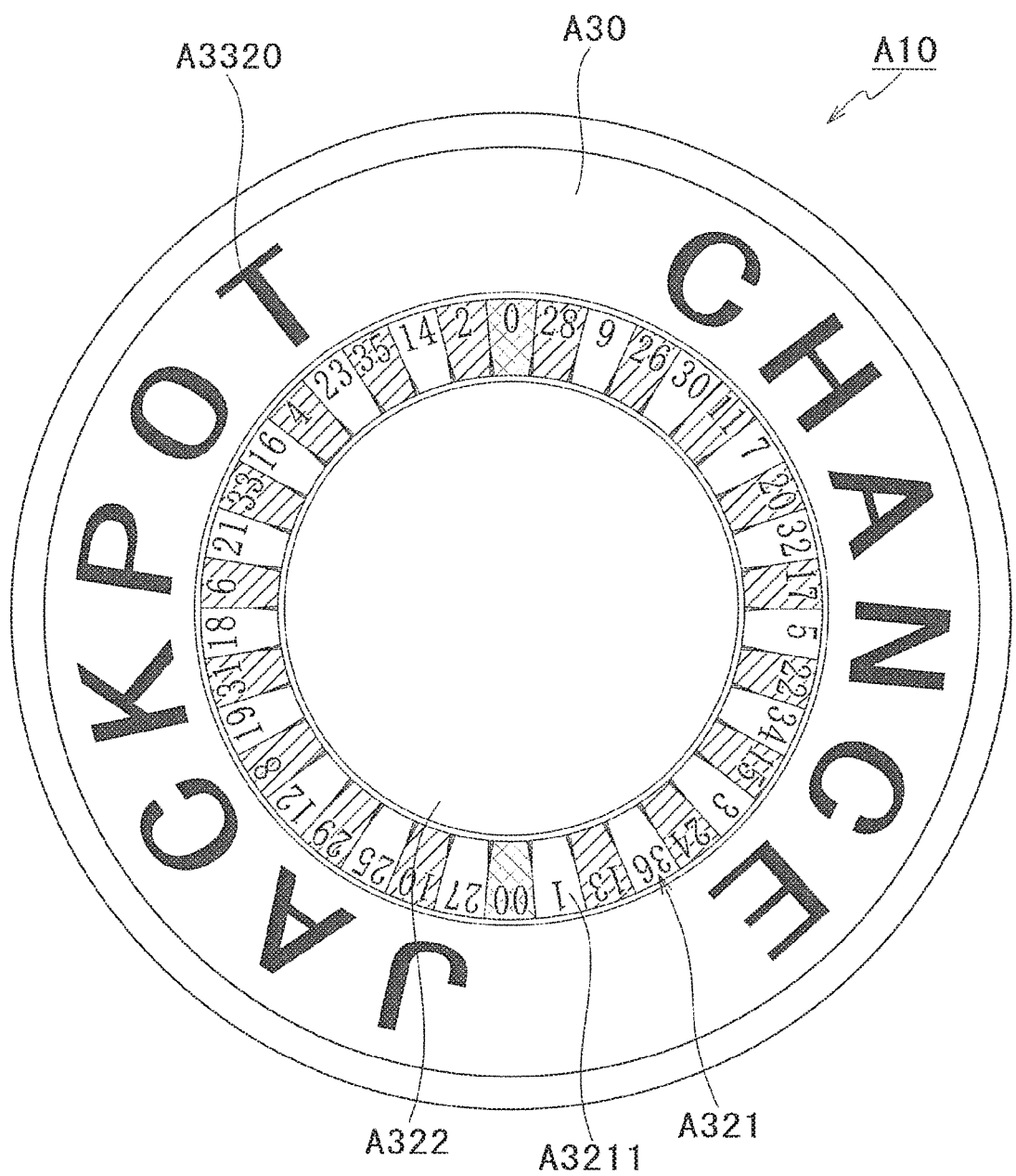
FIG. 30A is an example of the game effect image projected on the projection target mechanism.

As shown in FIG. 29A and FIG. 29B, the wheel A32 is changed in the JP game. To begin with, as shown in FIG. 30A, a JP game start image A3320 indicating "JACKPOT CHANCE" is displayed in the bank A30. In so doing, sound of a jingle (e.g., sound of ringing bell) is output, and a voice "JACKPOT CHANCE GAME" or "JACKPOT CHANCE" is output. Furthermore, although not illustrated, a spot light effect image of brightly lighting up plural parts of the rotating wheel A10 is preferably displayed. Furthermore, an effect that the JP game start image A3320 or another image indicating "JACKPOT CHANCE" may traverse the rotating wheel A10 in plural directions may be executed.

Thereafter, as shown in FIG. 30B to FIG. 30E, after the wheel A32 disappears, an effect that a JP wheel A34 gradually appears is executed. To be more specific, the JP wheel A34 includes four "BONUS BETS×10" pockets A3411, three "MINI JACKPOT" pockets A3412, two "MAJOR JACKPOT" pockets A3413, and one "MEGA JACKPOT" pocket A3414. These pockets A3411 to A3414 constitute a JP roulette pocket A341.

Figure 30B:
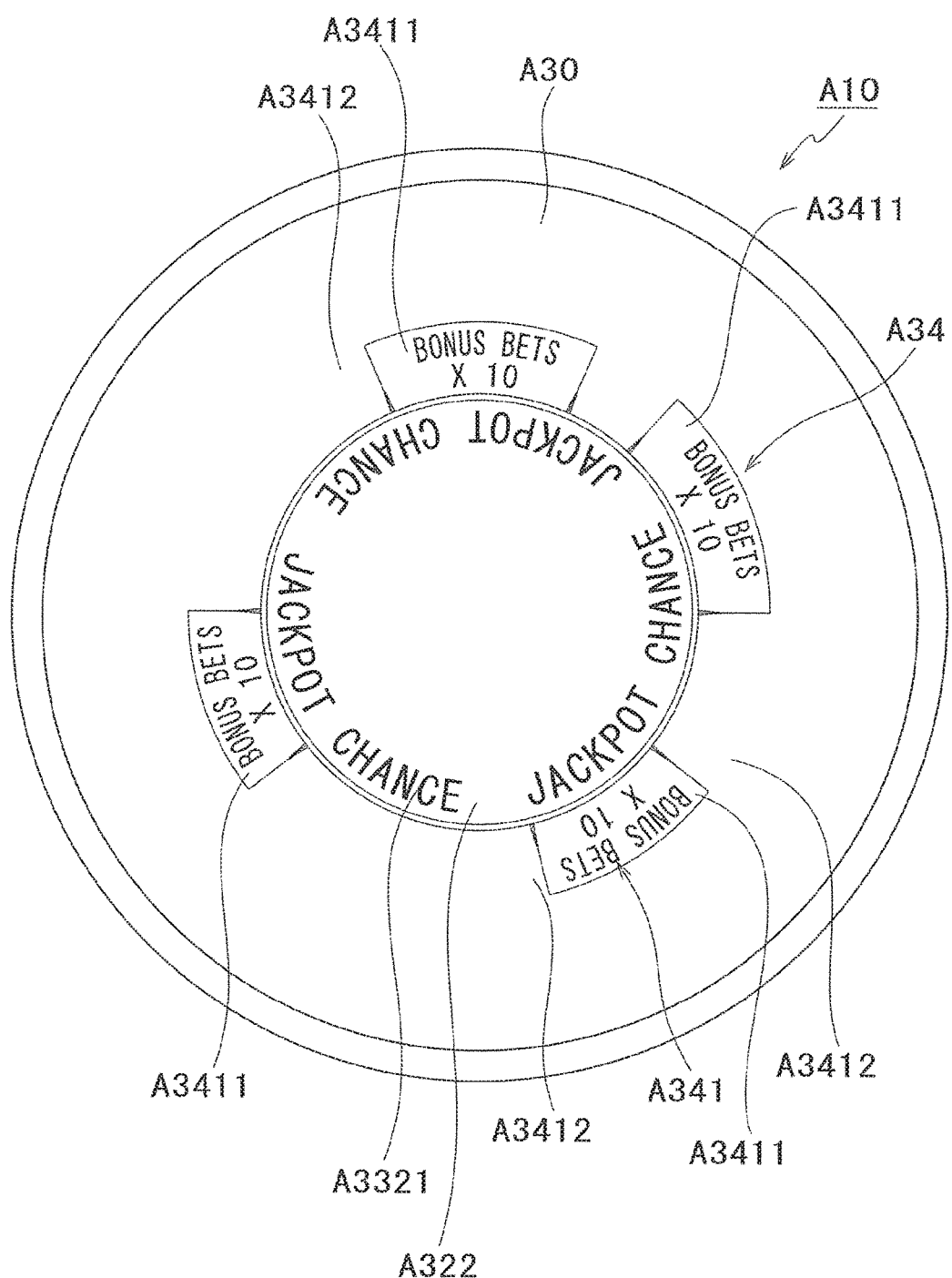
FIG. 30B is an example of the game effect image projected on the projection target mechanism.
Figure 30C:
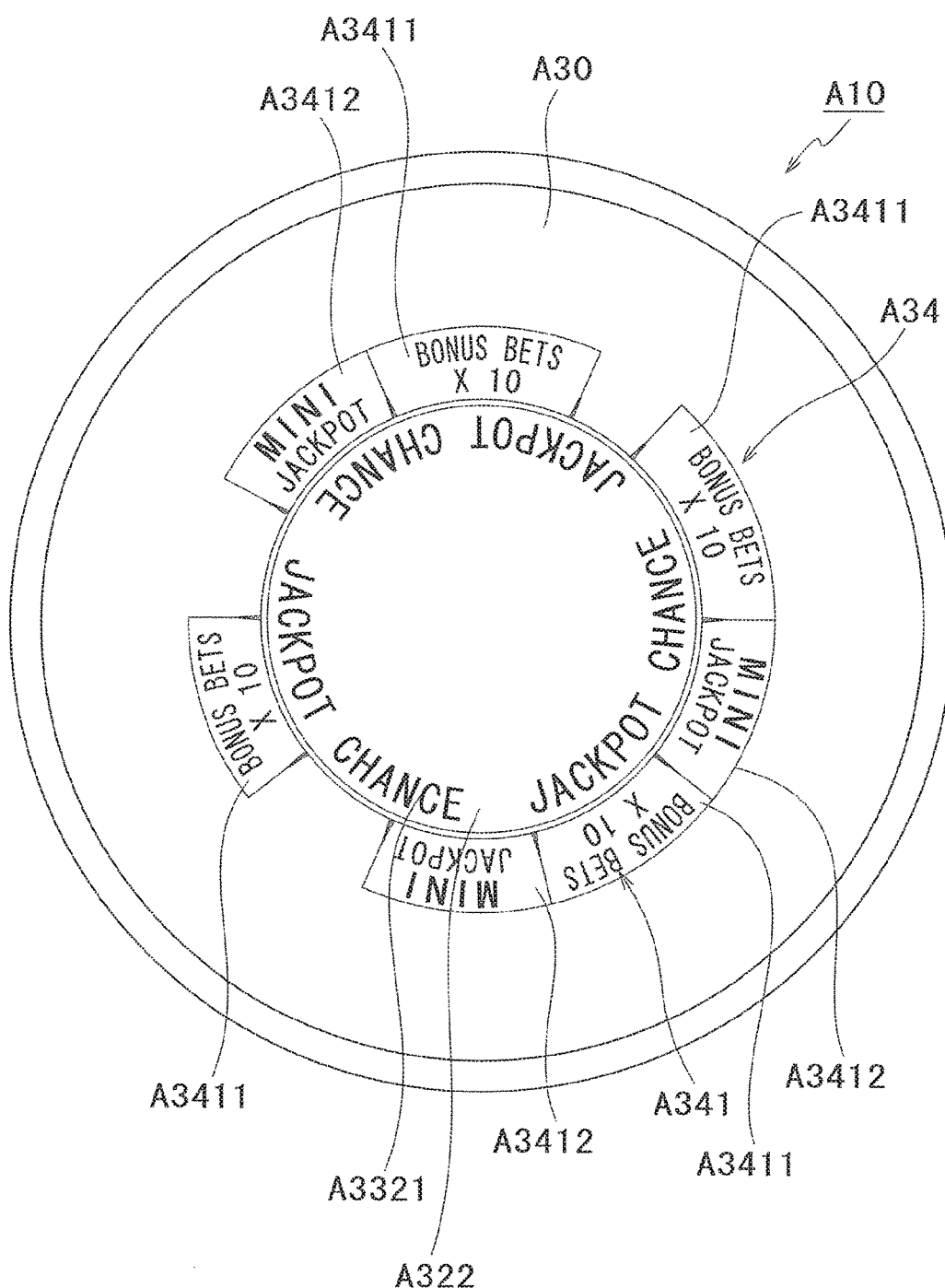
FIG. 30C is an example of the game effect image projected on the projection target mechanism.

As shown in FIG. 30B, to begin with, an image A3321 indicating "JACKPOT CHANCE" is displayed in the central portion A322. Then the four "BONUS BETS×10" pockets A3411 are displayed. Then, as shown in FIG. 30B, the three "MINI JACKPOT" pockets A3412 are displayed. Then, as shown in FIG. 30C, the two "MAJOR JACKPOT" pockets A3413 are displayed. Then, as shown in FIG. 30D, the one "MEGA JACKPOT" pocket A3414 is displayed. As such, all of the pockets A3411 to A3414 are displayed. When each of the pockets A3411 to A3414 appears, orchestral hit sound is output. At the same time as the output of the orchestral hit sound at the appearance of the "MEGA JACKPOT" pocket A3414, the background music of the JP game starts.

Figure 30E:
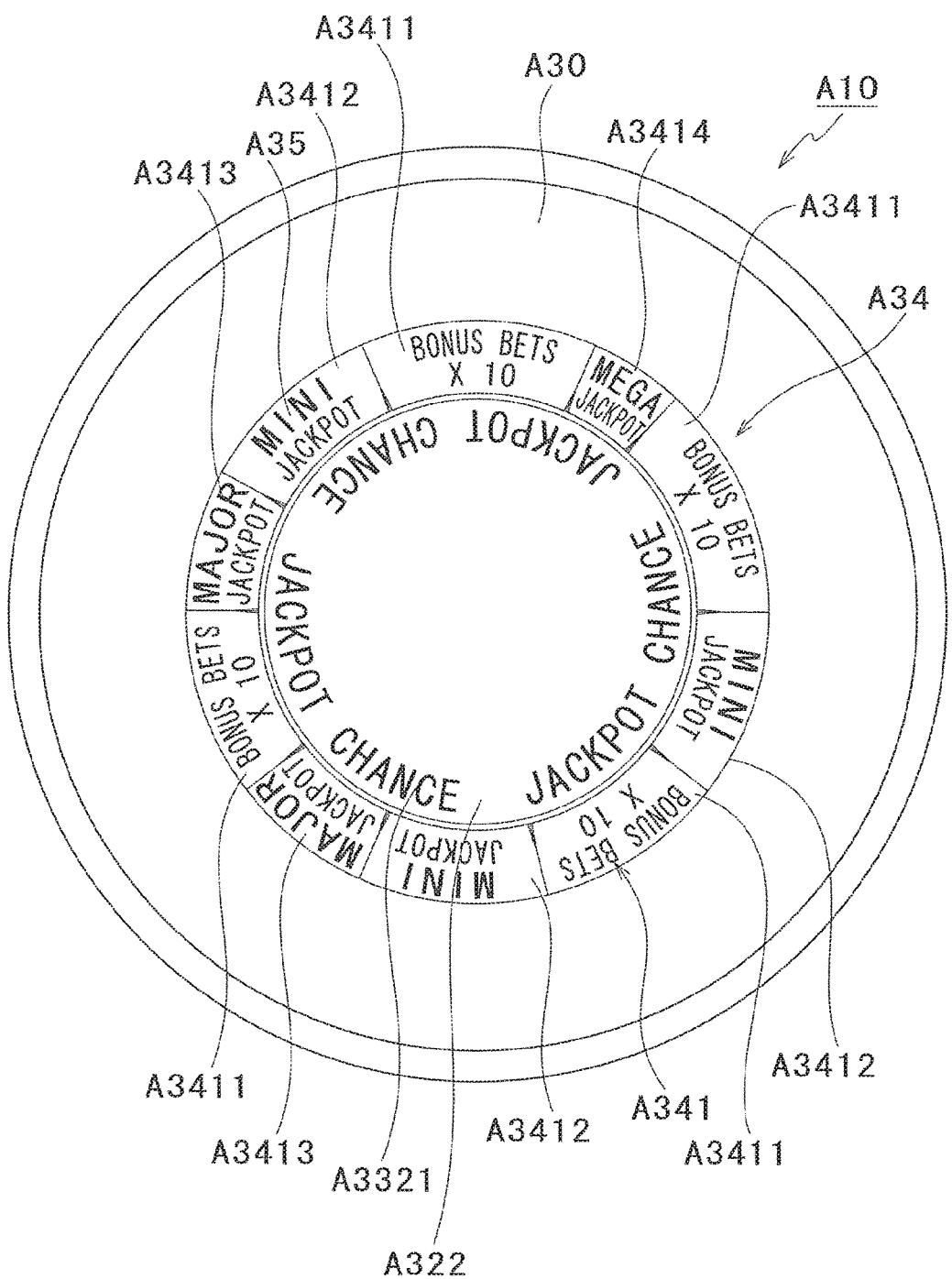
FIG. 30E is an example of the game effect image projected on the projection target mechanism.
Figure 30F:
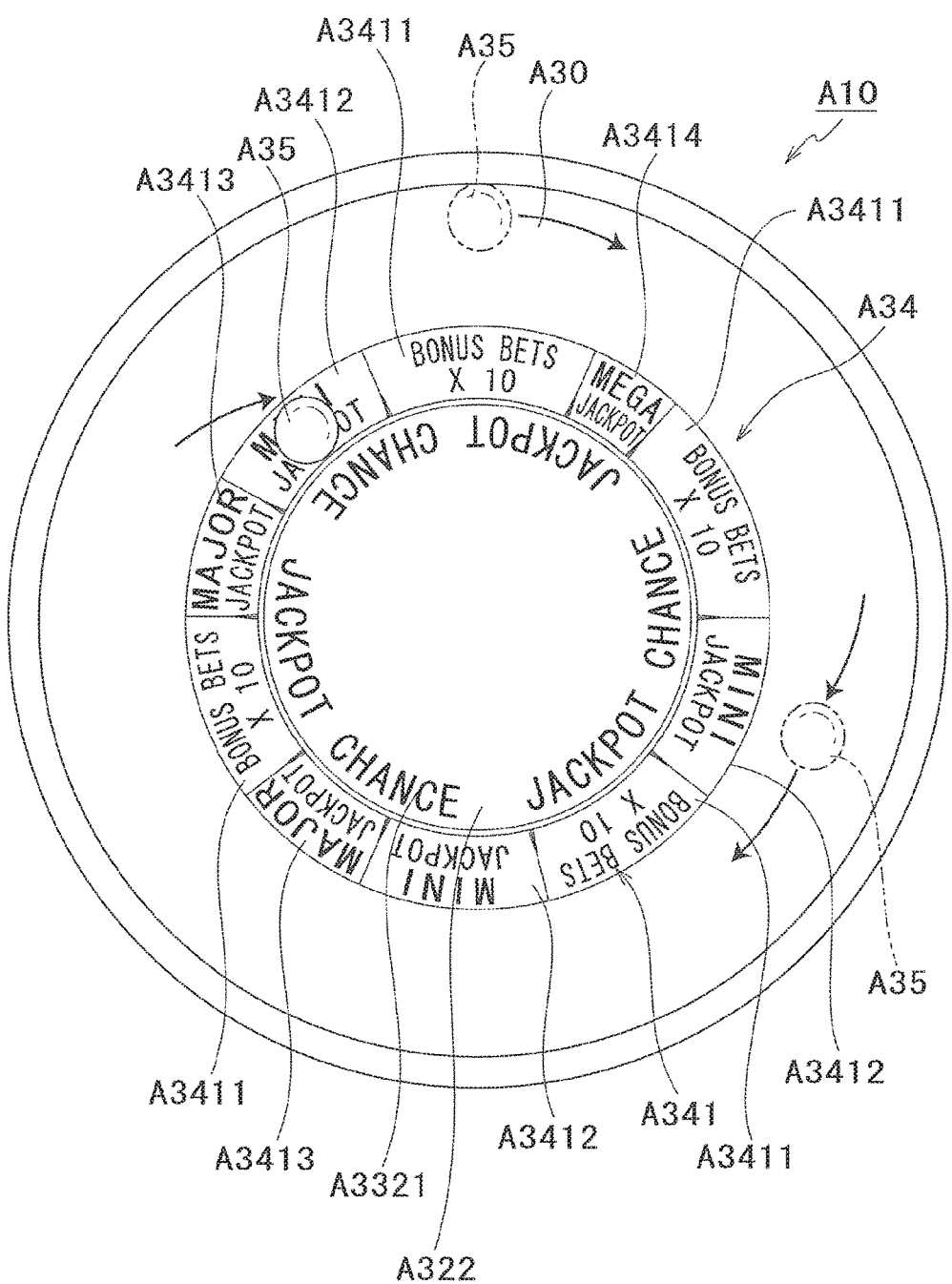
FIG. 30F is an example of the game effect image projected on the projection target mechanism.

Thereafter, as shown in FIG. 30F, after the shooter time (see FIG. 29A and FIG. 29B), a JP roulette ball image A35 which is larger than the roulette ball image A31 appears and starts to move. The movement of the JP roulette ball image A35 starts based on a player's operation of the shooter gaming terminal E in the shooter time. The JP roulette ball image A35 appears in the bank A30 in the vicinity of the shooter gaming terminal E. In the bank A30, the JP roulette ball image A35 starts to move along the outer periphery of the bank A30.

Thereafter, the JP roulette ball image A35 moves in the bank A30 along the circumferential direction while approaching the central portion A322 from the outer periphery of the bank A30. In this regard, when the object which is the JP roulette ball image A35 makes contact with the cat's eye image A15, an effect that the track of the JP roulette ball image A35 is changed by the cat's eye image A15 is executed. The JP roulette ball image A35 then stops at one of the pockets A3411 to A3414 (Pocket In). This stop (Pocket In) indicates that the JP roulette ball image A35 relatively stops in a region of one of the pockets A3411 to A3414. In other words, the JP roulette ball image A35 may be moving in sync with the rotation of the JP wheel A34.

(Game Effect Images: Projection Target Mechanism B: JP Game: JP Result Time)

Figure 31A:
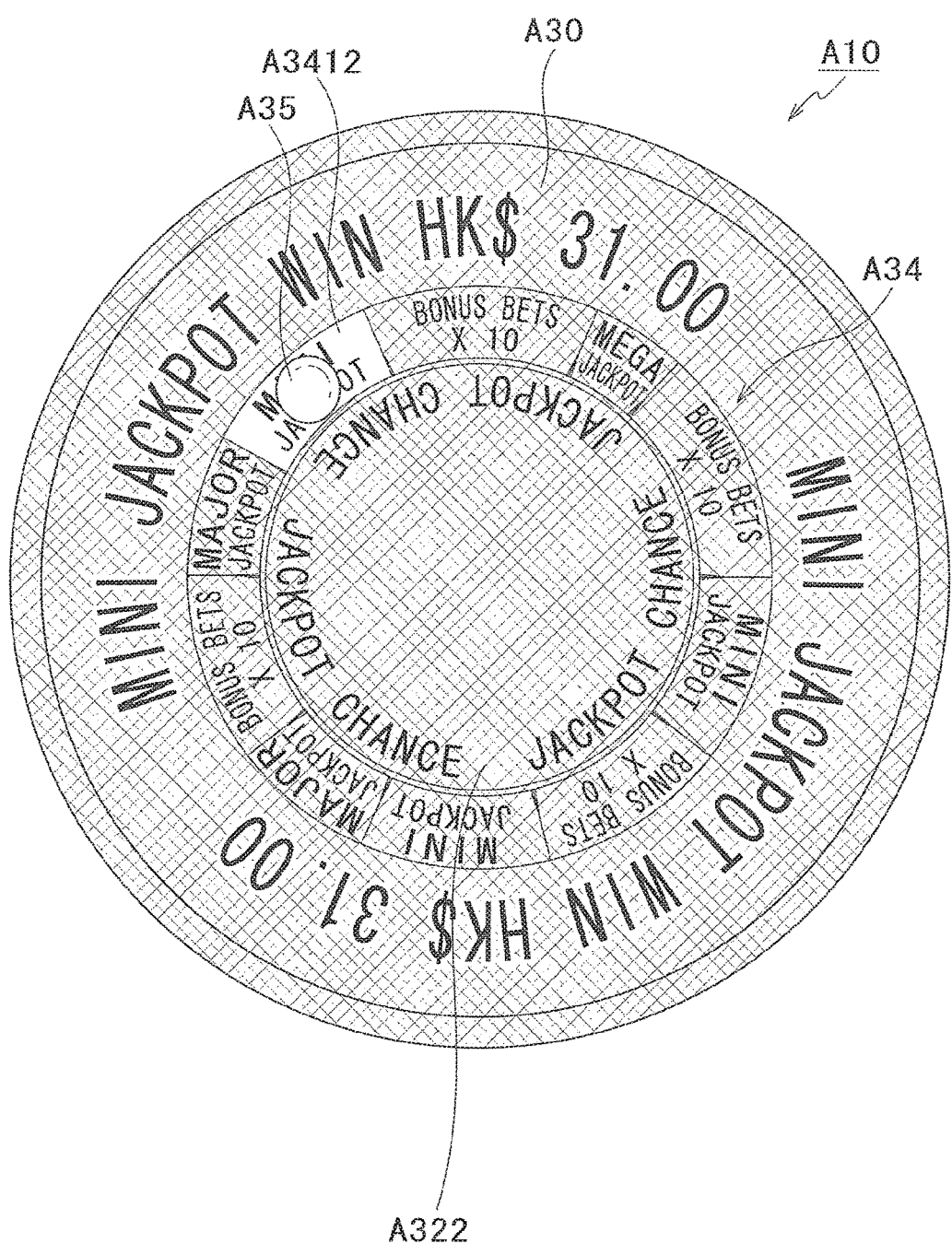
FIG. 31A is an example of the game effect image projected on the projection target mechanism.

As shown in FIG. 31A, in the result time, the rotating wheel A10 is grayed out except the JP roulette ball image A35 and one of the pockets A3411 to A3414 where the JP roulette ball image A35 has stopped. Then the content of a bonus associated with the one of the pockets A3411 to A3414 at which the JP roulette ball image A35 stops is indicated by a bonus result image A3322 in the bank A30. The bonus result image A3322 indicates information of the type of the bonus and an obtained prize. At this stage, sound indicating the type of the bonus is output. Furthermore, fanfare sound is output. Furthermore, as shown in FIG. 29A and FIG. 29B, an effect (not illustrated) that gold coins fall down may be executed in the number area B1012 and the hat area B1011 (see FIG. 19).

Figure 31B:
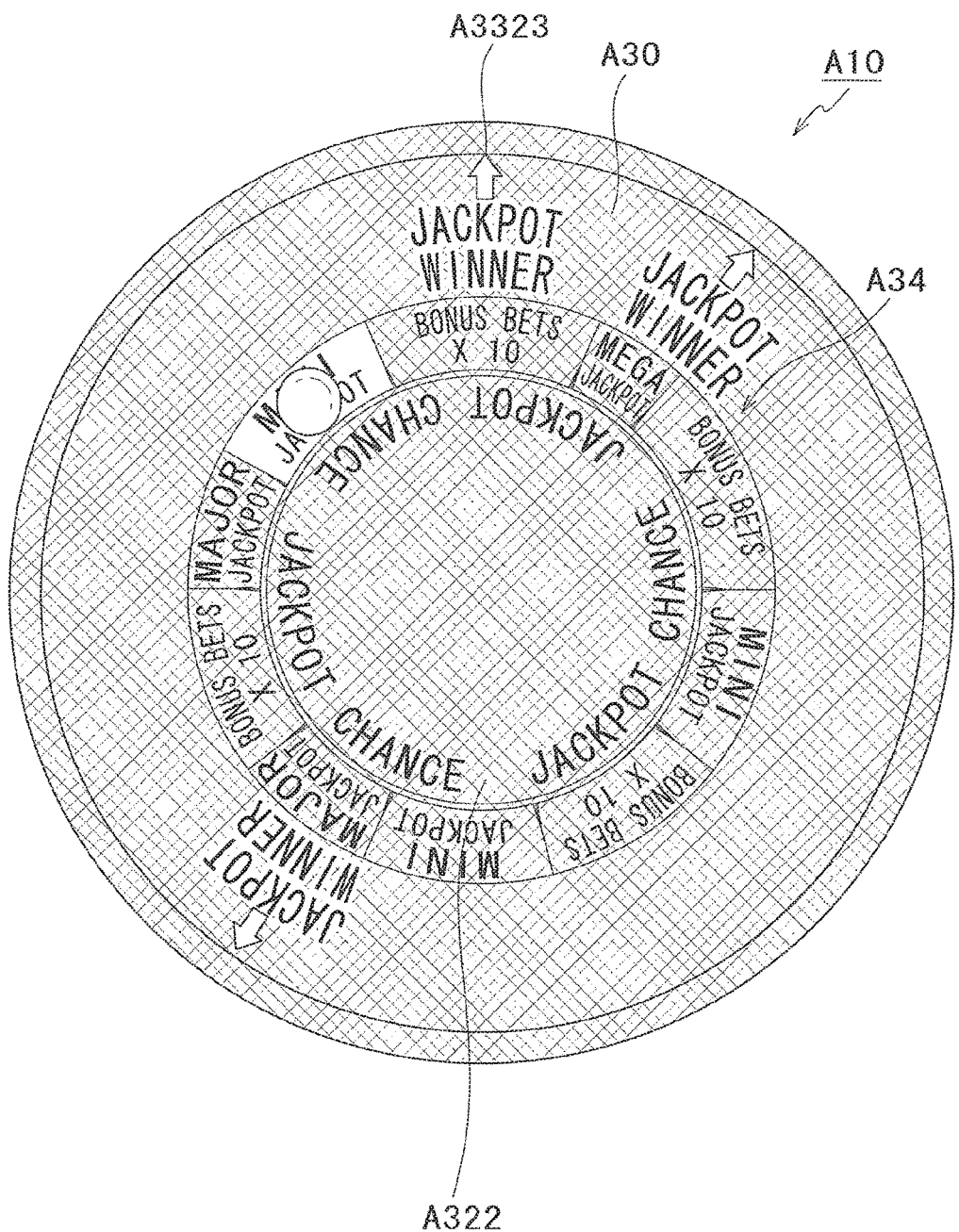
FIG. 31B is an example of the game effect image projected on the projection target mechanism.

In addition to the above, as shown in FIG. 31B, an arrow image A3323 may be displayed to point a gaming terminal E which has participated in the JP game and obtained a bonus. With this, for example, when the JP game is a game inviting participating players to predict at which one of the pockets A3411 to A3414 the JP roulette ball image A35 stops, it is easy to understand which player obtains a prize.

(Game Effect Images: Display Device D)

In accordance with the progress of the roulette, an effect is executed in the display device D at the same time as the above-described effects executed by the projection target mechanism B and the effect sound output mechanism C. The following will describe game effect images displayed on the display device D.

As shown in FIG. 32A, the display device D is provided with a jackpot amount display area D351, a hot number display area D352, a central display area D353, a cold number display area D354, a first history display area D355, and a second history display area D356. The jackpot amount display area D351 is provided at an upper end portion of a display screen of the display device D. The central display area D353 is provided at a central portion of the display device D. The hot number display area D352 and the cold number display area D354 are provided to the left and right of the central display area D353, respectively. The first history display area D355 and the second history display area D356 are provided below the central display area D353.

(Game Effect Images: Display Device D: Central Display Area D353)

As shown in FIG. 32A, the central display area D353 displays a frequency graph image D3530. The frequency graph image D3530 is displayed in the bet time of the normal game and indicates how many times the roulette ball stops at each pocket in the past 200 unit games. To be more specific, the frequency graph image D3530 includes a pocket image D3531 and bar graph images D3532. The pocket image D3531 looks like the roulette pocket A321 and annular in shape, and includes plural number pockets. The outer shape of the pocket image D3531 is elliptical and laterally long. The bar graph image D3532 is substantially trapezoidal in outer shape, and is provided in an annular inner region of the pocket image D3511 to correspond to each of the number pockets. The bar graph image D3532 indicates how many times the roulette ball stops at the corresponding pocket in the past 200 unit games, by the length of the image radially inward. In other words, the more the number of times the roulette ball stops at the corresponding pocket in the past 200 unit games is, the longer the bar graph image D3532 is radially inward. The length of the bar graph image D3532 changes in six stages.

To be more specific, the first stage corresponds to a case where the number of times of stop is zero in the past 200 times. The bar graph image D3532 corresponding to the number pocket at this stage is not displayed. The second stage corresponds to a case where the number of times of stop is one or two in the past 200 times. The third stage corresponds to a case where the number of times of stop is three or four in the past 200 times. The fourth stage corresponds to a case where the number of times of stop is five or six in the past 200 times. The fifth stage corresponds to a case where the number of times of stop is seven or eight in the past 200 times. The sixth stage corresponds to a case where the number of times of stop is nine or ten in the past 200 times.

Although not illustrated, the bar graph image D3532 is displayed in one of the following two patterns: in gradation from orange to yellow changing radially inward, and in orange. The gradation from orange to yellow corresponds to the smaller number in each stage (e.g., three in the third stage), whereas the orange corresponds to the larger number in each stage (e.g., four in the third stage). When the bar graph image D3532 is updated (the number of times of stop is increased or decreased), an effect of illuminating the part to be updated is executed, and then the image after the update is displayed.

After the bet time, as shown in FIG. 21, the central display area D353 displays a game effect image which is in sync with the rotating wheel A10 project on the projection target mechanism B. Being similar to the JP game time in the JP game, the game effect image in sync with the rotating wheel A10 is displayed. It is noted that the game effect image which is displayed on the display device D and in sync with the rotating wheel A10 is not limited to an image of the rotating wheel viewed from a viewpoint obliquely above the rotating wheel as shown in FIG. 21. For example, in the same manner as the rotating wheel A10, a precisely circular rotating wheel D10 may be displayed. In such a case, the jackpot amount display area D351, the hot number display area D352, the cold number display area D354, the first history display area D355, and the second history display area D356 may be downsized and the central display area D353 is enlarged to display the rotating wheel D10 in a large size.

As shown in FIG. 32B, image display on the display device D is switched to a rotating wheel partial enlargement image D10a showing an enlarged view of the number pocket A3211 at which the roulette ball image A31 will stop and the surroundings thereof, immediately before the stop of the roulette ball image A31 on the rotating wheel A10. In the central display area D353, display of the rotating wheel partial enlargement image D10a is continued even in the result time.

Figure 32C:
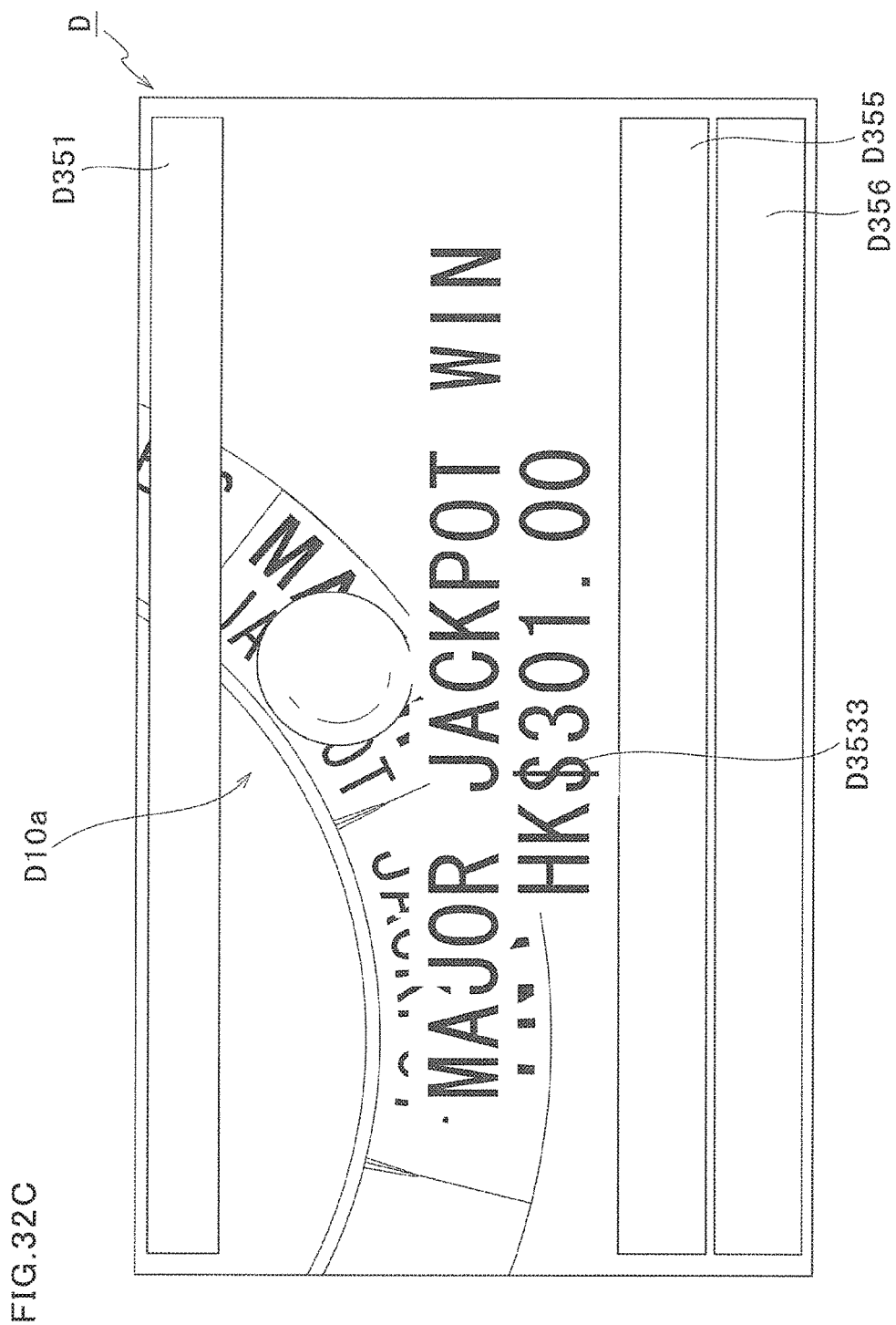
FIG. 32C is an example of the game effect image displayed on the display device.

As shown in FIG. 32C, in the JP result time, a bonus result image D3533 indicating the type of a bonus and an obtained prize is displayed on the rotating wheel partial enlargement image D10a. In so doing, the hot number display area D352 and the cold number display area D354 are switched to non-display to facilitate the visibility of the rotating wheel partial enlargement image D10a.

(Game Effect Images: Display Device D: Jackpot Amount Display Area D351)

As shown in FIG. 33A, the jackpot amount display area D351 indicates a payout amount of a bonus of each type obtained in the JP game. The types of the bonuses in the JP game are as follows: mega jackpot with the largest payout amount; major jackpot with the second largest payout amount, mini jackpot with the third largest payout amount, and fixed payout with the smallest payout amount. In the jackpot amount display area D351, payout amounts of the mega jackpot, the major jackpot, and the mini jackpot are displayed. The payout amount of the fixed payout is ten times as much as the bet amount in the normal game in which the JP game has been triggered. Each value displayed in the jackpot amount display area D351 increases with animation similar to that in the normal game. Each value displayed in the jackpot amount display area D351 is displayed again after winning in the JP game, and is updated. Each value displayed in the jackpot amount display area D351 is displayed in nine digits at the maximum, for all of the mega jackpot, the major jackpot, and the mini jackpot.

(Game Effect Images: Display Device D: Hot Number Display Area D352)

Figure 33B:
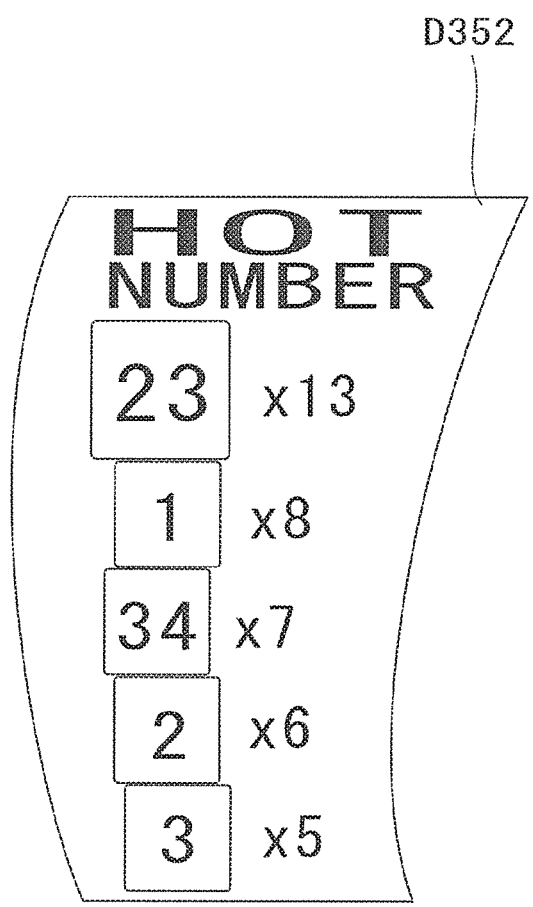
FIG. 33B is an example of the game effect image displayed on the display device.

As shown in FIG. 33B, in the hot number display area D352, the numbers of five number pockets A3211 at which the roulette ball has stopped for the largest numbers of times in the past executions of the normal game are displayed with the numbers of times of stop at the respective number pockets A3211. When update is performed, a number is replaced with a different number while the frame surrounding that number emits light.

(Game Effect Images: Display Device D: Cold Number Display Area D354)

Figure 33C:
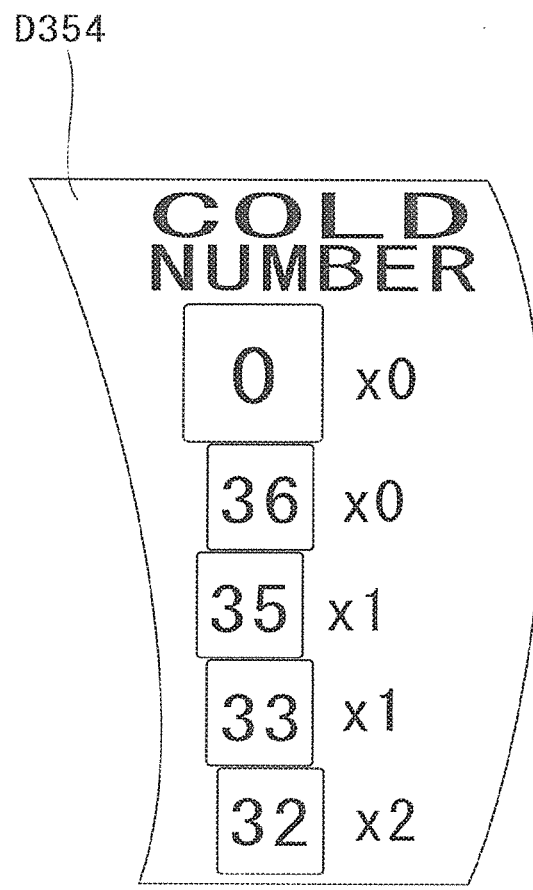
FIG. 33C is an example of the game effect image displayed on the display device.

As shown in FIG. 33C, in the cold number display area D354, the numbers of five number pockets A3211 at which the roulette ball has stopped for the smallest numbers of times in the past executions of the normal game are displayed with numbers of times of stop at the respective number pockets A3211. When update is performed, a number is replaced with a different number while the frame surrounding that number emits light.

(Game Effect Images: Display Device D: First History Display Area D355)

In the first history display area D355, the number of times of stop at each number pocket A3211 in the past 200 unit games is indicated by a bar graph, and the history of side betting is also indicated.

To be more specific, as shown in FIG. 33D, in the first history display area D355, the number of times of stop at each number pocket A3211 is indicated by a bar graph. In the row of the bar graphs, the numbers of times of stop at the respective number pockets A3211 increase leftward. The larger the number of times of stop is, the longer the bar graph is. The length of the bar graph is indicated in 11 stages (0, 1, . . . , 9, and 10 or more). Although not illustrated, a red number pocket A3211 is indicated by a red bar graph, a black number pocket A3211 is indicated by a black bar graph, and number pockets A3211 "0" and "00" are indicated by green bar graphs. When update is performed, a bar graph to be changed emits light, and the length of the bar graph is increased or decreased and the rank is changed. When two or more number pockets A3211 are identical in the number of times of stop, the number pockets A3211 are lined up in such a way that the larger the number of times of stop is, the closer the number pocket A3211 is to the left end.

Figure 33E:
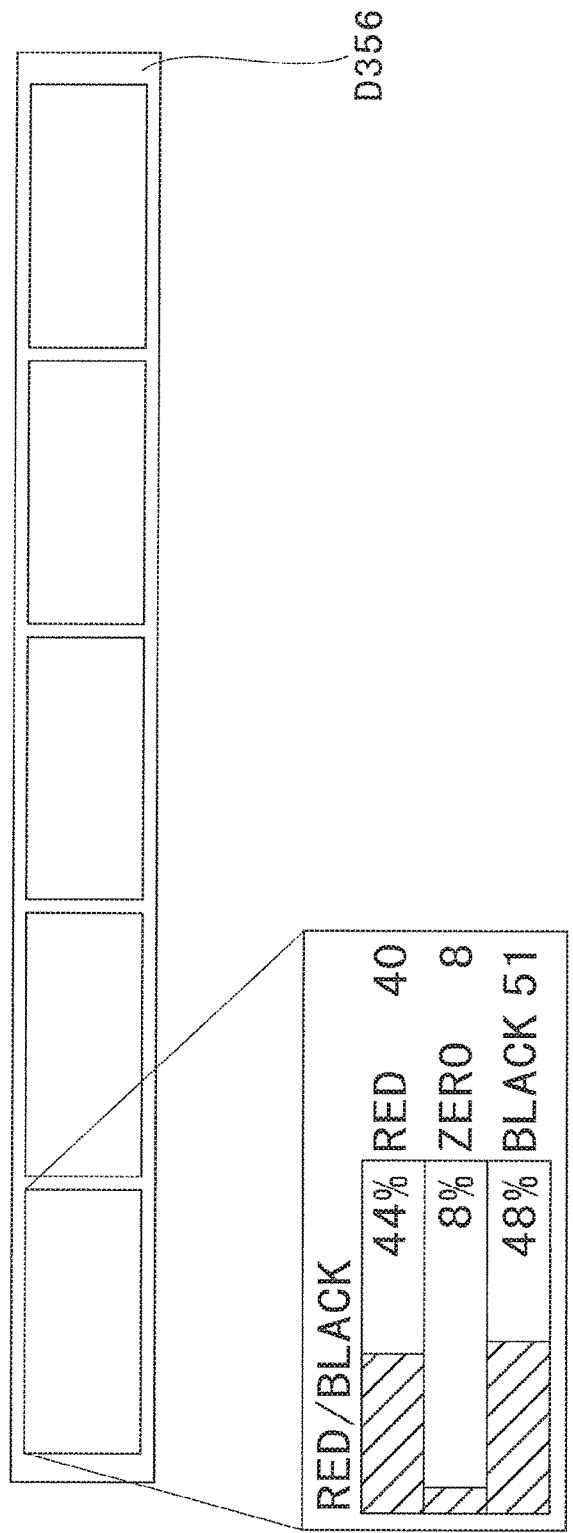
FIG. 33E is an example of the game effect image displayed on the display device.

In addition to the above, as shown in FIG. 33E, in the first history display area D355, the history of side betting is indicated by a bar graph. That is to say, in regard to five types of betting, "RED/BLACK", "EVEN/ODD", "1 to 8/19 to 36", "DOZEN", and "COLUMN" are displayed with information indicating the rates of types and the numbers of times the respective types are selected. To be more specific, in case of the "RED/BLACK", the rates of RED, ZERO, and BLACK are shown with the number of times the respective types are selected. In case of "EVEN/ODD", the rates of EVEN (even numbers), ZERO, and ODD (odd numbers) are shown with the number of times the respective types are selected. In case of "1 to 8/19 to 36", the rates of "1 to 8", ZERO, and "19 to 36" are shown with the number of times the respective types are selected. In case of "DOZEN", the rates of "1st (1 to 12)", "2nd (13 to 24)", and "3rd (25 to 36)" are shown with the number of times the respective types are selected. In case of "COLUMN", the rates of "1st (1, 4, 7, 10, 13, 16, 19, 22, 25, 28, 31, 34)", "2nd (2, 5, 8, 11, 14, 17, 20, 23, 26, 29, 32, 35)", and "3rd (3, 6, 9, 12, 15, 18, 21, 24, 27, 30, 33, 36)" are shown with the number of times the respective types are selected. When update is performed, the bar graphs and the numbers are displayed again. For example, when a bar graph is elongated, the corresponding number is counted up at the same time. In the first history display area D355, these two image displays are alternated at intervals of 10 seconds.

(Game Effect Images: Display Device D: Second History Display Area D356)

As shown in FIG. 33F, in the second history display area D356, the history of the number pockets A3211 at which the roulette ball image A31 has stopped in the past 15 unit games is displayed. When update is performed, the latest number is displayed first, and then the numbers are updated one by one from the left. Furthermore, a part of the history indicating the normal game in which the JP game was triggered is highlighted.

The update in the hot number display area D352, the cold number display area D354, the first history display area D355, and the second history display area D356 is executed when the roulette ball image A31 stops at a number pocket A3211 in the result time of the normal game. Furthermore, immediately before the start of the bet time of the normal game, the result of the previous execution of the normal game is reflected to the frequency graph image D3530 in the central display area D353.

(Game Effect Images: Trajectories of Roulette Ball Image)

As described with reference to FIG. 27A to FIG. 27C, in the normal game, on the rotating wheel A10, the start of the movement of the roulette ball image A31 relative to the roulette pocket A321 is triggered by a player's operation of the gaming terminal E, and the movement relative to the roulette pocket A321 is stopped at one of the number pockets A3211. In the JP game, on the rotating wheel A10, the start of the movement of the JP roulette ball image A35 relative to the JP roulette pocket A341 is triggered by a player's operation of the gaming terminal E, and the movement relative to the roulette pocket A321 is stopped at one of the pockets A3411 to A3414. The following will describe how the movement locus in the three-dimensional space is determined for displaying the movement of the roulette ball image A31 and the movement of the JP roulette ball image A35. For the sake of convenience, the following explanation will be made with reference to the game effect images displayed on the rotating wheel A10.

(Game Effect Images: Trajectory of Roulette Ball Image: To Region Between Cat's Eye Image A15 and Roulette Pocket A321)

Figure 35:
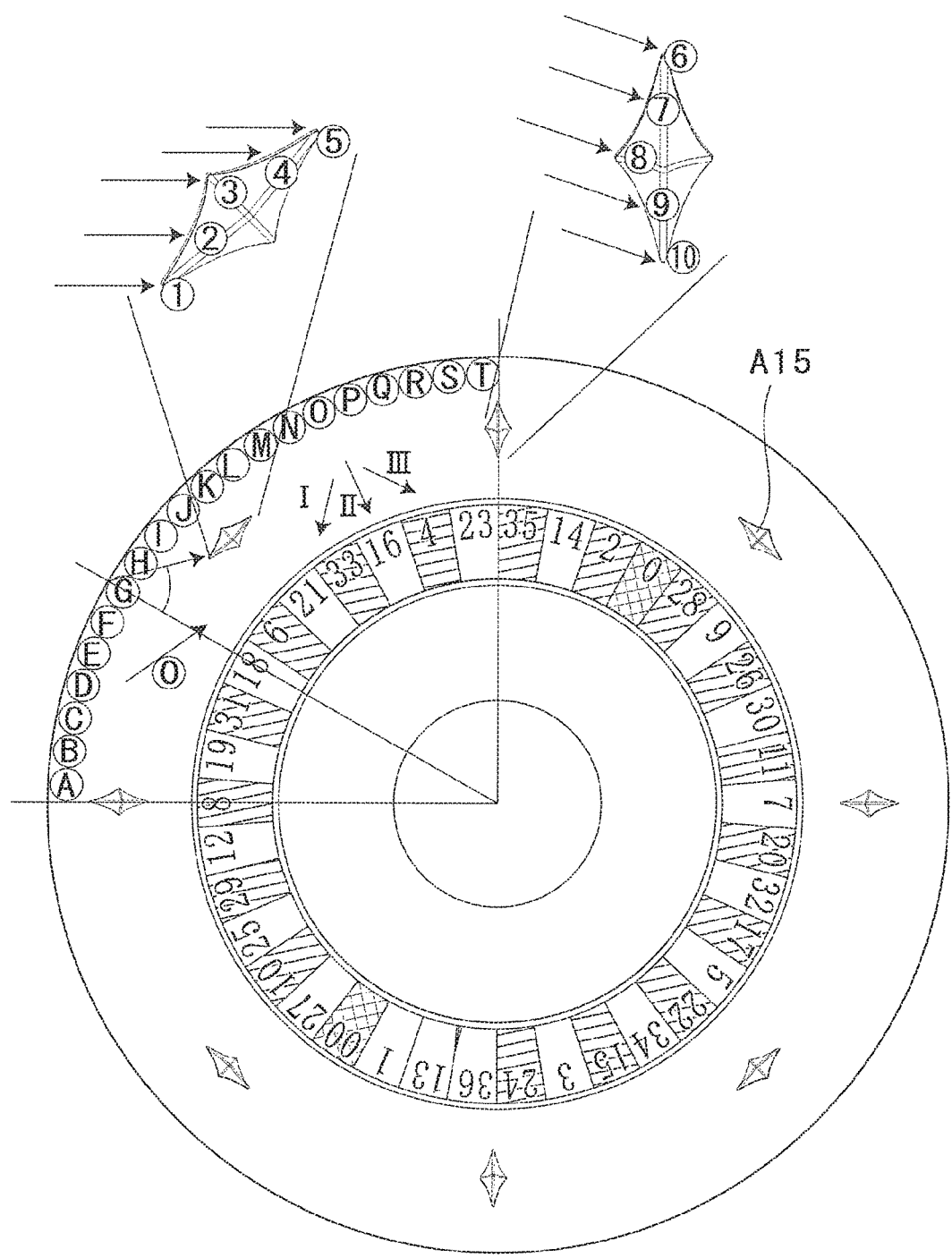
FIG. 35 illustrates a movement locus that a roulette ball may have.

With reference to FIG. 34A, FIG. 34B, and FIG. 35, the following will describe how the movement locus of the roulette ball image A31 until reaching a region between the cat's eye image A15 and the roulette pocket A321 is determined. It is noted that this determination method is used for determining the movement locus of the JP roulette ball image A35 until reaching a region between the cat's eye and the JP roulette pocket A341 in the JP game, too.

FIG. 34A and FIG. 34B show first movement locus determination tables. In each first movement locus determination table, the movement locus of the roulette ball image A31 is divided into plural divisions, and options of the movement of the roulette ball image A31 in each division are stored. To begin with, in the first movement locus determination table, options of falling start positions are stored in the first division.

As shown in FIG. 34A and FIG. 34B, 20 falling start positions (A to T) are stored in the first movement locus determination table. As shown in FIG. 35, 20 falling start positions are defined by dividing a quarter of the outer periphery of the bank A30 by 20.

Furthermore, as shown in FIG. 34A and FIG. 34B, the first movement locus determination table stores falling angles at which the roulette ball image A31 may fall from each falling position. As shown in FIG. 35, a falling angle is an angle formed by the linear line connecting a falling position with the center and the linear line indicating the traveling direction of the roulette ball image from the falling position. The options of the falling angles are different between the roulette ball image A31 and the JP roulette ball image A35.

As shown in FIG. 34A and FIG. 34B, the first movement locus determination table stores contact states in which the roulette ball image A31 make first contact with a cat's eye image A15. As shown in FIG. 35, as the contact state of the first contact with the cat's eye image A15, one of a state in which no contact with the cat's eye image A15 is made (0 direction) and ten states in which contact with the cat's eye image A15 is made is selectable. When the falling angle is equal to or smaller than 81 degrees, the contact states 4 and 5 are not selectable. When the falling angle is equal to or smaller than 50 degrees, the contact states 9 and 10 are not selectable.

In addition to the above, as shown in FIG. 34A and FIG. 34B, the first movement locus determination table stores traveling directions after the first contact with the cat's eye image A15. To be more specific, after the first contact of the roulette ball image A31 with the cat's eye image A15, one of: forward travel in the traveling direction in which the roulette ball image A31 has moved; and backward travel in the direction opposite to the traveling direction is selected. When one of the contact states 1 and 7 to 10 is selected at the first contact with the cat's eye image A15, the backward travel is selected. When one of the contact states 2 to 6 is selected at the first contact with the cat's eye image A15, the forward travel is selected. In other words, the traveling direction is selected in accordance with the contact state at the first contact with the cat's eye image A15. When the first contact with the cat's eye image A15 is not made, the selection of the traveling direction is not performed.

In addition to the above, as shown in FIG. 34A and FIG. 34B, the first movement locus determination table stores contact states of the second contact with cat's eye image A15. As shown in FIG. 35, being similar to the contact states of the first contact with the cat's eye image A15, as the contact state of the second contact with the cat's eye image A15, one of a state in which no contact with the cat's eye image A15 is made (0 direction) and ten states in which contact with the cat's eye image A15 is made is selectable.

As shown in FIG. 34A and FIG. 34B, the first movement locus determination table stores traveling directions at the second contact with the cat's eye image A15. To be more specific, after the roulette ball image A31 makes second contact with the cat's eye image A15, one of: forward travel in the traveling direction in which the roulette ball image A31 has moved; and backward travel in the direction opposite to the traveling direction is selected. When one of the contact states 1 and 7 to 10 is selected at the second contact with the cat's eye image A15, the backward travel is selected. When one of the contact states 2 to 6 is selected at the second contact with the cat's eye image A15, the forward travel is selected. In other words, the traveling direction is selected in accordance with the contact state at the second contact with the cat's eye image A15. When the second contact with the cat's eye image A15 is not made, the traveling direction is not selected.

In addition to the above, as shown in FIG. 34A and FIG. 34B, the first movement locus determination table stores traveling directions until the roulette ball image A31 between the cat's eye image A15 and the roulette pocket A321. That is to say, options of the directions toward the roulette pocket A321 after it is confirmed that the roulette ball image A31 will pass the cat's eye image A15 are stored. As shown in FIG. 35, one of traveling directions I (backward travel), II (going straight), and III (forward travel) is selectable. When the roulette ball image A31 does not make contact with the cat's eye image A15, one of the traveling directions II (going straight) and III (forward travel) is selected. When the traveling direction after the immediately preceding contact with the cat's eye image A15 is "forward travel", one of the traveling directions II (going straight) and III (forward travel) is selected. When the traveling direction after the immediately preceding contact with the cat's eye image A15 is "backward travel", one of the traveling directions I (backward travel) and II (going straight) is selected.

(Game Effect Images: Trajectory of Roulette Ball Image: Normal Game: Until Stop)

The second movement locus determination tables shown in FIG. 36A and FIG. 36B are used for determining operation states of the roulette ball image A31 in the normal game until the roulette ball image A31 leaves a region between the cat's eye image A15 and the roulette pocket A321 and stops at the roulette pocket A321. In the first pattern, there are five trajectories "a" to "e". In the second pattern, there are two trajectories "f" and "g". In the third pattern, there is a trajectory "h". In the second movement locus determination table, combinations of these trajectories are defined as 57 operations states.

As shown in FIG. 37A, the trajectory "a" in the first pattern is a trajectory on which the roulette ball image A31 hits the edge of the roulette pocket A321 between the number pockets A3211 and rebounds toward the bank A30 (i.e., to the outer side). The trajectory "b" in the first pattern is a trajectory on which the roulette ball image A31 enters a number pocket A3211 in the roulette pocket A321 once and then rebounds to the outside. The trajectory "c" in the first pattern is a trajectory on which the roulette ball image A31 enters a number pocket A3211 in the roulette pocket A321 and then enters a neighboring number pocket A3211. The trajectory "d" in the first pattern is a trajectory on which the roulette ball image A31 enters a number pocket A3211 in the roulette pocket A321 and then leaves the number pocket A3211 toward the central portion A322 (i.e., to the inner side). The trajectory "e" in the first pattern is a trajectory on which the roulette ball image A31 enters a number pocket A3211 in the roulette pocket A321 and stops at the number pocket A3211.

As shown in FIG. 36A and FIG. 36B, when the trajectory "d" is selected in the first pattern, one of the trajectories "f" and "g" is selected from the second pattern as the next trajectory. When the trajectory "e" is selected in the first pattern, the operation state is determined. When three trajectories each of which is "a", "b", or "c" are selected in the first pattern, the trajectory "e" is selected as the fourth trajectory and the operation state is determined.

As shown in FIG. 37B, the trajectory "f" in the second pattern is a trajectory on which the roulette ball image A31 passes a number pocket A3211 from the inner side to the outer side. The trajectory "g" in the second pattern is a trajectory on which the roulette ball image A31 coming from the inner side enters and stops at a number pocket A3211.

As shown in FIG. 36A and FIG. 36B, when the trajectory "f" is selected in the second pattern, the trajectory "h" in the third pattern is selected as the next trajectory. When the trajectory "g" is selected in the second pattern, the operation state is determined.

As shown in FIG. 37C, the trajectory "h" in the third pattern is a trajectory on which the roulette ball image A31 coming from the outer side hits an edge between number pockets A3211 and rebounds once toward the outer side, and then enters and stops at another number pocket A3211. The trajectory "h" in the third pattern is also a trajectory on which the roulette ball image A31 coming from the outer side enters and stops at a number pocket A3211. A such, the trajectory "h" in the third pattern defines two types of movements.

In addition to the above, as shown in FIGS. 38A to 38F, for each of the trajectories "a" to "h", element patterns each having plural elements are set. For this reason, after a trajectory is selected, an element pattern for that trajectory is selected. To be more specific, moving distance, the size of curvature (rebound quantity), speed, and the number of rebounds in the number pocket A3211 are set as elements.

To be more specific, in the first pattern, eleven options of the pocket moving distances in the range of +12 to −5 are available. As the size of curvature, three options, large, middle, and small, are available. As the speed of the ball, two options, quick and normal, are available. In other words, there are two options regarding the speed of the ball traveling in one frame. In the ball movement table, one of elements 1 to 11 is selectable for the trajectory "a", one of elements 3 to 8 is selectable for the trajectory "b", and one of elements 4 to 6 is selectable for the trajectory "c". For the second trajectory, both for the forward travel and the backward travel, a traveling distance which is equal to or smaller than the absolute value of the traveling distance selected for the first trajectory is selected. For the third trajectory, both for the forward travel and the backward travel, a traveling distance which is equal to or smaller than the absolute value of the traveling distance selected for the second trajectory is selected.

In the second pattern, four options of the pocket moving distances in the range of +7 to −4 are available. As the size of curvature, two options, middle and small, are available. As the speed of the ball, two options, normal and slow, are available. In other words, there are two options regarding the speed of the ball traveling in one frame. In the ball movement table, one of elements 1 to 8 is selectable for the trajectory "f", and one of elements 1 to 8 is selectable for the trajectory "g".

In the third pattern, five options of the pocket moving distances in the range of +3 to −2 are available. As the size of curvature, two options, middle and small, are available. As the speed of the ball, two options, normal and slow, are available. In other words, there are two options regarding the speed of the ball traveling in one frame. In the ball movement table, one of elements 1 to 5 is selectable for the trajectory "h", and one of elements 1 to 5 is selectable for the trajectory "i".

Figure 39:
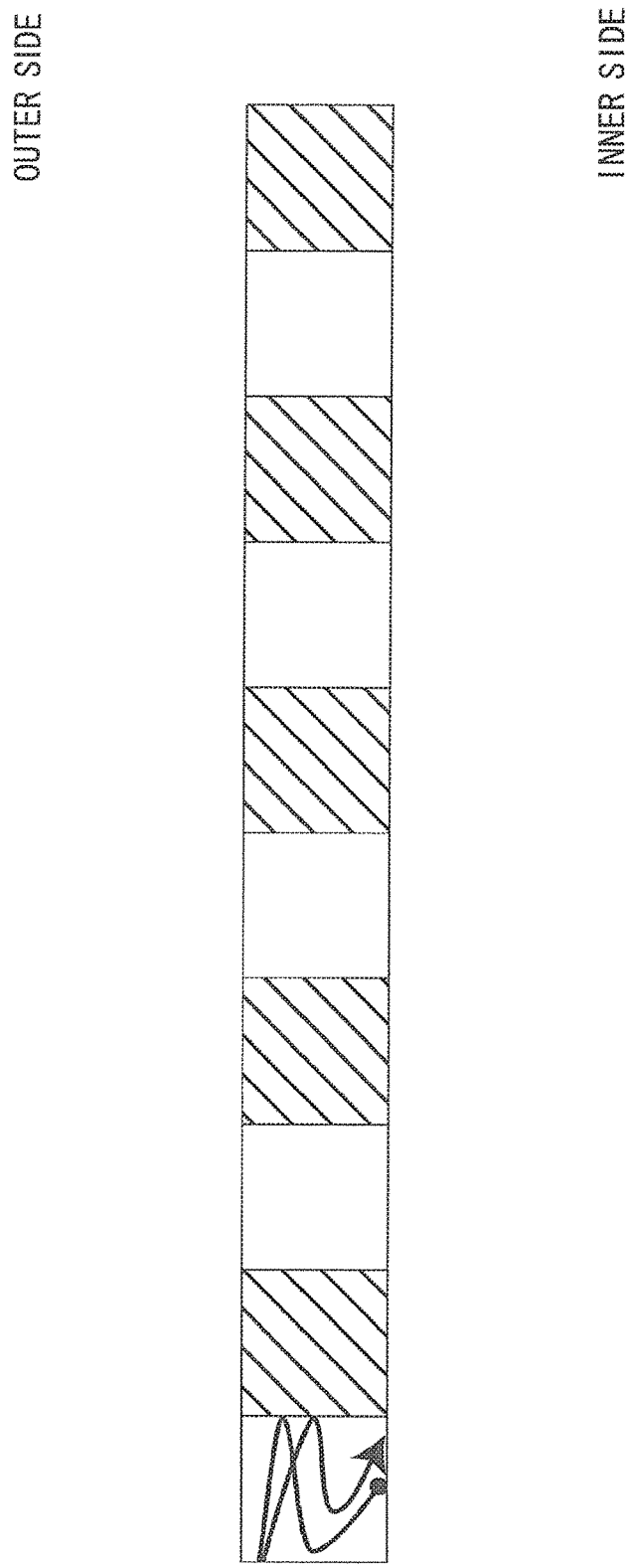
FIG. 39 illustrates an example of trajectories set in the second movement locus determination table.

As shown in FIG. 39, only one pattern is selectable when the movement is zero (Pocket In).

(Game Effect Images: trajectory of roulette ball image: JP game: Until Stop)

As shown in FIG. 30E, in the JP game, the JP roulette ball image A35 can stop at one of ten pockets A3411 to A3414. The trajectories of the JP roulette ball image A35 until it stops at one of the pockets A3411 to A3414 are determined by a combination of the first pattern and the second pattern.

The first pattern includes trajectories which are combinations of trajectories such as a trajectory on which the ball goes to the inner side, a trajectory on which the ball enters a pocket from the inner side, a trajectory on which the ball rebounds in a pocket, a trajectory on which the ball stops at a pocket, and a trajectory with no ball actions.

Figure 40A:
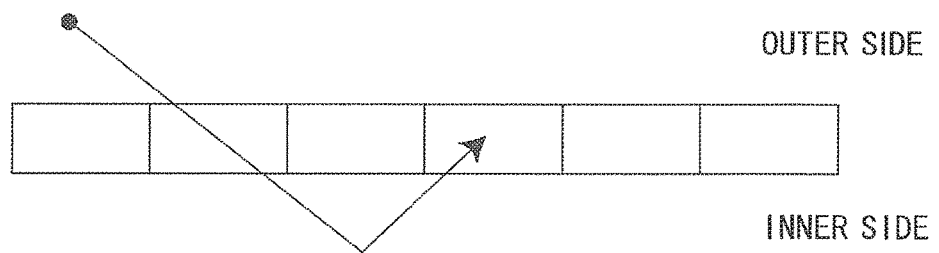
FIG. 40A illustrates an example of a first pattern of the trajectory of the roulette ball in the JP game.
Figure 40B:
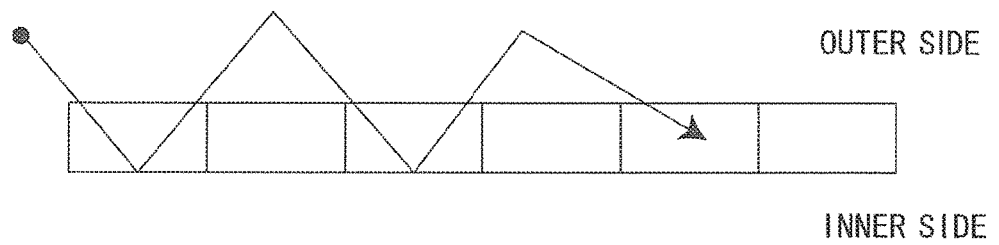
FIG. 40B illustrates an example of the first pattern of the trajectory of the roulette ball in the JP game.

For example, as shown in FIG. 40A, the first pattern includes a trajectory on which the ball goes to the inner side and moves forward for about two pockets. Furthermore, as shown in FIG. 40B, the first pattern includes a trajectory on which the ball rebounds twice in pockets and moves forward for about two pockets.

When the trajectory with no ball actions is selected in the first pattern, the second pattern is selected. The second pattern includes trajectories which are combinations of trajectories such as a trajectory on which the ball rebounds on a wall in a pocket, a trajectory on which the ball climbs over a wall in a pocket, a trajectory on which the ball having rebounded in a pocket goes out from the pocket, a trajectory on which the ball having left a pocket moves back and enters another pocket, a trajectory on which the ball having left a pocket moves forward and enters another pocket, a trajectory on which the ball having left a pocket gets on a wall, a trajectory on which the ball moves in a pocket while bouncing therein, and a trajectory on which the ball stops in a pocket.

Figure 40C:
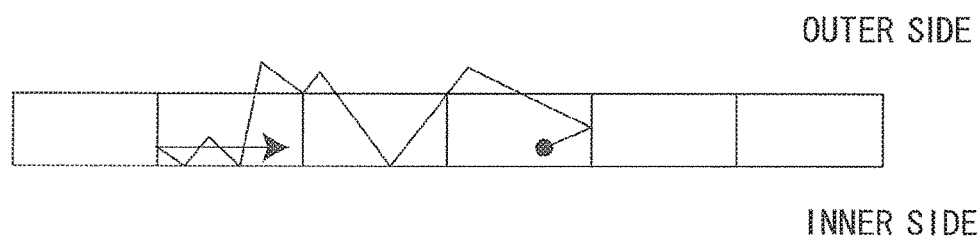
FIG. 40C illustrates an example of a second pattern of the trajectory of the roulette ball in the JP game.
Figure 40D:
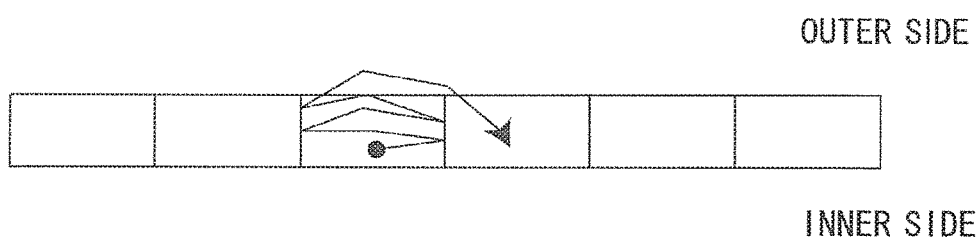
FIG. 40D illustrates an example of the second pattern of the trajectory of the roulette ball in the JP game.
Figure 40E:
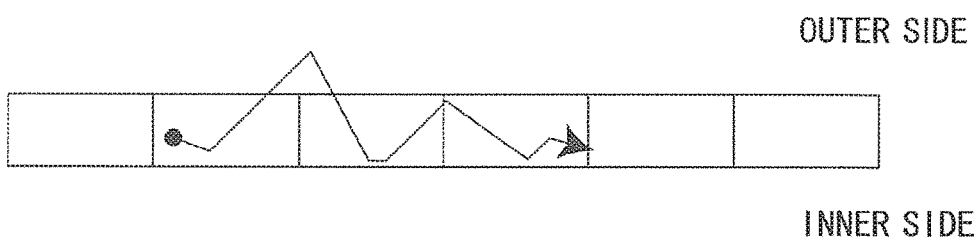
FIG. 40E illustrates an example of the first pattern of the trajectory of the roulette ball in the JP game.

For example, as shown in FIG. 40C, the second pattern includes a trajectory on which the ball rebounds on a wall and moves back for one pocket, and further moves back while bouncing on the edge, and then moves in a pocket while slightly rebounding therein and stops. Furthermore, as shown in FIG. 40D, the second pattern includes a trajectory on which the ball repeatedly rebounds on left and right walls in a pocket, gets on a wall after the fourth rebound, and then falls in a pocket on the front side after a while. That is to say, the ball rebounds four times in the pocket. Furthermore, as shown in FIG. 40E, the second pattern includes a trajectory on which the ball rebounds in a pocket and moves forward for one pocket, rebounds in another pocket on the front side and moves forward for one pocket, and rebounds in a further pocket on the front side but stops at the next wall.

(Game Effect Images: Gaming Terminal E: Bet Receiving Screen)

Figure 41A:
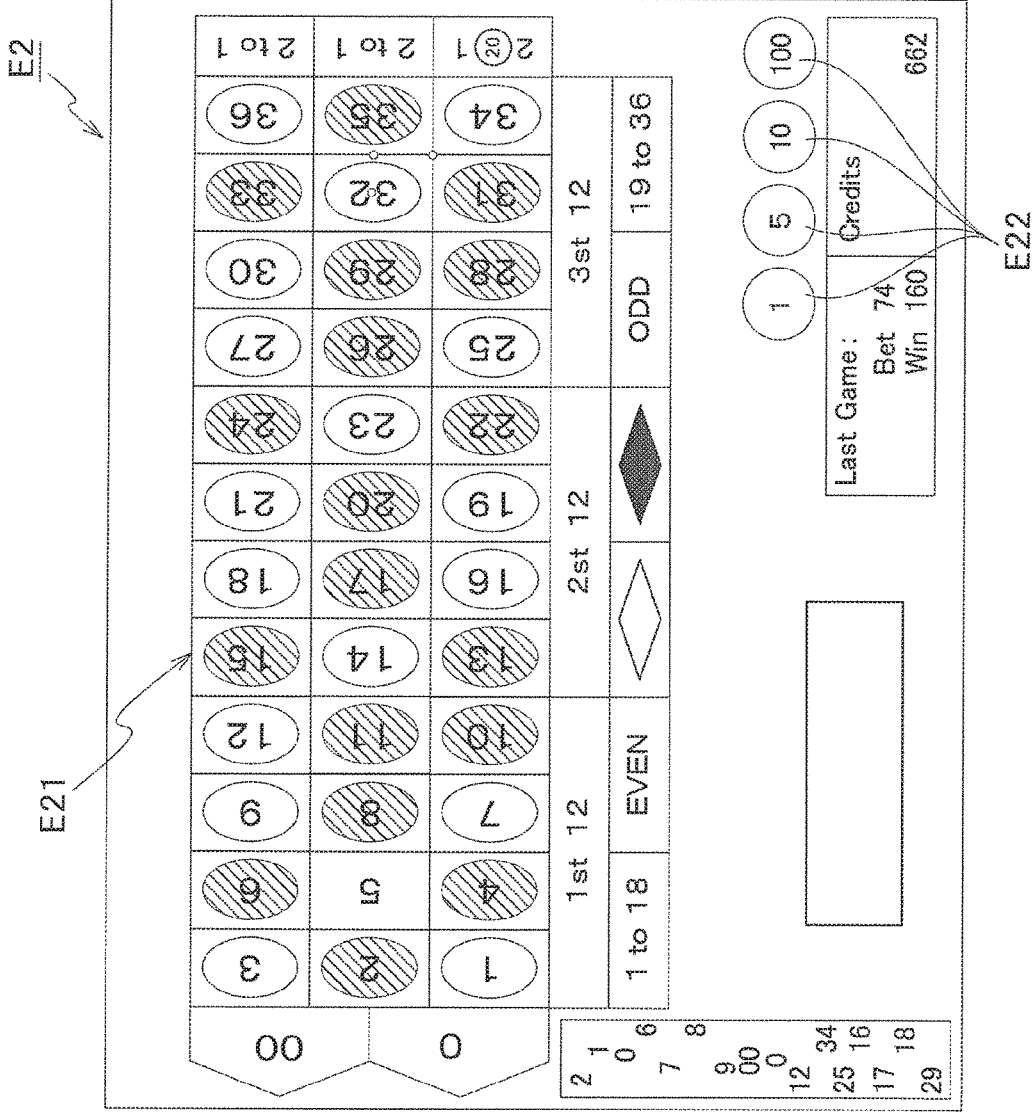
FIG. 41A illustrates an example of a game effect image displayed on a terminal display.

As shown in FIG. 41A, in the bet time, the terminal display E2 displays a bet receiving screen to allow a player to input betting. On the bet receiving screen, a bet object specifying region E21 and a bet amount specifying region E22 are provided. The bet object specifying region E21 includes a region in which one of "0", "00", "1" to "36" is to be specified as a bet object and a region for betting on "RED/BLACK", "EVEN/ODD", "1 to 8/19 to 36", "DOZEN", or "COLUMN". The bet amount specifying region E22 includes regions by which one of 1, 5, 10, and 100 credits is to be specified as a bet amount. A player specifies a bet amount by the bet amount specifying region E22 and specifies one of the regions in the bet object specifying region E21. In this way, the player bets a desired bet amount on a bet object.

In addition to the above, as shown in FIG. 41B, in the shooter time of the normal game or in the JP game, a shooter screen for starting the movement of the ball is displayed on a shooter gaming terminal E. The shooter screen displays a ball image E23, an arrow image E24 indicating a dragging direction, and a timer image E25 indicating a remaining time of the shooter time. The player is able to start the movement of the ball by dragging the ball image E23 onto the arrow image E24. The initial speed (quick, normal, or slow) of the ball is determined by the moving speed in this dragging operation. When the time indicated by the timer image E25 runs out, the movement of the ball automatically starts.

(Gaming Machine 1: Operations)

Now, operations executed by the gaming machine 1 will be described with reference to flowcharts.

The following description presupposes that the gaming machine 1 has been powered on.

(Gaming Machine 1: Operations: Main Process)

Figure 42:
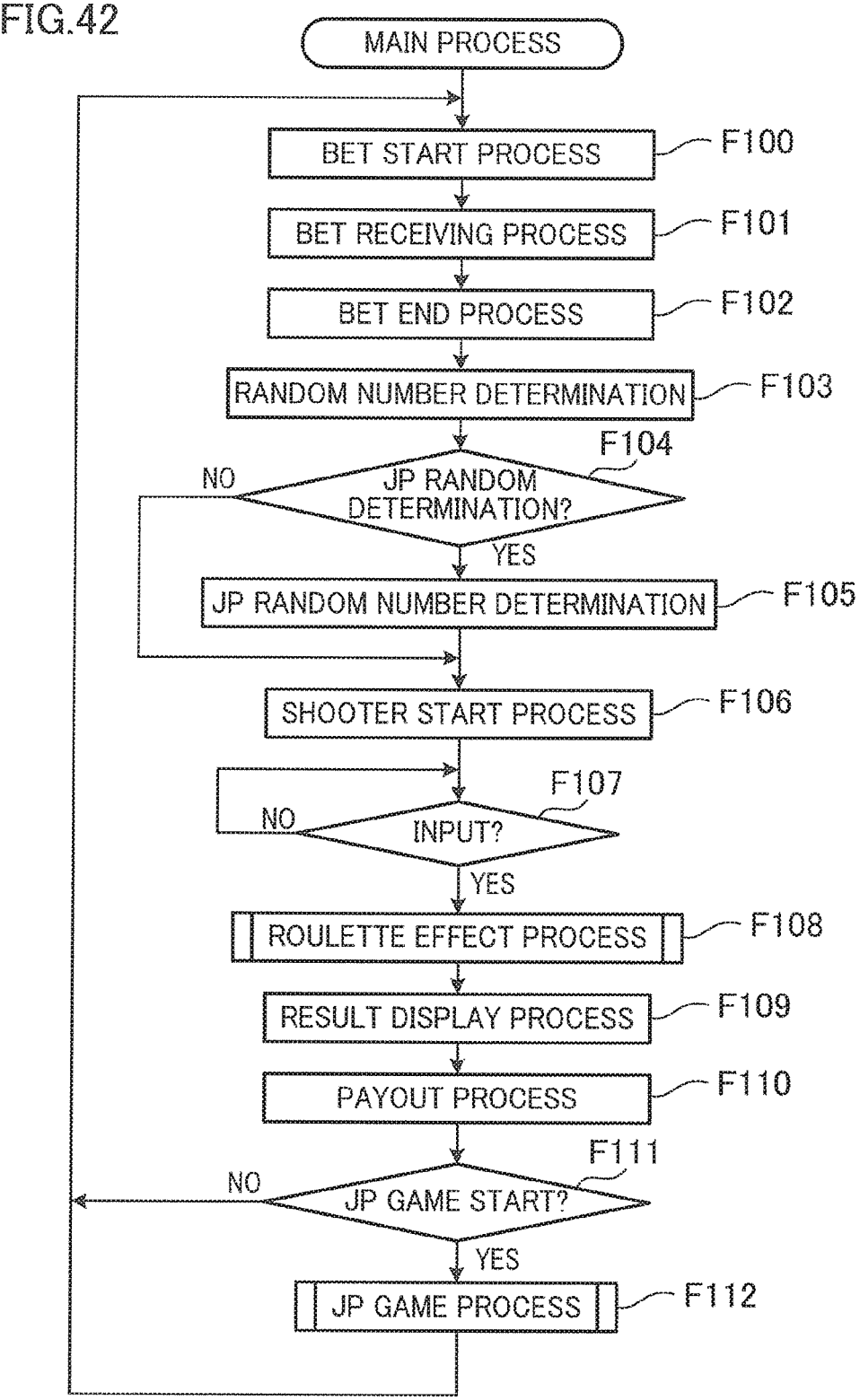
FIG. 42 is a flowchart of a main process.

As shown in FIG. 42, the gaming machine 1 executes various processes based on a main process routine. To begin with, the gaming machine 1 executes a bet start process (F100). In the bet start process, each gaming terminal E starts to receive betting through the bet receiving screen. The gaming machine 1 then executes a bet receiving process of receiving bets from the gaming terminals E (F101). In the bet receiving process, the gaming machine 1 stores, in the memory 112, the content of a bet from each gaming terminal E. The gaming machine 1 then executes a bet end process (F102). To be more specific, when a predetermined period passes from the start of the betting, the gaming machine 1 notifies that the betting has been completed and prohibits the gaming terminals E from receiving bets.

Thereafter, a random number determination as a game result is executed (F103). In other words, in which one of the number pockets A3211 of the roulette pocket A321 the roulette ball image A31 enters in the normal game is randomly determined. Thereafter, whether to execute JP random determination is determined (F104). Whether to execute JP random determination may be randomly determined. In this regard, a probability of the JP random determination is not limited. When the JP random determination is executed (F104: YES), the gaming machine 1 executes JP number random determination (F105). That is to say, when the number of the number pocket A3211 determined in the JP number random determination includes the number determined in the step F103, the start of the JP game is determined at this stage.

When the JP random determination is not executed (F104: NO) or after the step S105, the gaming machine 1 executes a shooter start process (F106). In the shooter start process, the gaming machine 1 selects one of the gaming terminals E participating in the normal game, and displays the shooter screen (see FIG. 41B) on the selected gaming terminal E. Then whether an input is made to the shooter screen by the player is determined (F107). When no input is made (F107: NO), the step F107 is executed again and an input is waited for. When a predetermined time elapses with no input, the step F108 may be executed. When an input is made (F107: YES), a roulette effect process is executed (F108). In the roulette effect process, an effect of stopping the roulette ball image A31 at the number pocket A3211 having the number determined in the step F103 is executed. The roulette effect process will be described later with reference to FIG. 44A.

The gaming machine 1 then executes a result display process (F109). In the result display process, the gaming machine 1 executes an effect of highlighting the number of the number pocket A3211 at which the roulette ball image A31 has stopped. Thereafter, the gaming machine 1 executes a payout process (F110). In the payout process, the bet from each gaming terminal E stored in the memory 112 is compared with the game result, and a payout is awarded to that gaming terminal E when the game result corresponds to the content of the bet.

Thereafter, whether to start the JP game is determined (F111). When the JP game is started (F111: YES), a JP game process is executed (F112). The JP game process will be described later with reference to FIG. 43. When the JP game is not started (F111: NO), the routine goes back to the step F100 and the normal game is executed again.

(Gaming Machine 1: Operations: JP Game Process)

Figure 43:
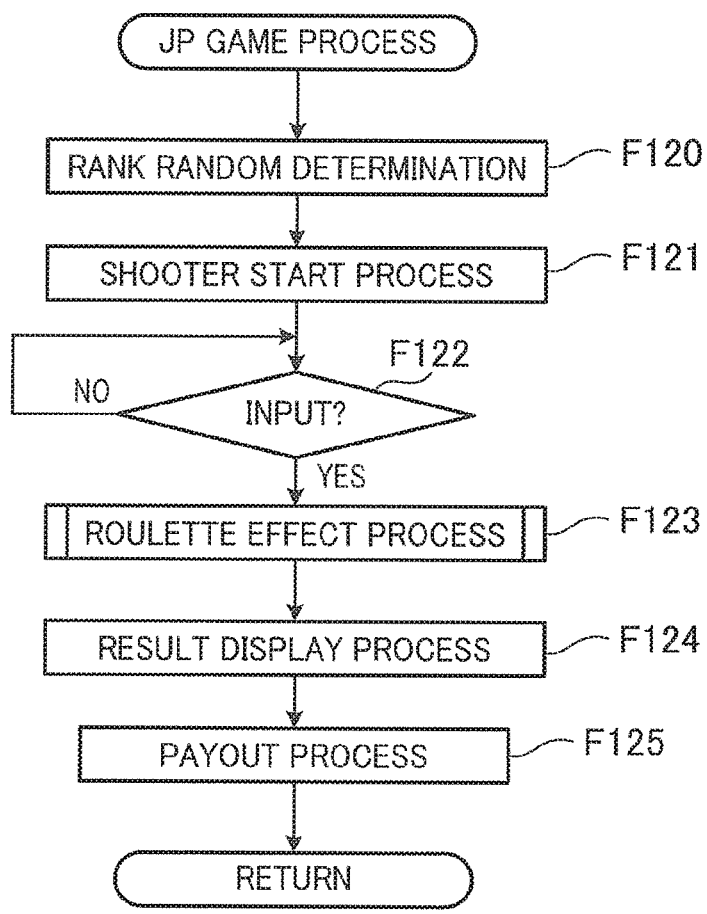
FIG. 43 is a flowchart of a JP game process.

Now, the following will describe a JP game process routine with reference to FIG. 43. To begin with, the gaming machine 1 executes rank random determination which is a game result (F120). In other words, which one of the pockets A3411 to A3414 of the JP roulette pocket A351 the JP roulette ball image A35 enters in the JP game is randomly determined. Thereafter, a shooter start process is executed (F121). In the shooter start process, the gaming machine 1 selects one of the gaming terminals E participating in the JP game, and displays the shooter screen (see FIG. 41B) on that gaming terminal E. Then whether an input is made to the shooter screen by a player is determined (F122). When no input is made (F122: NO), the step F122 is executed again and an input is waited for. When a predetermined time elapses with no input, the step F123 may be executed. When an input is made (F122: YES), a roulette effect process is executed (F123). In the roulette effect process, an effect of stopping the JP roulette ball image A35 at one of the pockets A3411 to A3414 corresponding to the rank determined in the step F120 is executed. The roulette effect process will be described later with reference to FIG. 44A.

The gaming machine 1 then executes a result display process (F124). In the result display process, the gaming machine 1 executes an effect of highlighting the number of the one of the pockets A3411 to A3414 at which the JP roulette ball image A35 has stopped. Thereafter, the gaming machine 1 executes a payout process (F125). In the payout process, a payout corresponding to the rank determined in the step F120 is awarded to the gaming terminals E participating in the JP game. Then the gaming machine 1 ends the routine.

(Gaming Machine 1: Operations: Roulette Effect Process)

Figure 44A:
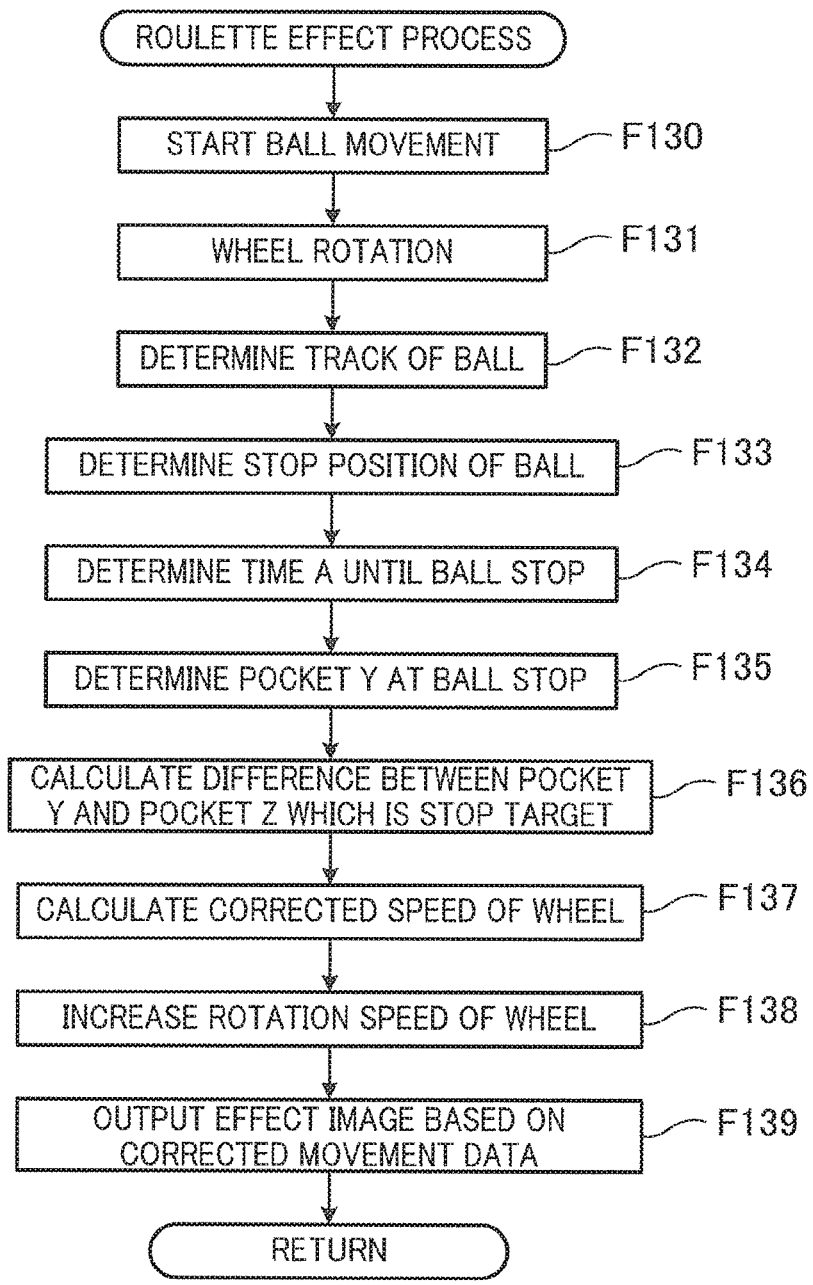
FIG. 44A is a flowchart of a roulette effect process.

Now, referring to FIG. 44A and FIG. 44B, a roulette effect process routine in the normal game and the JP game will be described. To begin with, as shown in FIG. 44A, the gaming machine 1 starts the movement of the ball at an initial speed based on an input to the shooter gaming terminal E (F130). At this stage, ball rolling sound from each speaker C1 of the effect sound output mechanism C is controlled in accordance with the position of the ball. Furthermore, the wheel is continuously rotated at a predetermined speed and a predetermined track (second movement data) (F131). Thereafter, the track pattern (first movement data) of the ball is determined in accordance with the initial speed of the ball (F132). The sampling of the track pattern of the ball is randomly determined. Thereafter, the gaming machine 1 determines the stop position of the ball based on the track pattern and the initial speed of the ball (F133). Then the gaming machine 1 determines a time A from a predetermined timing to a timing at which the ball reaches the fall position (F134). Furthermore, for the wheel which is rotating based on the second movement data, the gaming machine 1 specifies a pocket Y which is at the stop position of the ball when the time A elapses from the predetermined timing (i.e., when the ball reaches the end) (F135). That is to say, as shown in FIG. 44B, in which pocket (pocket Y) the ball falls, provided that the wheel rotates at a constant speed, is specified. Then a difference between this pocket Y and the randomly selected pocket Z is calculated (F136). When the difference is a negative value, the distance equivalent to one rotation of the wheel is added. When the time A elapses from the predetermined timing, the rotation speed of the wheel required to cause the pocket Z to reach the stop position is calculated (F137). That is to say, as shown in FIG. 44B, the rotation speed of the wheel required to cause the pocket Z to be at the fall position when the time A elapses is calculated. Based on this rotation speed, the rotation speed of the wheel is increased (F138). As such, it is possible to cause the ball to stop at a pocket which has been randomly selected in advance, by correcting the second movement data.

The increase in the rotation speed of the wheel is preferably arranged such that an amount of change per unit time is equal to or smaller than a predetermined amount. That is to say, instead of changing the rotation speed of the wheel immediately to the calculated speed after the correction, the rotation speed of the wheel is, for example, gradually increased with constant acceleration. Because the calculated rotation speed of the wheel presupposes that the rotation speed is immediately changed, the moving distance required to stop the ball at a desired pocket must be longer when the rotation speed of the wheel is gradually increased. In this regard, the rotation speed of the wheel is increased to be higher than the calculated rotation speed. In other words, the second movement data may be further corrected based on the calculated rotation speed of the wheel and the acceleration of the wheel.

In addition to the above, when the initial speed of the ball is high, the time A may be elongated because the calculation for the correction of the second movement data cannot catch up with the movement of the ball. To be more specific, to arrange the traveling time of the ball to be long, for example, the ball may be arranged to circulate along the outer periphery of the bank area for a long time before starting to fall.

Thereafter, an effect of stopping the ball at the pocket is executed based on the sampled first movement data and the corrected second movement data (F139).

(Gaming Machine 1: Operations: Image Display Task)

Figure 45:
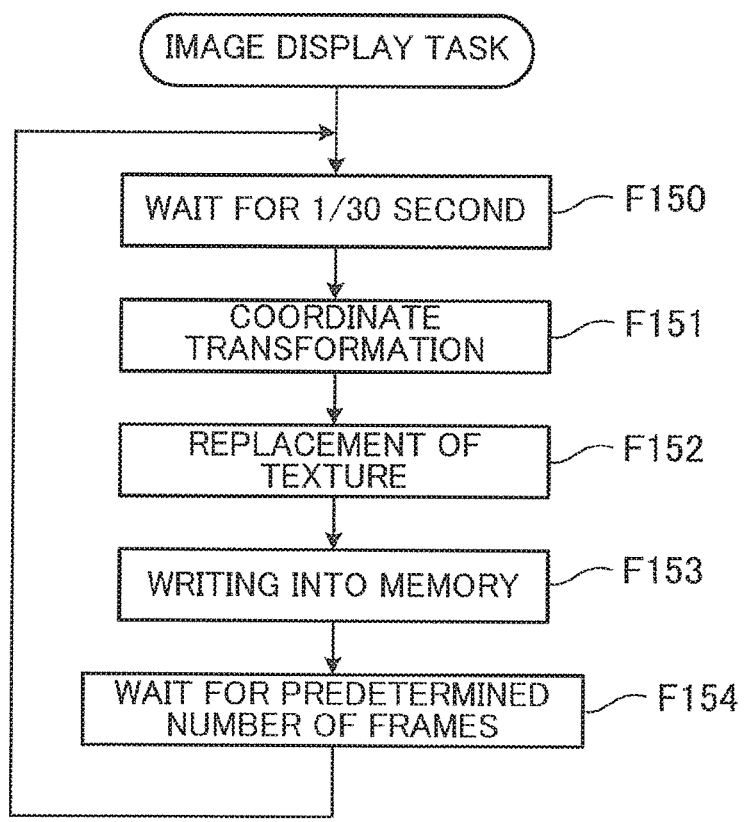
FIG. 45 is a flowchart of an image display task.

Referring to FIG. 45, an image display task executed by the gaming machine 1 will be described. To begin with, after ⅟30 second (step F150), the gaming machine 1 performs coordinate transformation (step F151). This step includes, for example, transformation of local coordinates of an object such as the ball and the wheel into world coordinates and setting of a visual coordinate system. Subsequently, a texture is replaced (step F152) and writing into the memory 112 is performed (step F153). Thereafter, after a predetermined number of frames (step F153), the process goes back to the step F150. As a result, two sets of three-dimensional image data with different visual coordinate systems are output from the memory 112 at intervals of ⅟30 second, and hence three-dimensional images viewed from different view points are displayed on the projection target mechanism B and the display device D, respectively. It is noted that the control of the rolling sound output from each speaker C1 of the effect sound output mechanism C may be done at this stage or may be triggered at this stage. In other words, the position of the ball in each frame may be specified, and the rolling sound from the speaker C1 may be controlled based on the specified position.

(Gaming Machine 1: Operations: Process of Generating Three-Dimensional Image)

Figure 46:
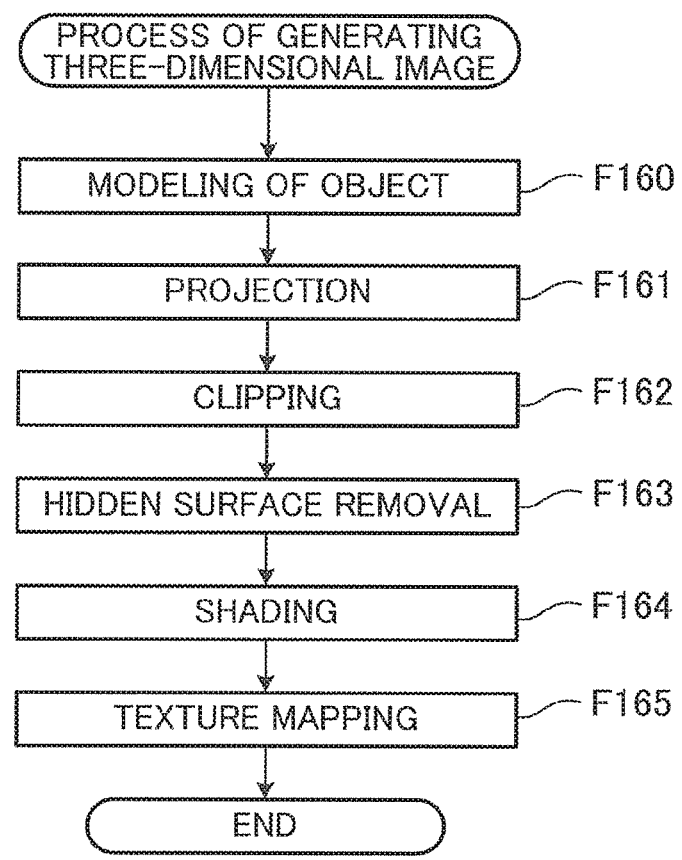
FIG. 46 is a flowchart of a process of generating a three-dimensional image.

Referring to FIG. 46, a process of generating a three-dimensional image will be described. This process is equivalent to the steps F151 and F152 of a sub routine shown in FIG. 45, and is performed when three-dimensional image data for one frame is generated. On this account, a three-dimensional image is displayed by repeatedly executing a process shown in FIG. 46. The process below is preferably executed by a CPU and a rendering processor which are connected with each other by a bus. In other words, the CPU performs modelling and texture mapping of an object. In the meanwhile, the rendering processor performs rendering in accordance with an instruction (command) from the CPU and performs pixel drawing. Data and a program required for tasks executed by the rendering processor are developed in the memory 112 on boot of the gaming machine 1.

To begin with, the gaming machine 1 reads object data from the memory 112 and performs modelling of an object provided in a world coordinate space (step F160). In this way, the shape of each object is determined. In this regard, the shape of each object is expressed by a local coordinate system set for each object.

Subsequently, the gaming machine 1 performs rendering. To begin with, the gaming machine 1 performs projection (coordinate transformation) (F161), so as to transform the local coordinates of each object to a world coordinate space. As a result, each object is provided in the world coordinate space. Each object provided in this way is transformed to two visual coordinate systems (camera spaces) based on the coordinates and directions of the projector A1 and the coordinates and the directions of the view point for the display device D. As a result, each provided object is developed to images viewed from two different view points, respectively.

Subsequently, the gaming machine 1 executes clipping (F162) and hidden surface removal (F163), so as to remove surfaces which are not viewable from view points. Then shading is performed to set the brightness of each pixel (F164), texture mapping is performed (F165), and the routine is finished.

(Gaming Machine 1: Operations: Others)

As shown in FIG. 47, an operation is set for each recovery timing when an error occurs in the gaming terminal E. Furthermore, as shown in FIG. 48, an operation for the gaming terminal E when an error occurs in the effect assemblage is set. Furthermore, as shown in FIG. 49, a test for connection with the projector A1 is performed at power on. Furthermore, as shown in FIG. 50, error settings regarding the connection test can be done by the AUDIT.

(Modifications)

As shown in FIG. 1, in the present embodiment, the controller 111 controls the projection mechanism A, the effect sound output mechanism C, and the display devices D. The disclosure, however, is not limited to this arrangement. For example, a controller dedicated for the projector may be provided in the projection mechanism A.

Figure 51:
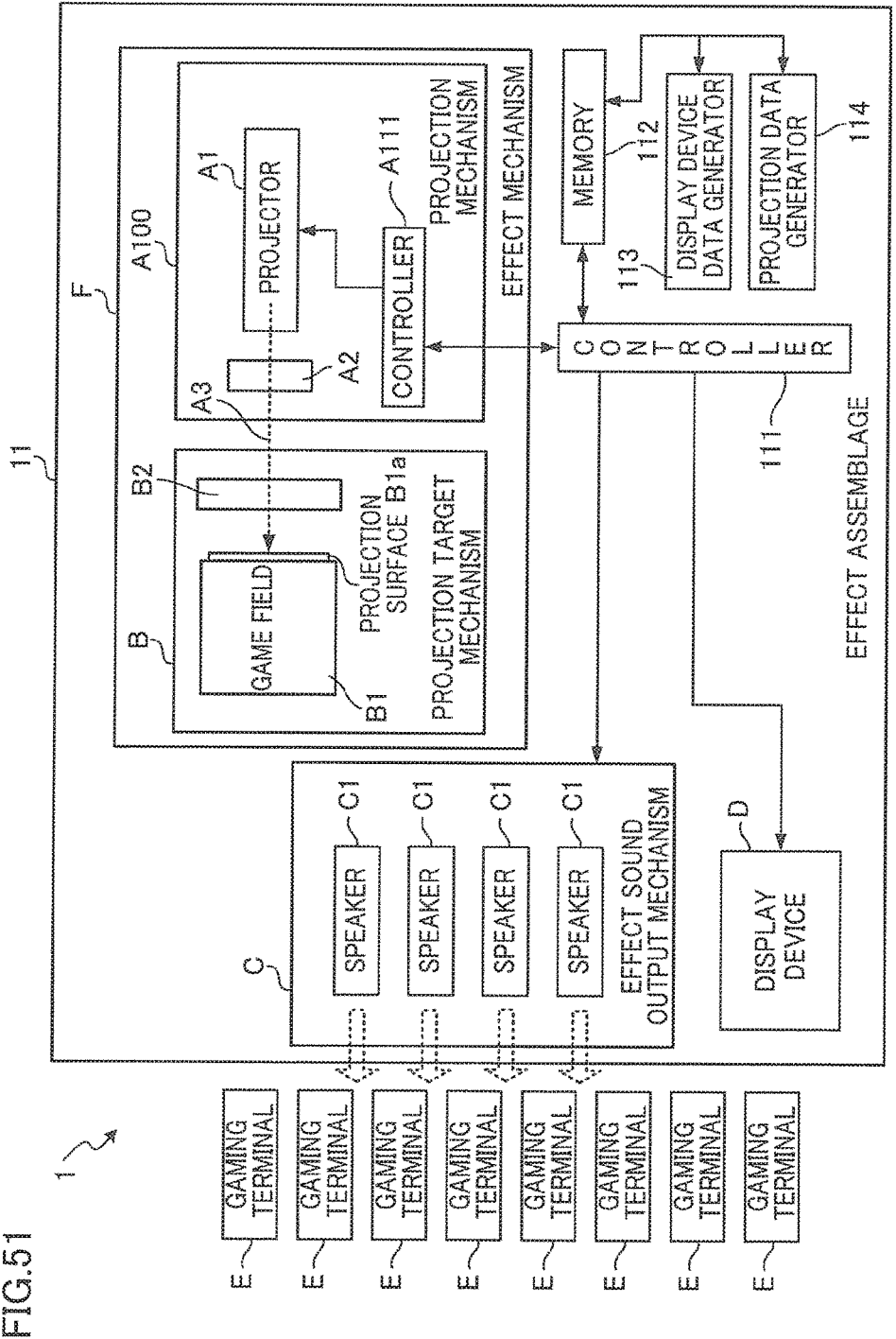
FIG. 51 is a block diagram of a gaming machine according to a modification.

To be more specific, as shown in FIG. 51, a projection mechanism A100 of the modification includes a controller A111. The controller A111 is connected with a controller 111 so that data communications therebetween is possible. For example, the controller A111 receives game effect image data generated by a projection data generator 114 from the controller 111, and outputs the data as a game effect image in the game field B1 by controlling the projector A1. The controller 111 controls devices other than the projection mechanism A, such as the effect sound output mechanism C and the display devices D.

(Outline of Invention)

As shown in FIG. 1, according to the first aspect of the invention, a gaming machine 1 includes: a projection mechanism A including a projector A1 configured to emit projection light A3 by which a game effect image is generated; and a projection target mechanism B including a projection surface B1a which is configured to generate a three-dimensional structure corresponding to a game content, in combination with the game effect image generated by projection of the projection light A3.

According to this arrangement, the gaming machine is able to generate various three-dimensional structures by changing the game effect image and the projection surface B1a, with the result that the degree of freedom in the game effects is increased.

According to the second aspect of the invention, the projection target mechanism B of the first aspect includes a light-transmitting projection surface protection plate B2 which is provided to entirely cover the projection surface B1a.

According to the arrangement above, as the projection surface protection plate B2 covers the entirety of the projection surface B1a, the occurrence of malfunction due to contact of a foreign matter with the projection surface B1a and the occurrence of cheating caused by access to the inside of the gaming machine 1 through a part of the projection surface B1a.

According to the third aspect of the invention, the projection mechanism A of the first or second aspect includes a light-transmitting light emission port protection plate A2 which is provided to entirely cover a light emission port of the projector A1, from which the projection light A3 is emitted.

According to this arrangement, as the transparent light emission port protection plate A2 entirely covers the light emission port of the projector A1, the transparent plate prevents the occurrence of theft or damage of parts, which is due to access to parts such as a lens inside the projector A1 through the light emission port.

According to the fourth aspect of the invention, the projection target mechanism B of one of the first to third aspects is shaped to be a roulette rotating wheel and a central axis of the projection surface B1a is in parallel to an up-down direction, and the projection mechanism A is provided above the projection target mechanism B and the game effect image generated by the projection light A3 is a roulette wheel surface image.

According to the arrangement above, as a roulette wheel surface image is projected on the projection surface B1a which has a rotating wheel shape, a roulette structure having various designs and operations appears on the projection surface B1a.

According to the fifth aspect of the invention, in the projection target mechanism B of the fourth aspect, the game effect image generated by the projection light A3 includes a roulette ball image moving in the wheel surface image.

According to the arrangement above, a roulette structure is generated on the projection surface B1a, and a roulette ball with various sizes, shapes, and operations is moved on this roulette structure.

According to the sixth aspect of the invention, the projection target mechanism B of the fourth or fifth aspect includes a contact member B1a which is provided on the projection surface and is configured to change a traveling direction of a roulette ball.

According to this arrangement, because the contact member with a certain shape is provided on the projection surface B1a, the roulette structure formed of the roulette wheel surface image and the projection surface B1a having a rotating wheel shape looks like a real roulette.

According to the seventh aspect of the invention, an effect assemblage 11 for a gaming machine 1, which is configured to display a process of determining win/loss and a result of the win/loss by random movement of an object, includes: a projector A1 configured to project an image; a game field B1 including a non-flat projection surface B1a which is positioned to receive projection light from the projector A1; a memory 112 configured to store plural types of video data of images projected on the game field B1 from the projector A1 and table data in which the types of the video data are associated with random numbers generatable by a random number generator, respectively; and a controller 111 configured to execute control so as to sample a type of the video data associated with a random number generated based on a predetermined condition and cause the projector A1 to project an image on the projection surface B1a based on the sampled type of the video data.

According to this arrangement, random movement of an object is realized by project an image on the projection surface B1a of the game field B1 from the projector A1, the effect assemblage 11 has no moving parts. On this account, maintenance and setting change are easily done and various effects are performable.

According to the eighth aspect of the invention, in the seventh aspect, the win/loss is determined based on a stop position of the object, the memory is capable of storing the stop position of the object and the number of times of stop associated with the stop position, as stop position data and number-of-times-of-stop data, respectively, and the controller stores the stop position and the number of times of stop of the object in the memory each time a game is executed, executes, each time the game is executed, a process of calculating a position frequency indicating the number of times of stop with respect to the total number of times of execution of the game for each stop position, based on the stop position data and the number-of-times-of-stop data stored in the memory, and displays the position frequency in the form of an image, in association with the stop position of the object.

According to the arrangement above, as an image of the position frequency indicating the number of times of stop with respect to the total number of times of execution of the game is displayed in association with the stop position of the object each time the game is executed, the diversity of the effects is further enhanced.

According to the ninth aspect of the invention, an effect assemblage 11 for a gaming machine 1, which is configured to display a process of determining win/loss and a result of the win/loss based on a roulette pocket corresponding to a stop position after random movement of a roulette ball, includes: a projector A1 configured to project an image; a game field B1 including a non-flat projection surface B1a which is positioned to receive projection light from the projector A1; a memory 112 configured to store plural types of video data of images of the roulette ball and the roulette rotating wheel, which are projected on the game field from the projector A1, and table data in which the types of the video data are associated with random numbers generatable by a random number generator, the memory being capable of storing a stop position of an object and the number of times of stop associated with the stop position, as stop position data and number-of-times-of-stop data, respectively; and a controller 111 configured to execute control so as to sample a type of the video data associated with a random number generated based on a predetermined condition and cause the projector to project an image on the projection surface based on the sampled type of the video data, store the stop position and the number of times of stop of the roulette ball in the memory 112 each time a game is executed, execute, each time the game is executed, a process of calculating a position frequency indicating the number of times of stop with respect to the total number of times of execution of the game for each stop position, based on the stop position data and the number-of-times-of-stop data stored in the memory 112, and display the position frequency in the form of an image, in association with the roulette pocket at the stop position in the roulette.

According to the arrangement above, as an image of the position frequency indicating the number of times of stop with respect to the total number of times of execution of the game is displayed in association with the roulette pocket of the roulette at the stop position each time the game is executed, the diversity of the effects is further enhanced.

According to the tenth aspect of the invention, a gaming machine 1 includes: an effect mechanism F configured to execute a game effect involving movement of an object; an effect sound output mechanism C including speakers C1 provided on the outer circumferential side of the effect mechanism; and a controller 111 configured to control the effect sound output mechanism C so that effect sound corresponding to the movement of the object is output from each of the speakers C1 with sound volume corresponding to a positional relation between the object and each of the speakers C1.

According to this arrangement, each speaker C1 is caused to output the effect sound with sound volume based on the positional relation between the object and each speaker C1, when the object moves in the effect mechanism. With this, the movement of the object is expressed in a three dimensional manner, by means of a change in the volume of the effect sound.

According to the eleventh aspect of the invention, in the tenth aspect, the gaming machine 1 further includes gaming terminals E provided on the outer circumferential side of the effect sound output mechanism C, for performing a game operation corresponding to the game effect, in the effect sound output mechanism C, each of the speakers C1 being arranged so that a speaker surface C1a from which the effect sound is output faces the outer circumferential side.

According to the arrangement above, when a player performs a game operation at a gaming terminal E, because each speaker C1 is arranged so that the speaker surface C1a from which the effect sound is output faces the outer circumferential side, a high-pitched component having high rectilinearity in the effect sound output from each speaker C1 effectively reaches the player.

According to the twelfth aspect of the invention, in the tenth or eleventh aspect, the effect mechanism F includes: a projection mechanism A including a projector A1 configured to emit projection light A3 by which a game effect image for the game effect is generated; and a projection target mechanism B including a projection surface B1 which is configured to generate a three-dimensional structure corresponding to a game content, in combination with the game effect image generated by projection of the projection light A3.

According to this arrangement, the gaming machine 1 is able to generate various three-dimensional structures by changing the game effect image and the projection surface B1a, with the result that the degree of freedom in the game effects is increased.

According to the thirteenth aspect of the invention, in the twelfth aspect, in the projection target mechanism B, the projection surface B1a is shaped to be a roulette rotating wheel and a central axis of the projection surface B1a is in parallel to an up-down direction, and the projection mechanism A is provided above the projection target mechanism B and the game effect image generated by the projection light A3 is a roulette wheel surface image.

According to the arrangement above, as a roulette wheel surface image is projected on the projection surface B1a which has a rotating wheel shape, a roulette structure having various designs and operations appears on the projection surface B1a.

According to the fourteenth aspect of the invention, in the thirteenth aspect, in the projection target mechanism B, the game effect image generated by the projection light A3 includes, as an image of the object, a roulette ball image moving in the wheel surface image.

According to the arrangement above, a roulette structure is generated on the projection surface B1a, and a roulette ball with various sizes, shapes, and operations is moved on this roulette structure.

According to the fifteenth aspect of the invention, an effect assemblage 11 for a gaming machine 1, which is configured to display a process of determining win/loss and a result of the win/loss by random movement of an object, includes: a projector A1 configured to project an image; a game field B1 including a non-flat projection surface B1a which is positioned to receive projection light from the projector A1; an effect sound output mechanism C including speakers C1 provided on the outer circumferential side of the game field B1; a memory 112 configured to store plural types of video data of images projected on the game field B1 from the projector A1, table data in which the types of the video data are associated with random numbers generatable by a random number generator, respectively, and sound volume data corresponding to a positional relation between the object and each of the speakers C1; and a controller configured to execute control so as to sample a type of the video data associated with a random number generated based on a predetermined condition and cause the projector A1 to project an image on the projection surface B1a based on the sampled type of the video data, and calculate, at predetermined time intervals, the positional relation between the object moving in the projection surface B1a on which the image is projected based on the video data and each of the speakers C1, read a set of the sound volume data of each of the speakers C1 corresponding to the positional relation from the memory 112, and control the effect sound output mechanism C so that the effect sound is output from each of the speakers C1 with sound volume corresponding to the set of the sound volume data.

According to this arrangement, while the object is randomly moved as an image is projected on the projection surface B1a of the game field B1 from the projector A1, an effect sound is output from each speaker C1 with sound volume corresponding to the positional relation between each speaker C1 and the object. For this reason, an effect assemblage which is able to produce three-dimensional sound effects and has no moving parts is realized.

According to the sixteenth aspect of the invention, a gaming machine includes: a projection mechanism A including a projector A1 configured to emit projection light A3 by which a game effect image is generated; a projection target mechanism B including a projection surface B1a on which the projection light A3 is projected; a display device D configured to display a game effect image; a memory 112 configured to store three-dimensional data of an object existing in a three-dimensional space; a projection data generator 114 configured to generate, based on the three-dimensional data, projection data of the game effect image of the object in the three-dimensional space viewed from the projector A1; a display device data generator 113 configured to generate, based on the three-dimensional data, display device data of the game effect image of the object in the three-dimensional space viewed from a view point different from the projector A1; and a controller 111 configured to cause the projector A1 to emit the projection light A3 to generate the game effect image based on the projection data, and cause the display device D to display the game effect image based on the display device data.

According to the arrangement above, by using the projection data and the display device data generated based on the same three-dimensional data, different game effect images are displayed on the projection surface B1a and the display device D, respectively, in a synchronized manner. Because images of a single object viewed from different view points are generatable, the degree of freedom in the effects in the game is improved.

According to the seventeenth aspect of the invention, in the sixteenth aspect, the gaming machine 1 further includes gaming terminals E provided on the outer circumferential side of the projection target mechanism, for performing a game operation corresponding to the game effect image, the display device D being provided above a view point of a player at the gaming terminals E.

According to the arrangement above, because the display device D is provided above the view point of the player at the gaming terminal E, the game effect image on the display device D is viewable in different directions by a gallery on the outer circumferential side of the player, without obstructing the player from seeing the game effect image projected on the projection surface B1a.

According to the eighteenth aspect of the invention, in the sixteenth or seventeenth aspect, the projection surface B1a of the projection target mechanism B is formed to generate a three-dimensional structure corresponding to a game content, in association with the game effect image generated by projection of the projection light A3.

According to this arrangement, the gaming machine 1 is able to generate various three-dimensional structures by changing the game effect image and the projection surface B1a, with the result that the degree of freedom in the game effects is increased.

According to the nineteenth aspect of the invention, a gaming machine includes: a projection mechanism A including a projector A1 which is configured to emit projection light A3 downward, a game effect image being generated by the projection light A3; a projection target mechanism B which is horizontally provided below the projector A1 and includes a projection surface B1a configured to generate a three-dimensional structure corresponding to a game content, in combination with the game effect image generated by projection of the projection light A3; gaming terminals E provided on the outer circumferential side of the projection target mechanism B, for performing a game operation corresponding to the game effect image; a display device D provided above a view point of a player at the gaming terminals E and configured to display the game effect image; a memory 112 configured to store three-dimensional data of a roulette ball and a rotating wheel existing in a three-dimensional space; a projection data generator 114 configured to generate, based on the three-dimensional data, projection data of the game effect image of the roulette ball and the rotating wheel in the three-dimensional space viewed from the projector A1; a display device data generator 113 configured to generate, based on the three-dimensional data, display device data of the game effect image of the roulette ball and the rotating wheel in the three-dimensional space viewed from a view point different from the projector A1; and a controller 111 configured to cause the projector A2 to emit the projection light A3 to generate the game effect image based on the projection data, and cause the display device D to display the game effect image based on the display device data.

According to the arrangement above, by using the projection data and the display device data generated based on the same three-dimensional data, different game effect images of the roulette ball and the rotating wheel are displayed on the projection surface B1a and the display device D, respectively, in a synchronized manner. Because images of each object, which is a roulette ball or a rotating wheel, viewed from different view points are generatable, the degree of freedom in the effects in the game is improved.

According to the twentieth aspect of the invention, an effect assemblage 11 for a gaming machine 1, which is configured to display a process of determining win/loss and a result of the win/loss by moving a first object image and a second object image relative to each other and stopping the first object image at a predetermined part of the second object image, includes: an effect mechanism F configured to display a game effect image including the first object image and the second object image; a memory 112 configured to store first movement data indicating movement locus and moving speed of the first object image and second movement data indicating movement locus and moving speed of the second object image; and a controller 111 programmed to execute the processes of:

(a1) sampling the first movement data and the second movement data from the memory; (a2) moving the first object image and the second object image based on the movement locus and the moving speed indicated by the first movement data and the second movement data sampled in the process (a1); (a3) calculating a timing at which the first object image reaches the end of the movement locus, based on the first movement data sampled in the process (a1); (a4) correcting the second movement data sampled in the process (a1) so that the predetermined part of the second object image is matched with the end of the movement locus of the first object image at the timing calculated in the process (a3) at which the first object image reaches the end of the movement locus; and (a5) moving the second object image based on the movement locus and the moving speed indicated by the second movement data corrected in the process (a4).

According to the arrangement above, after the relative movement of the first object image and the second object image, the movement of the second object image is corrected, with the result that the predetermined part of the second object image reaches the end of the movement locus at the timing at which the first object image reaches the end of the movement locus. With this arrangement, because the movement locus and the moving speed of the second object image can be changed over time while the second object image is moving, it is possible to display a game effect of stopping the first object image at a predetermined part of the second object image without causing the player to feel uncomfortable.

According to the 21st aspect of the invention, in the twentieth aspect, in the correction of the second movement data in the process (a4), the controller 111 sets an amount of change per unit time of the moving speed indicated by the second movement data to be equal to or smaller than a predetermined amount.

According to this arrangement, the correction of the second movement data can be easily done, because a state of not causing the player to feel uncomfortable is quantitatively defined by a value, i.e., the predetermined amount.

According to the 22nd aspect of the invention, in the twentieth or 21st aspect, the memory 112 stores different sets of the first movement data, and the controller 111 randomly samples a set of the first movement data in the process (a1).

According to this arrangement, because the first object image is randomly movable relative to the second object image, the degree of freedom in the effects is improved in regard to the movement of the game effect image.

According to the 23rd aspect of the invention, in one of the twentieth to 22nd aspects, the effect mechanism F includes: a projection mechanism A including a projector A1 configured to emit projection light A3 by which the game effect image is generated; and a projection target mechanism B including a projection surface B1a which is configured to generate a three-dimensional structure corresponding to a game content, in combination with the game effect image generated by projection of the projection light A3.

According to this arrangement, it is possible to generate various three-dimensional structures by changing the game effect image and the projection surface B1a, with the result that the degree of freedom in the game effects is increased.

According to the 24th aspect of the invention, an effect assemblage 11 for a gaming machine 1, which is configured to display a process of determining win/loss and a result of the win/loss by randomly moving a roulette ball image relative to a roulette rotating wheel image and stopping the roulette ball at one of pocket images provided at the periphery of the rotating wheel image, includes: a projection mechanism A including a projector A1 configured to emit projection light A3 by which a game effect image including the roulette ball image and the rotating wheel image is generated; a projection target mechanism B including a projection surface B1a which is configured to generate a three-dimensional structure corresponding to a roulette board, in combination with the game effect image generated by projection of the projection light A3; a memory 112 configured to store first movement data indicating movement locus and moving speed of the roulette ball image, the movement locus ending at the periphery of the rotating wheel image, and second movement data indicating rotation speed of rotation about the center of the rotating wheel image; and a controller 111 programmed to execute the processes of:

(b1) randomly selecting one of the pocket images in the rotating wheel image; (b2) sampling the first movement data and the second movement data from the memory; (b3) based on the rotation speed of the second movement data sampled in the process (b2), rotating the rotating wheel image; (b4) after the rotation of the rotating wheel image, moving the roulette ball image based on the movement locus and the moving speed of the first movement data sampled in the process (b2); (b5) calculating a timing at which the roulette ball image reaches the end of the movement locus, based on the movement locus and the moving speed of the first movement data sampled in the process (b2); (b6) correcting the rotation speed of the second movement data sampled in the process (b2) so that the pocket image selected in the process (b1) is matched with the end of the movement locus of the first object image at the timing calculated in the process (b5) at which the roulette ball image reaches the end of the movement locus; and (b7) rotating the rotating wheel image based on the rotation speed of the second movement data corrected in the process (b6).

According to the arrangement above, after the roulette ball image moves in the rotating wheel image which is rotating, the rotation speed of the rotating wheel image is corrected so that the selected pocket image in the rotating wheel image reaches the end of the movement locus at the timing at which the roulette ball image reaches the end of the movement locus. With this, because the rotation speed of the rotating wheel image can be changed over time while the roulette ball image is moving, it is possible to display a game effect of stopping the roulette ball image at the selected pocket image in the rotating wheel image without causing the player to feel uncomfortable.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process executed in or by respective steps yielding one result or blocks with a predetermined processing function described in the present specification shall be understood as a process with no self-contradiction. Further, the electrical or magnetic signal is transmitted/received and written in the respective steps. It should be noted that such a signal is expressed in the form of bit, value, symbol, text, terms, number, or the like solely for the sake of convenience. Although the present specification occasionally personifies the processes carried out in the steps, these processes are essentially executed by various devices. Further, the other structures necessary for the steps are obvious from the above descriptions.

What is claimed is:

1. A gaming machine comprising:
a projection mechanism including a projector configured to emit projection light by which a game effect image is generated; and
a projection target mechanism including a projection surface which is configured to generate a three-dimensional structure corresponding to a game content, in combination with the game effect image generated by projection of the projection light, wherein the projection surface is horizontally provided at a position that is above or below the projection mechanism, and wherein,
the game effect image includes an object capable of random movement relative to a plurality of stop positions such that a game win/loss is determinable based on a stop position of the object, the gaming machine further comprising:
a controller; and,
a memory, wherein
each time a game is executed the memory stores, as stop position data, data corresponding to a stop position of the object, and
the controller, each time the game is executed:
calculates, based on the stop position data, a cumulative object stop position over a preselected number of games based on the number of times the object is associated with each of the plurality of stop positions;
generates a graphical image corresponding to the calculated cumulative object stop position for each of the plurality of stop positions; and,
projects, with the projector, the graphical image onto the horizontally disposed game field such that an image of the calculated cumulative object stop position for each stop position is associated with each stop position.

2. The gaming machine according to claim 1, wherein, the projection target mechanism includes a light-transmitting projection surface protection plate which is provided to entirely cover the projection surface.

3. The gaming machine according to claim 1, wherein, the projection mechanism includes a light-transmitting light emission port protection plate which is provided to entirely cover a light emission port of the projector, from which the projection light is emitted.

4. The gaming machine according to claim 1, wherein, in the projection target mechanism, the projection surface is shaped to be a roulette rotating wheel and a central axis of the projection surface is in parallel to an up-down direction, and the projection mechanism is provided above the projection target mechanism and the game effect image generated by the projection light is a roulette wheel surface image.

5. The gaming machine according to claim 4, wherein, in the projection target mechanism, the game effect image generated by the projection light includes a roulette ball image moving in the wheel surface image.

6. The gaming machine according to claim 4, wherein, the projection target mechanism includes a contact member which is provided on the projection surface and is configured to change a traveling direction of a roulette ball.

7. An effect assemblage for a gaming machine, which is configured to display a process of determining win/loss and a result of the win/loss by random movement of an object, the effect assemblage comprising:
a projector configured to project an image;
a horizontally disposed game field including a non-flat projection surface which is positioned above or below the projector to receive projection light from the projector;
a memory configured to store plural types of video data of images projected on the game field from the projector and table data in which the types of the video data are associated with random numbers generatable by a random number generator, respectively; and
a controller configured to execute control so as to sample a type of the video data associated with a random number generated based on a predetermined condition and cause the projector to project an image on the projection surface based on the sampled type of the video data, wherein,
the win/loss is determined based on a stop position of the object,
the memory is capable of storing the stop position of the object and the number of times of stop associated with the stop position, as stop position data and number-of-times-of-stop data, respectively, and
the controller stores the stop position and the number of times of stop of the object in the memory each time a game is executed, executes, each time the game is executed, a process of calculating a position frequency indicating the number of times of stop with respect to the total number of times of execution of the game for each stop position, based on the stop position data and the number-of-times-of-stop data stored in the memory, and projects with the projector, the position frequency in the form of an image, in association with the stop position of the object, onto the horizontally disposed game field.

8. An effect assemblage for a gaming machine, which is configured to display a process of determining win/loss and a result of the win/loss based on a roulette pocket corresponding to a stop position after random movement of a roulette ball, the effect assemblage comprising:
a projector configured to project an image;
a horizontally disposed game field including a non-flat projection surface which is positioned above or below the projector to receive projection light from the projector;
a memory configured to store plural types of video data of images of the roulette ball and the roulette rotating wheel, which are projected on the game field from the projector, and table data in which the types of the video data are associated with random numbers generatable by a random number generator, the memory being capable of storing a stop position of an object and the number of times of stop associated with the stop position, as stop position data and number-of-times-of-stop data, respectively; and
a controller configured to execute control so as to sample a type of the video data associated with a random number generated based on a predetermined condition and cause the projector to project an image on the projection surface based on the sampled type of the video data, store the stop position and the number of times of stop of the roulette ball in the memory each time a game is executed, execute, each time the game is executed, a process of calculating a position frequency indicating the number of times of stop with respect to the total number of times of execution of the game for each stop position, based on the stop position data and the number-of-times-of-stop data stored in the memory, and project onto the horizontally disposed game field with the projector, the position frequency in the form of an image, in association with the roulette pocket at the stop position in the roulette wheel.

* * * * *